(12) United States Patent
Stulemeijer et al.

(10) Patent No.: US 12,627,322 B2
(45) Date of Patent: May 12, 2026

(54) MULTI-ANTENNA DIGITAL PREDISTORTION

(71) Applicant: QUALCOMM Incorporated, San Diego, CA (US)

(72) Inventors: Jiri Stulemeijer, Heerlen (NL); Bhushan Shanti Asuri, San Diego, CA (US); Andre Isidoro Prata, Nijmegen (NL); Evgeny Levitan, Haifa (IL); Ariel Yaakov Sagi, Haifa (IL); Ibrahim Ramez Chamas, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/739,202

(22) Filed: Jun. 10, 2024

(65) Prior Publication Data

US 2025/0379603 A1 Dec. 11, 2025

(51) Int. Cl.
$$H04B \ 1/04 \quad (2006.01)$$
$$H01Q \ 1/52 \quad (2006.01)$$
(52) U.S. Cl.
CPC ........... *H04B 1/0475* (2013.01); *H01Q 1/523* (2013.01); *H04B 2001/0425* (2013.01)
(58) Field of Classification Search
CPC .......... H04B 1/0475; H04B 2001/0425; H01Q 1/523
USPC .......................................... 375/219–220, 267
See application file for complete search history.

(56) References Cited

U.S. PATENT DOCUMENTS

| | | | | |
|---|---|---|---|---|
| 10,547,343 B2 * | 1/2020 | Ling | | H04B 1/40 |
| 11,973,525 B2 * | 4/2024 | Luo | | H04B 1/525 |
| 2015/0270857 A1 | 9/2015 | Li et al. | | |
| 2015/0381216 A1 * | 12/2015 | Shor | | H04L 25/03853 |
| | | | | 375/297 |
| 2017/0118047 A1 | 4/2017 | Xie et al. | | |
| 2018/0167092 A1 | 6/2018 | Hausmair et al. | | |
| 2020/0067466 A1 | 2/2020 | Kushnir | | |
| 2021/0242909 A1 * | 8/2021 | Agrawal | | H04B 1/04 |

(Continued)

OTHER PUBLICATIONS

International Search Report and Written Opinion—PCT/US2025/028171—ISA/EPO—Oct. 22, 2025 (2401713WO).

(Continued)

*Primary Examiner* — Emmanuel Bayard
(74) *Attorney, Agent, or Firm* — Harrity & Harrity LLP

(57) ABSTRACT

Various aspects of the present disclosure generally relate to wireless communication. In some aspects, an apparatus may include first transceiver hardware comprising: first processing logic configured to generate a first plurality of output streams associated with a first sub-array of antenna elements of an antenna array by applying a first inverse power-amplifier-to-antenna-array network (A-1) matrix to one or more first input streams; and a first plurality of digital predistortion (DPD) circuits that are apply first DPD to the first plurality of output streams. The apparatus may include second transceiver hardware comprising: second processing logic configured to generate a second plurality of output streams associated with a second sub-array of antenna elements of the antenna array by applying a second A-1 matrix to second one or more input streams, and a second plurality of DPD circuits configured to apply second DPD to the second plurality of output streams.

35 Claims, 18 Drawing Sheets

(56) References Cited

U.S. PATENT DOCUMENTS

| | | |
|---|---|---|
| 2021/0328609 A1 | 10/2021 | Gutman et al. |
| 2022/0286869 A1 | 9/2022 | Feng et al. |
| 2023/0268942 A1 | 8/2023 | Ghannouchi et al. |
| 2023/0378647 A1 | 11/2023 | Hamid et al. |
| 2024/0137054 A1* | 4/2024 | Peng .................... H04B 1/0475 |
| 2025/0211906 A1* | 6/2025 | Verschueren ....... H04L 27/2655 |

OTHER PUBLICATIONS

Liu X., et al., "Linearization for Hybrid Beamforming Array Utilizing Embedded Over-the-Air Diversity Feedbacks", IEEE Transactions on Microwave Theory and Techniques, IEEE, USA, vol. 67, No. 12, Dec. 1, 2019, pp. 5235-5248, XP011763489, The Whole Document.
Liu X., et al., "Linearization for Hybrid Beamforming Array Utilizing Embedded Over-the-Air Diversity Feedbacks", IEEE Transactions on Microwave Theory and Techniques, vol. 67, No. 12, Dec. 1, 2019, pp. 5235-5248, XP011763489, The Whole Document.
Partial International Search Report—PCT/US2025/028171—ISA/EPO—Aug. 8, 2025 (2401713WO).

* cited by examiner

Figure 16:
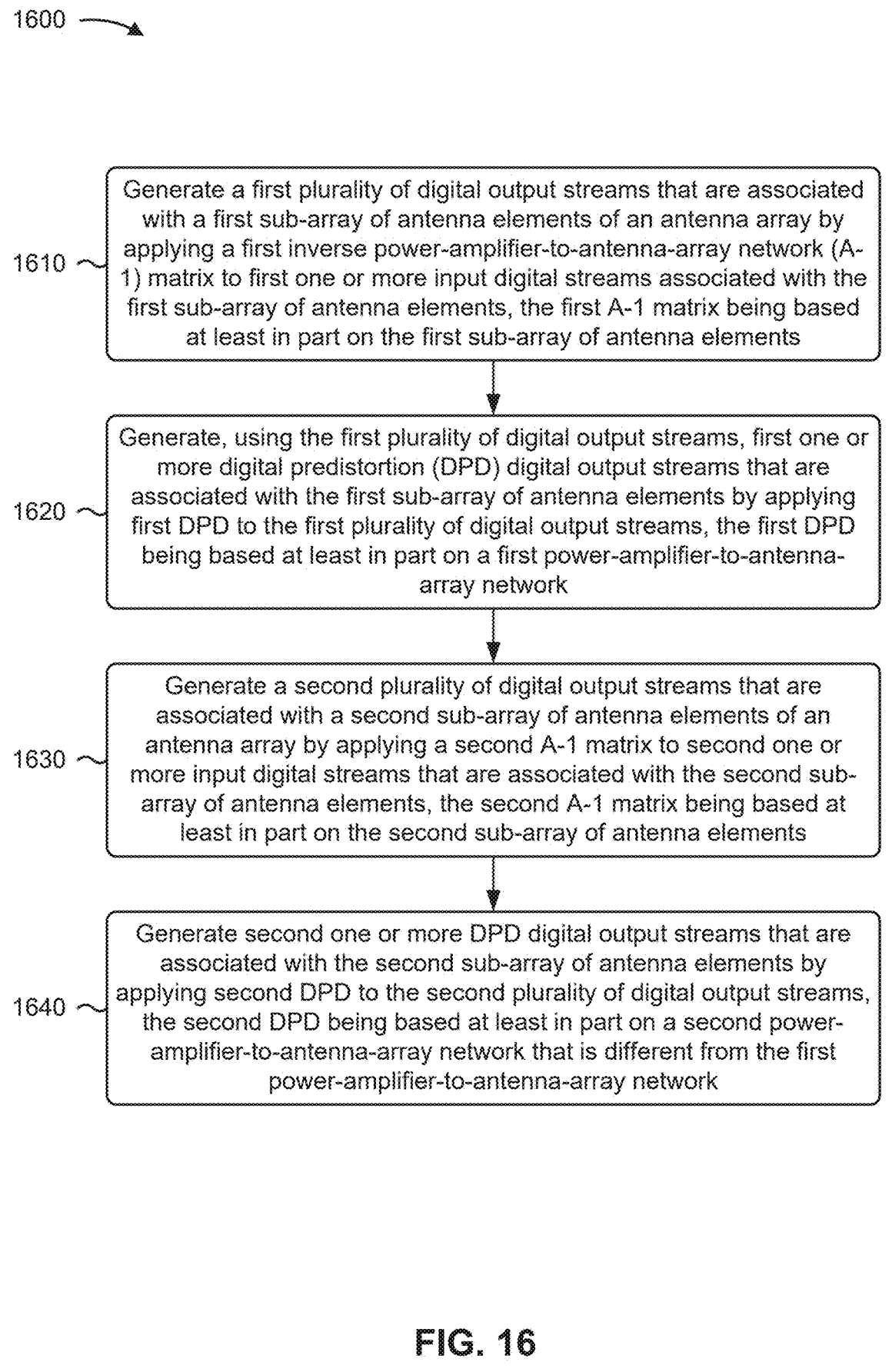

1600 ⟶

1610 ⟶ Generate a first plurality of digital output streams that are associated with a first sub-array of antenna elements of an antenna array by applying a first inverse power-amplifier-to-antenna-array network (A-1) matrix to first one or more input digital streams associated with the first sub-array of antenna elements, the first A-1 matrix being based at least in part on the first sub-array of antenna elements 1620 ⟶ Generate, using the first plurality of digital output streams, first one or more digital predistortion (DPD) digital output streams that are associated with the first sub-array of antenna elements by applying first DPD to the first plurality of digital output streams, the first DPD being based at least in part on a first power-amplifier-to-antenna-array network 1630 ⟶ Generate a second plurality of digital output streams that are associated with a second sub-array of antenna elements of an antenna array by applying a second A-1 matrix to second one or more input digital streams that are associated with the second sub-array of antenna elements, the second A-1 matrix being based at least in part on the second sub-array of antenna elements 1640 ⟶ Generate second one or more DPD digital output streams that are associated with the second sub-array of antenna elements by applying second DPD to the second plurality of digital output streams, the second DPD being based at least in part on a second power-amplifier-to-antenna-array network that is different from the first power-amplifier-to-antenna-array network

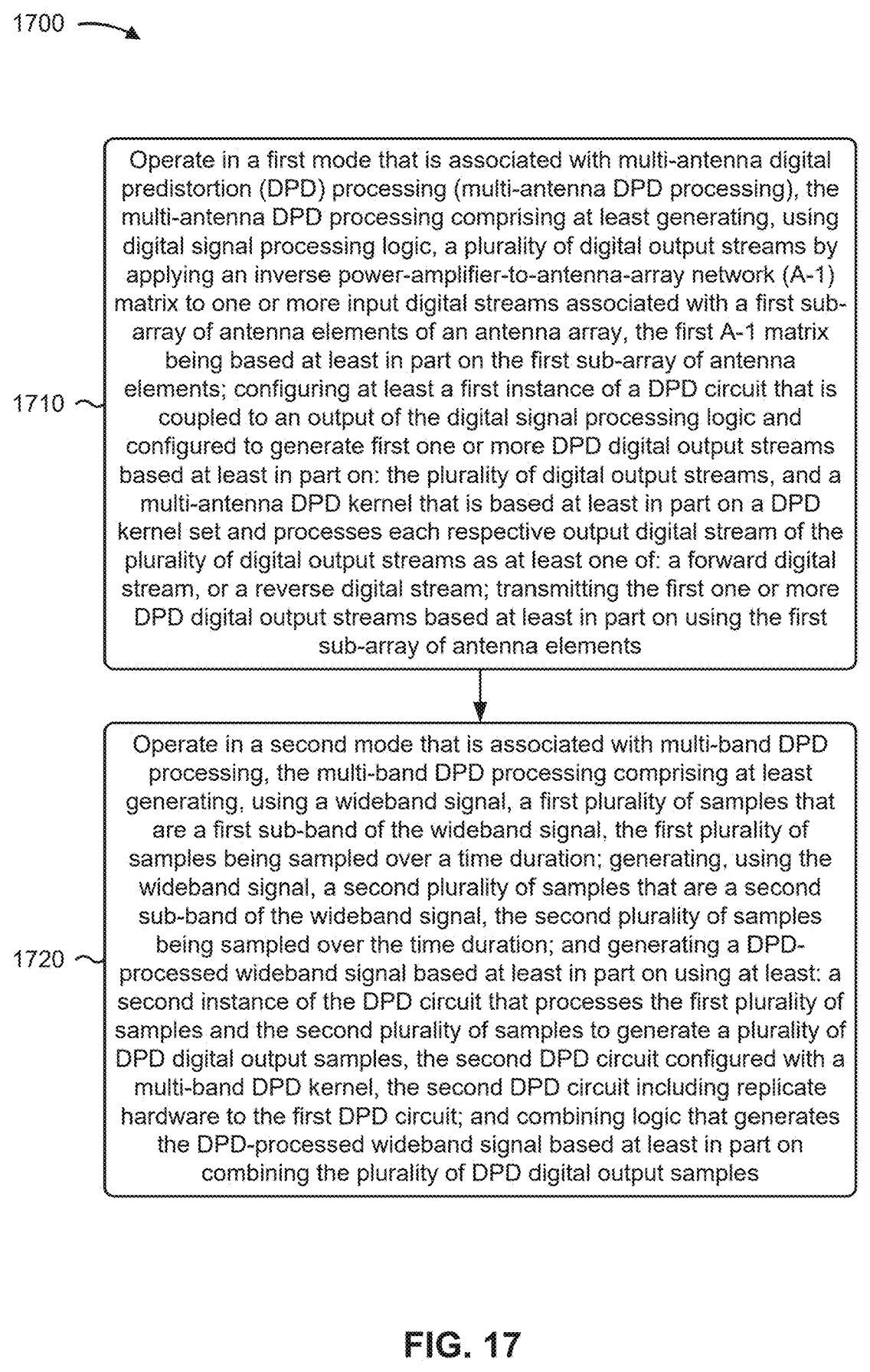

1710 ⟿
Operate in a first mode that is associated with multi-antenna digital predistortion (DPD) processing (multi-antenna DPD processing), the multi-antenna DPD processing comprising at least generating, using digital signal processing logic, a plurality of digital output streams by applying an inverse power-amplifier-to-antenna-array network (A-1) matrix to one or more input digital streams associated with a first sub-array of antenna elements of an antenna array, the first A-1 matrix being based at least in part on the first sub-array of antenna elements; configuring at least a first instance of a DPD circuit that is coupled to an output of the digital signal processing logic and configured to generate first one or more DPD digital output streams based at least in part on: the plurality of digital output streams, and a multi-antenna DPD kernel that is based at least in part on a DPD kernel set and processes each respective output digital stream of the plurality of digital output streams as at least one of: a forward digital stream, or a reverse digital stream; transmitting the first one or more DPD digital output streams based at least in part on using the first sub-array of antenna elements 1720 ⟿
Operate in a second mode that is associated with multi-band DPD processing, the multi-band DPD processing comprising at least generating, using a wideband signal, a first plurality of samples that are a first sub-band of the wideband signal, the first plurality of samples being sampled over a time duration; generating, using the wideband signal, a second plurality of samples that are a second sub-band of the wideband signal, the second plurality of samples being sampled over the time duration; and generating a DPD-processed wideband signal based at least in part on using at least: a second instance of the DPD circuit that processes the first plurality of samples and the second plurality of samples to generate a plurality of DPD digital output samples, the second DPD circuit configured with a multi-band DPD kernel, the second DPD circuit including replicate hardware to the first DPD circuit; and combining logic that generates the DPD-processed wideband signal based at least in part on combining the plurality of DPD digital output samples

FIG. 17

MULTI-ANTENNA DIGITAL PREDISTORTION

FIELD OF THE DISCLOSURE

Aspects of the present disclosure generally relate to wireless communication and specifically relate to techniques, apparatuses, and methods for multi-antenna digital predistortion.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to an apparatus for wireless communication. In some aspects, the apparatus may include first transceiver hardware that comprises first digital signal processing logic configured to: generate a first plurality of digital output streams that are associated with a first sub-array of antenna elements of an antenna array by applying a first inverse power-amplifier-to-antenna-array network (A-1) matrix to one or more first input digital streams associated with the first sub-array of antenna elements. The first transceiver hardware may include a first plurality of digital predistortion (DPD) circuits that are coupled to an output of the first digital signal processing logic and configured to: receive the first plurality of digital output streams from the first digital signal processing logic; and output first one or more DPD digital output streams that are associated with the first sub-array of antenna elements by applying first DPD to the first plurality of digital output streams. The apparatus may include at least second transceiver hardware, and the second transceiver hardware may include second digital signal processing logic configured to: generate a second plurality of digital output streams that are associated with a second sub-array of antenna elements of the antenna array by applying a second A-1 matrix to second one or more input digital streams that are associated with the second sub-array of antenna elements. The second transceiver hardware may include a second plurality of DPD circuits that are coupled to the second digital signal processing logic and configured to: output second one or more DPD digital output streams that are associated with the second sub-array of antenna elements by applying second DPD to the second plurality of digital output streams.

Some aspects described herein relate to an apparatus for wireless communication. In some aspects, the apparatus may comprise an antenna array that includes multiple antenna elements, one or more power amplifiers, each power amplifier being coupled to one or more antenna elements of the antenna array, and at least a first instance and a second instance of a DPD circuit. In some aspects, the apparatus includes first transceiver hardware that is coupled to at least a first power amplifier of the one or more power amplifiers and configured to drive at least a first portion of the antenna array. In some aspects, the first transceiver hardware comprises the first instance of the DPD circuit configured to apply first DPD to a first plurality of input streams using a multi-band DPD kernel. The apparatus may include second transceiver hardware that is coupled to at least a second power amplifier of the one or more power amplifiers, and the second transceiver hardware is configured to drive at least a second portion of the antenna array. In some aspects, the second transceiver hardware comprises: the second instance of the DPD circuit, and the second instance of the DPD circuit is configured to apply second DPD to a second plurality of input streams using a multi-antenna DPD kernel that is based at least in part on a DPD kernel set. In some aspects, the first instance of the DPD circuit and the second instance of the DPD circuit are configured to dynamically switch between DPD kernel types that are used to apply DPD to the first plurality of input streams or the second of input streams, respectively.

Some aspects described herein relate to a method performed by an apparatus. The method may include generating a first plurality of digital output streams that are associated with a first sub-array of antenna elements of an antenna array by applying a first A-1 matrix to first one or more input digital streams associated with the first sub-array of antenna elements, the first A-1 matrix being based at least in part on the first sub-array of antenna elements. The method may include generating, using the first plurality of digital output streams, first one or more DPD digital output streams that are associated with the first sub-array of antenna elements by applying first DPD to the first plurality of digital output streams, the first DPD being based at least in part on a first power-amplifier-to-antenna-array network. The method may include generating a second plurality of digital output streams that are associated with a second sub-array of antenna elements of an antenna array by applying a second A-1 matrix to second one or more input digital streams that are associated with the second sub-array of antenna elements, the second A-1 matrix being based at least in part on the second sub-array of antenna elements. The method may include generating second one or more DPD digital output streams that are associated with the second sub-array of antenna elements by applying second DPD to the second plurality of digital output streams, the second DPD being based at least in part on a second power-amplifier-to-antenna-array network that is different from the first power-amplifier-to-antenna-array network.

Some aspects described herein relate to a method performed by an apparatus. The method may include operating in a first mode that is associated with multi-antenna DPD processing, the multi-antenna DPD processing comprising at least, generating, using digital signal processing logic, a plurality of digital output streams by applying an A-1 matrix to one or more input digital streams associated with a first sub-array of antenna elements of an antenna array, the first A-1 matrix being based at least in part on the first sub-array of antenna elements configuring at least a first instance of a DPD circuit that is coupled to an output of the digital signal processing logic and configured to generate first one or more DPD digital output streams based at least in part on: the plurality of digital output streams, and a multi-antenna DPD kernel that is based at least in part on a DPD kernel set and processes each respective output digital stream of the plurality of digital output streams as at least one of: a forward digital stream, or a reverse digital stream transmitting the first one or more DPD digital output streams based at least in part on using the first sub-array of antenna elements. The method may include operating in a second mode that is associated with multi-band DPD processing, the multi-band DPD processing comprising at least, generating, using a wideband signal, a first plurality of samples that are a first sub-band of the wideband signal, the first plurality of samples being sampled over a time duration generating, using the wideband signal, a second plurality of samples that are a second sub-band of the wideband signal, the second plurality of samples being sampled over the time duration generating a DPD-processed wideband signal based at least in part on using at least: a second instance of the DPD circuit that processes the first plurality of samples and the second plurality of samples to generate a plurality of DPD digital output samples, the second DPD circuit configured with a multi-band DPD kernel, the second DPD circuit including replicate hardware to the first DPD circuit combining logic that generates the DPD-processed wideband signal based at least in part on combining the plurality of DPD digital output samples.

Some aspects described herein relate to an apparatus for wireless communication at an apparatus. The apparatus may include one or more memories and one or more processors coupled to the one or more memories. The one or more processors may be configured to generate a first plurality of digital output streams that are associated with a first sub-array of antenna elements of an antenna array by applying a first A-1 matrix to first one or more input digital streams associated with the first sub-array of antenna elements, the first A-1 matrix being based at least in part on the first sub-array of antenna elements. The one or more processors may be configured to generate, using the first plurality of digital output streams, first one or more DPD digital output streams that are associated with the first sub-array of antenna elements by applying first DPD to the first plurality of digital output streams, the first DPD being based at least in part on a first power-amplifier-to-antenna-array network. The one or more processors may be configured to generate a second plurality of digital output streams that are associated with a second sub-array of antenna elements of an antenna array by applying a second A-1 matrix to second one or more input digital streams that are associated with the second sub-array of antenna elements, the second A-1 matrix being based at least in part on the second sub-array of antenna elements. The one or more processors may be configured to generate second one or more DPD digital output streams that are associated with the second sub-array of antenna elements by applying second DPD to the second plurality of digital output streams, the second DPD being based at least in part on a second power-amplifier-to-antenna-array network that is different from the first power-amplifier-to-antenna-array network.

Some aspects described herein relate to an apparatus for wireless communication at an apparatus. The apparatus may include one or more memories and one or more processors coupled to the one or more memories. The one or more processors may be configured to operate in a first mode that is associated with multi-antenna DPD processing (multi-antenna DPD processing), the one or more processors, to perform the multi-antenna DPD processing, configured to cause the apparatus, generate, using digital signal processing logic, a plurality of digital output streams by applying an A-1 matrix to one or more input digital streams associated with a first sub-array of antenna elements of an antenna array, the first A-1 matrix being based at least in part on the first sub-array of antenna elements configure at least a first instance of a DPD circuit that is coupled to an output of the digital signal processing logic and configured to generate first one or more DPD digital output streams based at least in part on: the plurality of digital output streams, and a multi-antenna DPD kernel that is based at least in part on a DPD kernel set and processes each respective output digital stream of the plurality of digital output streams as at least one of: a forward digital stream, or a reverse digital stream transmit the first one or more DPD digital output streams based at least in part on using the first sub-array of antenna elements. The one or more processors may be configured to operate in a second mode that is associated with multi-band DPD processing, the one or more processors, to perform the multi-band DPD processing, configured to cause the apparatus, generate, using a wideband signal, a first plurality of samples that are a first sub-band of the wideband signal, the first plurality of samples being sampled over a time duration generate, using the wideband signal, a second plurality of samples that are a second sub-band of the wideband signal, the second plurality of samples being sampled over the time duration generate a DPD-processed wideband signal based at least in part on using at least: a second instance of the DPD circuit that processes the first plurality of samples and the second plurality of samples to generate a plurality of DPD digital output samples, the second DPD circuit configured with a multi-band DPD kernel, the second DPD circuit including replicate hardware to the first DPD circuit combining logic that generates the DPD-processed wideband signal based at least in part on combining the plurality of DPD digital output samples.

Some aspects described herein relate to a non-transitory computer-readable medium that stores a set of instructions for wireless communication by a one or more instructions that, when executed by one or more processors of an apparatus. The set of instructions, when executed by one or more processors of the one or more instructions that, when executed by one or more processors of an apparatus, may cause the one or more instructions that, when executed by one or more processors of an apparatus to generate a first plurality of digital output streams that are associated with a first sub-array of antenna elements of an antenna array by applying a first A-1 matrix to first one or more input digital streams associated with the first sub-array of antenna elements, the first A-1 matrix being based at least in part on the first sub-array of antenna elements. The set of instructions, when executed by one or more processors of the one or more instructions that, when executed by one or more processors of an apparatus, may cause the one or more instructions that, when executed by one or more processors of an apparatus to generate, using the first plurality of digital output streams, first one or more DPD digital output streams that are associated with the first sub-array of antenna elements by applying first DPD to the first plurality of digital output streams, the first DPD being based at least in part on a first power-amplifier-to-antenna-array network. The set of instructions, when executed by one or more processors of the one or more instructions that, when executed by one or more processors of an apparatus, may cause the one or more instructions that, when executed by one or more processors of an apparatus to generate a second plurality of digital output streams that are associated with a second sub-array of antenna elements of an antenna array by applying a second A-1 matrix to second one or more input digital streams that are associated with the second sub-array of antenna elements, the second A-1 matrix being based at least in part on the second sub-array of antenna elements. The set of instructions, when executed by one or more processors of the one or more instructions that, when executed by one or more processors of an apparatus, may cause the one or more instructions that, when executed by one or more processors of an apparatus to generate second one or more DPD digital output streams that are associated with the second sub-array of antenna elements by applying second DPD to the second plurality of digital output streams, the second DPD being based at least in part on a second power-amplifier-to-antenna-array network that is different from the first power-amplifier-to-antenna-array network.

Some aspects described herein relate to a non-transitory computer-readable medium that stores a set of instructions for wireless communication by a one or more instructions that, when executed by one or more processors of an apparatus. The set of instructions, when executed by one or more processors of the one or more instructions that, when executed by one or more processors of an apparatus, may cause the one or more instructions that, when executed by one or more processors of an apparatus to operate in a first mode that is associated with multi-antenna DPD processing (multi-antenna DPD processing), the one or more instructions, to perform the multi-antenna DPD processing, configured to cause the apparatus, generate, using digital signal processing logic, a plurality of digital output streams by applying an A-1 matrix to one or more input digital streams associated with a first sub-array of antenna elements of an antenna array, the first A-1 matrix being based at least in part on the first sub-array of antenna elements configure at least a first instance of a DPD circuit that is coupled to an output of the digital signal processing logic and configured to generate first one or more DPD digital output streams based at least in part on: the plurality of digital output streams, and a multi-antenna DPD kernel that is based at least in part on a DPD kernel set and processes each respective output digital stream of the plurality of digital output streams as at least one of: a forward digital stream, or a reverse digital stream transmit the first one or more DPD digital output streams based at least in part on using the first sub-array of antenna elements. The set of instructions, when executed by one or more processors of the one or more instructions that, when executed by one or more processors of an apparatus, may cause the one or more instructions that, when executed by one or more processors of an apparatus to operate in a second mode that is associated with multi-band DPD processing, the one or more instructions, to perform the multi-band DPD processing, configured to cause the apparatus, generate, using a wideband signal, a first plurality of samples that are a first sub-band of the wideband signal, the first plurality of samples being sampled over a time duration generate, using the wideband signal, a second plurality of samples that are a second sub-band of the wideband signal, the second plurality of samples being sampled over the time duration generate a DPD-processed wideband signal based at least in part on using at least: a second instance of the DPD circuit that processes the first plurality of samples and the second plurality of samples to generate a plurality of DPD digital output samples, the second DPD circuit configured with a multi-band DPD kernel, the second DPD circuit including replicate hardware to the first DPD circuit combining logic that generates the DPD-processed wideband signal based at least in part on combining the plurality of DPD digital output samples.

Some aspects described herein relate to an apparatus for wireless communication. The apparatus may include means for generating a first plurality of digital output streams that are associated with a first sub-array of antenna elements of an antenna array by applying a first A-1 matrix to first one or more input digital streams associated with the first sub-array of antenna elements, the first A-1 matrix being based at least in part on the first sub-array of antenna elements. The apparatus may include means for generating, using the first plurality of digital output streams, first one or more DPD digital output streams that are associated with the first sub-array of antenna elements by applying first DPD to the first plurality of digital output streams, the first DPD being based at least in part on a first power-amplifier-to-antenna-array network. The apparatus may include means for generating a second plurality of digital output streams that are associated with a second sub-array of antenna elements of an antenna array by applying a second A-1 matrix to second one or more input digital streams that are associated with the second sub-array of antenna elements, the second A-1 matrix being based at least in part on the second sub-array of antenna elements. The apparatus may include means for generating second one or more DPD digital output streams that are associated with the second sub-array of antenna elements by applying second DPD to the second plurality of digital output streams, the second DPD being based at least in part on a second power-amplifier-to-antenna-array network that is different from the first power-amplifier-to-antenna-array network.

Some aspects described herein relate to an apparatus for wireless communication. The apparatus may include means for operating in a first mode that is associated with multi-antenna DPD processing (multi-antenna DPD processing), the multi-antenna DPD processing comprising at least, means for generating, using digital signal processing logic, a plurality of digital output streams by applying an A-1 matrix to one or more input digital streams associated with a first sub-array of antenna elements of an antenna array, the first A-1 matrix being based at least in part on the first sub-array of antenna elements means for configuring at least a first instance of a DPD circuit that is coupled to an output of the digital signal processing logic and configured to generate first one or more DPD digital output streams based at least in part on: the plurality of digital output streams, and a multi-antenna DPD kernel that is based at least in part on a DPD kernel set and processes each respective output digital stream of the plurality of digital output streams as at least one of: a forward digital stream, or a reverse digital stream means for transmitting the first one or more DPD digital output streams based at least in part on using the first sub-array of antenna elements. The apparatus may include means for operating in a second mode that is associated with multi-band DPD processing, the multi-band DPD processing comprising at least, means for generating, using a wideband signal, a first plurality of samples that are a first sub-band of the wideband signal, the first plurality of samples being sampled over a time duration means for generating, using the wideband signal, a second plurality of samples that are a second sub-band of the wideband signal, the second plurality of samples being sampled over the time duration means for generating a DPD-processed wideband signal based at least in part on using at least: a second instance of the DPD circuit that processes the first plurality of samples and the second plurality of samples to generate a plurality of DPD digital output samples, the second DPD circuit configured with a multi-band DPD kernel, the second DPD circuit including replicate hardware to the first DPD circuit combining logic that generates the DPD-processed wideband signal based at least in part on combining the plurality of DPD digital output samples.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 16 is a diagram illustrating an example process performed, for example, at an apparatus or an apparatus of an apparatus, in accordance with the present disclosure.

FIG. 17 is a diagram illustrating an example process performed, for example, at an apparatus or an apparatus of an apparatus, in accordance with the present disclosure.

DETAILED DESCRIPTION

Figure 1:
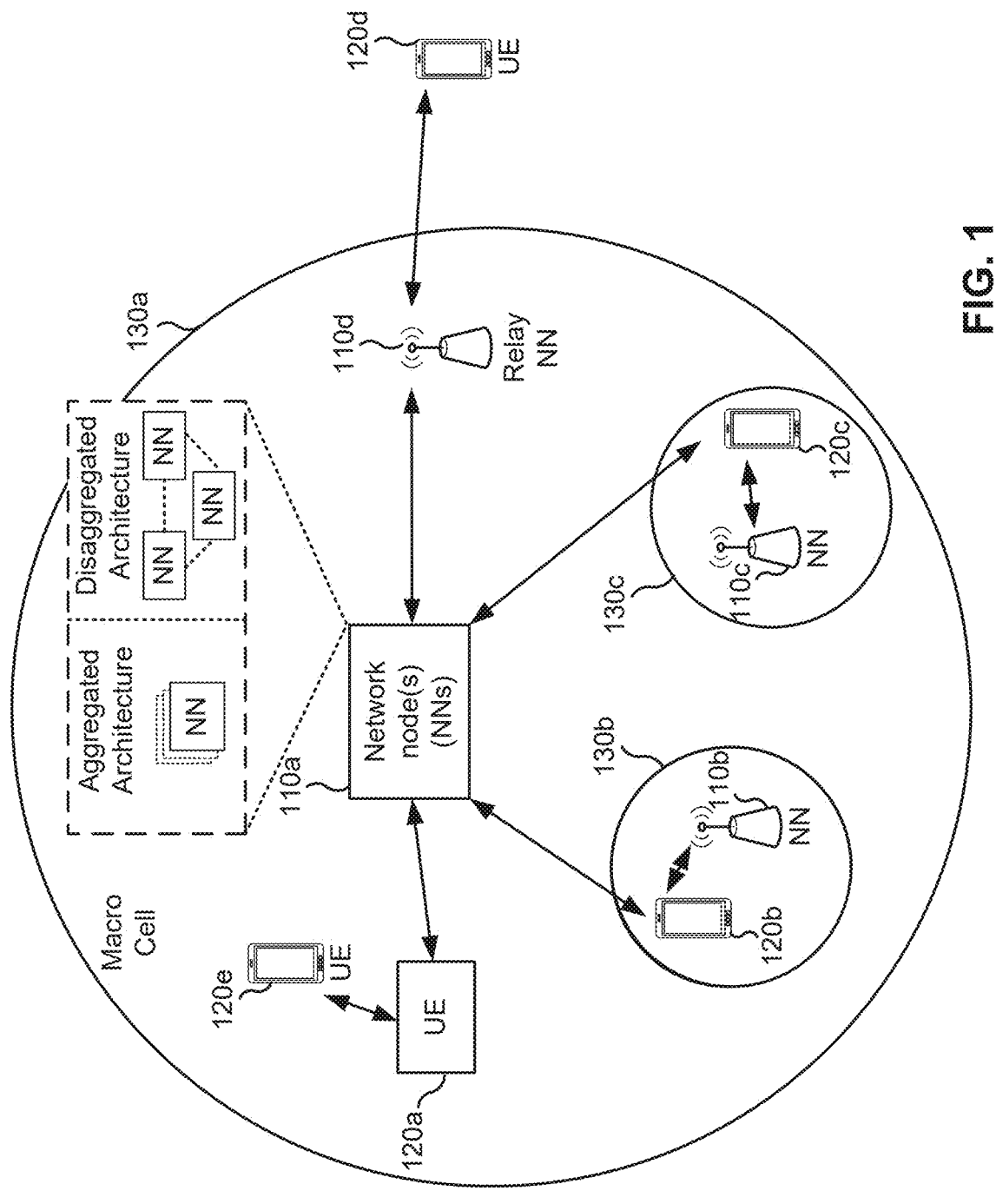
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

As wireless communication techniques advance, a wireless communication device may include more transmitter chains and/or more antenna elements. Increasing a number of transmitter chains and/or increasing a number of antenna elements may also result in an increased number of power amplifiers (PAs). For example, in a massive multiple-input-multiple-output (MIMO) implementation such as at a base station, an antenna array having 64 or 128 or more antenna elements driven by a large number of PAs each of which may result in crosstalk. Increasing a number of PAs may also result in an increased number of isolator components to mitigate crosstalk between transmitter chains. While the isolator components may mitigate crosstalk, increasing a number of PAs in a wireless communication device may lead to an increased manufacturing cost of the wireless communication. For example, increasing the number of PAs may also increase a number of isolator components used to mitigate crosstalk. Isolator components may have a higher cost relative to other hardware components, resulting in an increased manufacturing cost that may reduce a cost-effectiveness of the wireless communication device. For example, in a massive MIMO array with 100+ antenna elements and possibly 100+ PAs, the cost of including an isolator for each PA and/or antenna element may be significant. While removing isolator components in each transmitter chain may reduce a manufacturing cost and/or increase the cost-effectiveness of building the wireless communication device, the removal of isolator components may adversely affect signal quality. To illustrate, removing isolator components may increase signal interference, increase signal distortion, and/or reduce performance (e.g., reduce data throughput, increase data recovery errors, and/or reduce communication reliability) in a wireless network.

Various aspects relate generally to multi-antenna digital predistortion (DPD). Some aspects more specifically relate to using a multi-dimensional DPD circuit that receives a dual stream input and corrects for cross-terms in signal distortion based at least on a sparse implementation of crosstalk correction. In some aspects, an apparatus may include an antenna array that includes multiple antenna elements, first transceiver hardware that includes first digital signal processing logic and a first plurality of DPD circuits, and second transceiver hardware that includes second digital signal processing logic and a second plurality of DPD circuits. The first digital signal processing logic may be configured to generate a first plurality of digital output streams that are associated with a first sub-array of antenna elements of the antenna array by applying a first inverse power-amplifier-to-antenna-array network (A-1) matrix to one or more first input digital streams associated with the first sub-array of antenna elements. In some aspects, the first plurality of DPD circuits and/or the second plurality of DPD circuits may include one or more multi-dimensional DPD circuits as described below, such as a two-dimensional (2D) DPD circuit.

In some aspects, the first A-1 matrix may be based at least in part on the first sub-array of antenna elements having a first set of border antenna elements that are adjacent to a second set of border antenna elements of a second sub-array of antenna elements of the antenna array, and that the first set of border antenna elements have an isolation level between the second set of border antenna elements that satisfies an isolation level threshold that indicates that an antenna crosstalk level between the first set of border antenna elements and the second set of border antenna elements is negligible. That is, the first A-1 matrix may be constructed based at least in part on the antenna crosstalk level being negligible as described below, which may also be referred to a sparse implementation of the first A-1 matrix.

In some aspects, the first DPD circuits are coupled to an output of the first digital signal processing logic such that the first DPD circuits receive the first plurality of digital output streams from the first digital signal processing logic, and output first one or more DPD digital output streams that are associated with the first sub-array of antenna elements. For example, the first DPD circuits may apply first DPD to the first plurality of digital output streams. Alternatively, or additionally, the DPD circuits may apply crosstalk preconditioning to mitigate crosstalk between transceiver chains. Accordingly, the first DPD circuits may output one or more DPD-processed streams that include crosstalk correction, and the first DPD circuits may apply the crosstalk correction based at least in part on a sparse implementation of the first A-1 matrix as described below.

Alternatively, or additionally, the second digital signal processing logic included in the second transceiver may generate a second plurality of digital output streams that are associated with the second sub-array of antenna elements by applying a second A-1 matrix to second one or more input digital streams that are associated with the second sub-array of antenna elements. In a similar manner as the first A-1 matrix, the second A-1 matrix may be based at least in part on the isolation level between the first set of border antenna elements and the second set of border antenna elements satisfying the isolation level threshold. That is, the second A-1 matrix may be constructed based at least in part on the antenna crosstalk level being negligible, which may also be referred to a sparse implementation of the second A-1 matrix. In a similar manner as the first DPD circuits, the second DPD circuits may be coupled to the second digital signal processing logic and may output second one or more DPD digital output streams that are associated with the second sub-array of antenna elements. The second DPD may apply second DPD to the second plurality of digital output streams. Alternatively, or additionally, the second DPD circuits may apply crosstalk preconditioning to mitigate crosstalk between transceiver chains. Accordingly, the second DPD circuits may output one or more DPD-processed streams that include crosstalk correction, and the second DPD circuits may apply the crosstalk correction based at least in part on a sparse implementation of the second A-1 matrix as described below.

Particular aspects of the subject matter described in this disclosure can be implemented to realize one or more of the following potential advantages. In some examples, by constructing an A-1 matrix using a sparse implementation that is based at least in part on an isolation level between boarding antenna elements of antenna element sub-arrays, the described techniques can be used to implement a transmitter chain that does not include an isolator component, reduce signal interference, reduce signal distortion, and/or increase performance (e.g., increase data throughput, decrease data recovery errors, and/or increase communication reliability) in a wireless network.

Alternatively, or additionally, using a sparse implementation (e.g., that is based at least in part on an isolation level between boarding antenna elements of antenna element sub-arrays indicating that border antenna element crosstalk is negligible) may reduce a complexity of the A-1 matrix used to apply crosstalk predistortion and, consequently, a multi-dimensional DPD circuit that generates a DPD-processed wideband signal using forward signals and reverse signals generated by the A-1 matrix as described below. To illustrate, a multi-dimensional DPD circuit may be implemented as an integrated circuit (IC) as described below, and an increase in complexity of the IC may proportionally increase a number of logic circuits included on the multi-dimensional DPD. For instance, a first IC with more complexity relative to a second IC may include more logic circuits, may have a larger size, may have a longer propagation delay through the IC, may consume more power, may be less scalable, and/or may be harder to debug. Accordingly, constructing an A-1 matrix using a sparse implementation that is based at least in part on an isolation level between boarding antenna elements of antenna element sub-arrays may reduce a complexity of the multi-dimensional DPD circuit, resulting in fewer logic circuits, a smaller size, may have a shorter propagation delay through the IC, less power consumption, may be more scalable, and/or may be easier to debug relative to a more complex DPD circuit that is not based at least in part on a sparse implementation of the A-1 matrix.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110a, a network node 110b, a network node 110c, and a network node 110d. The network nodes 110 may support communications with multiple UEs 120, shown as a UE 120a, a UE 120b, a UE 120c, a UE 120d, and a UE 120e.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC)

functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs"). An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, eMBB, and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120a and UE 120e) may communicate directly with one another using sidelink communications (for example, without communicating by way of a network node 110 as an intermediary). As an example, the UE 120a may directly transmit data, control information, or other signaling as a sidelink communication to the UE 120e. This is in contrast to, for example, the UE 120a first transmitting data in an UL communication to a network node 110, which then transmits the data to the UE 120e in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, an apparatus (e.g., a network node 110, a transmitter 1002, a modem 1204 described below with regard to FIG. 12, and/or a multi-dimensional DPD apparatus 1300 described below with regard to FIG. 13) may generate a first plurality of digital output streams that are associated with a first sub-array of antenna elements of an antenna array by applying a first A-1 matrix to first one or more input digital streams associated with the first sub-array of antenna elements, the first A-1 matrix being based at least in part on: the first sub-array of antenna elements having a first set of border antenna elements that are adjacent to a second set of border antenna elements of a second sub-array of antenna elements of the antenna array, and the first set of border antenna elements having an isolation level between the second set of border antenna elements, the isolation level satisfying an isolation level threshold that indicates that an antenna crosstalk level between the first set of border antenna elements and the second set of border antenna elements is negligible; generate, using the first plurality of digital output streams, first one or more DPD digital output streams that are associated with the first sub-array of antenna elements by applying first DPD to the first plurality of digital output streams, the first DPD being based at least in part on a first power-amplifier-to-antenna-array network; generate a second plurality of digital output streams that are associated with the second sub-array of antenna elements by applying a second A-1 matrix to second one or more input digital streams that are associated with the second sub-array of antenna elements, the second A-1 matrix being based at least in part on the isolation level satisfying the isolation level threshold; and generate second one or more DPD digital output streams that are associated with the second sub-array of antenna elements by applying second DPD to the second plurality of digital output streams, the second DPD being based at least in part on a second power-amplifier-to-antenna-array network that is different from the first power-amplifier-to-antenna-array network. Additionally, or alternatively, the apparatus may perform one or more other operations described herein.

In some aspects, an apparatus (a network node 110, a transmitter 1002, a modem 1204 described below with regard to FIG. 12, and/or a multi-dimensional DPD apparatus 1300 described below with regard to FIG. 13) may operate in a first mode that is associated with multi-antenna DPD processing, the multi-antenna DPD processing comprising at least: generate, using digital signal processing logic, a plurality of digital output streams by applying an A-1 matrix to one or more input digital streams associated with a first sub-array of antenna elements of an antenna array, the A-1 matrix being based at least in part on: the first sub-array of antenna elements having a first set of border antenna elements that are adjacent to a second set of border antenna elements of a second sub-array of antenna elements of the antenna array, and the first set of border antenna elements having an isolation level between the second set of border antenna elements, the isolation level satisfying an isolation level threshold that indicates that an antenna crosstalk level between the first set of border antenna elements and the second set of border antenna elements is negligible; configure at least a first DPD circuit that is coupled to an output of the digital signal processing logic and configured to generate first one or more DPD digital output streams based at least in part on: the plurality of digital output streams, and a multi-antenna DPD kernel that is based at least in part on a DPD kernel set and processes each respective output digital stream of the plurality of digital output streams as at least one of: a forward digital stream, or a reverse digital stream; transmit the first one or more DPD digital output streams based at least in part on using the first sub-array of antenna elements; and operate in a second mode that is associated with multi-band DPD processing, the multi-band DPD processing comprising at least: generate, using a wideband signal, a first plurality of samples that are a first sub-band of the wideband signal, the first plurality of samples being sampled over a time duration; generate, using the wideband signal, a second plurality of samples that are a second sub-band of the wideband signal, the second plurality of samples being sampled over the time duration; and generate a DPD-processed wideband signal based at least in part on using at least: a second DPD circuit that processes the first plurality of samples and the second plurality of samples to generate a plurality of DPD digital output samples, the second DPD circuit configured with a multi-band DPD kernel, the second DPD circuit including replicate hardware to the first DPD circuit; and combining logic that generates the DPD-process wideband signal based at least in part on combining the plurality of DPD digital output samples. Additionally, or alternatively, the apparatus may perform one or more other operations described herein.

As indicated above, FIG. 1 is provided as an example. Other examples may differ from what is described with regard to FIG. 1.

Figure 2:
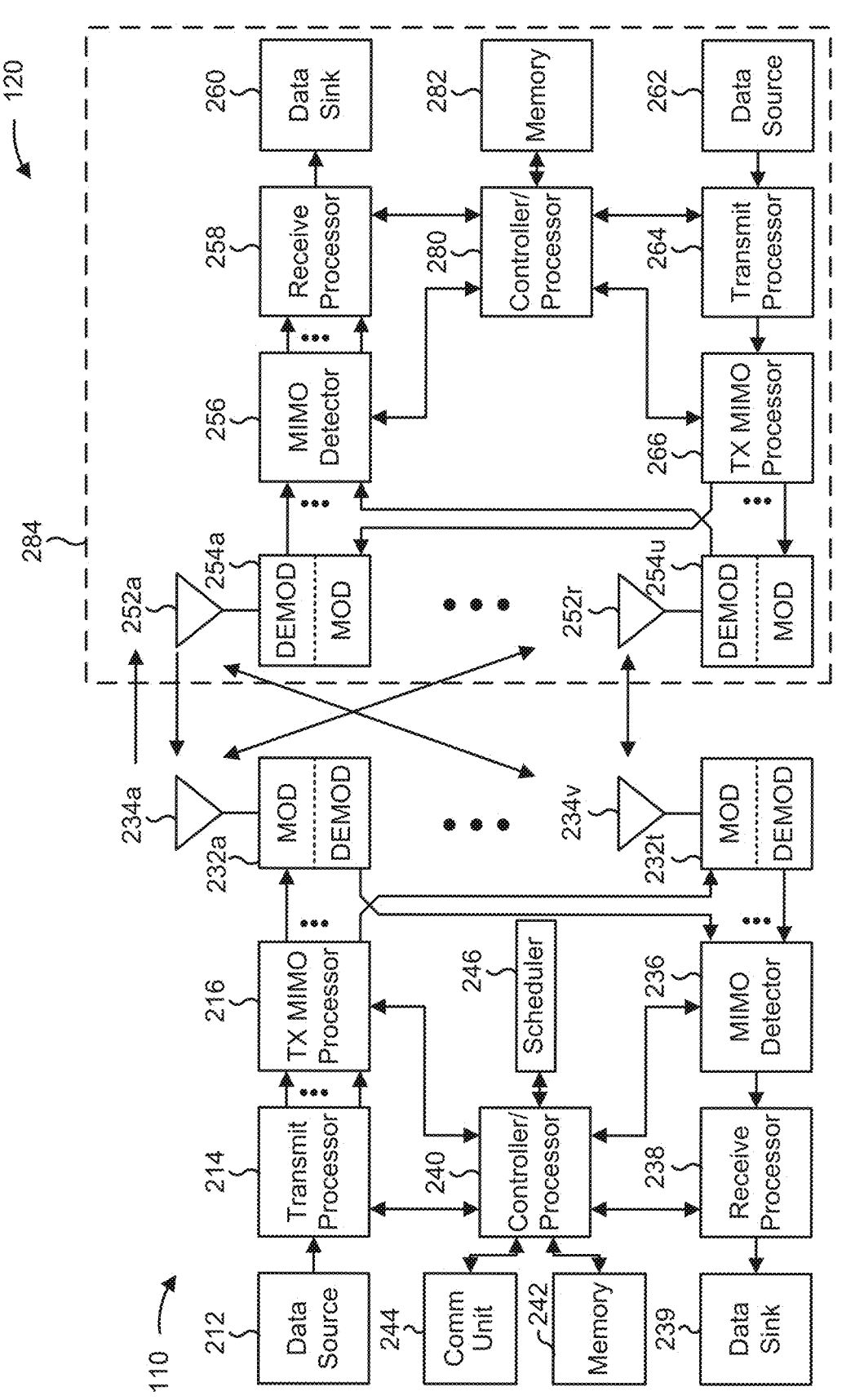
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232a through 232t, where t≥1), a set of antennas 234 (shown as 234a through 234v, where v≥1), a MIMO detector 236, a receive processor 238, a data sink 239, a controller/processor 240, a memory 242, a communication unit 244, and/or a scheduler 246, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more modulation and coding schemes (MCSs) for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, and/or a memory 282, among other examples. One or more of the components of the UE 120 may be included in a housing 284. In some aspects, one or a combination of the antenna(s)

252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254u may transmit a set of uplink signals (for example, R uplink signals or Uuplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
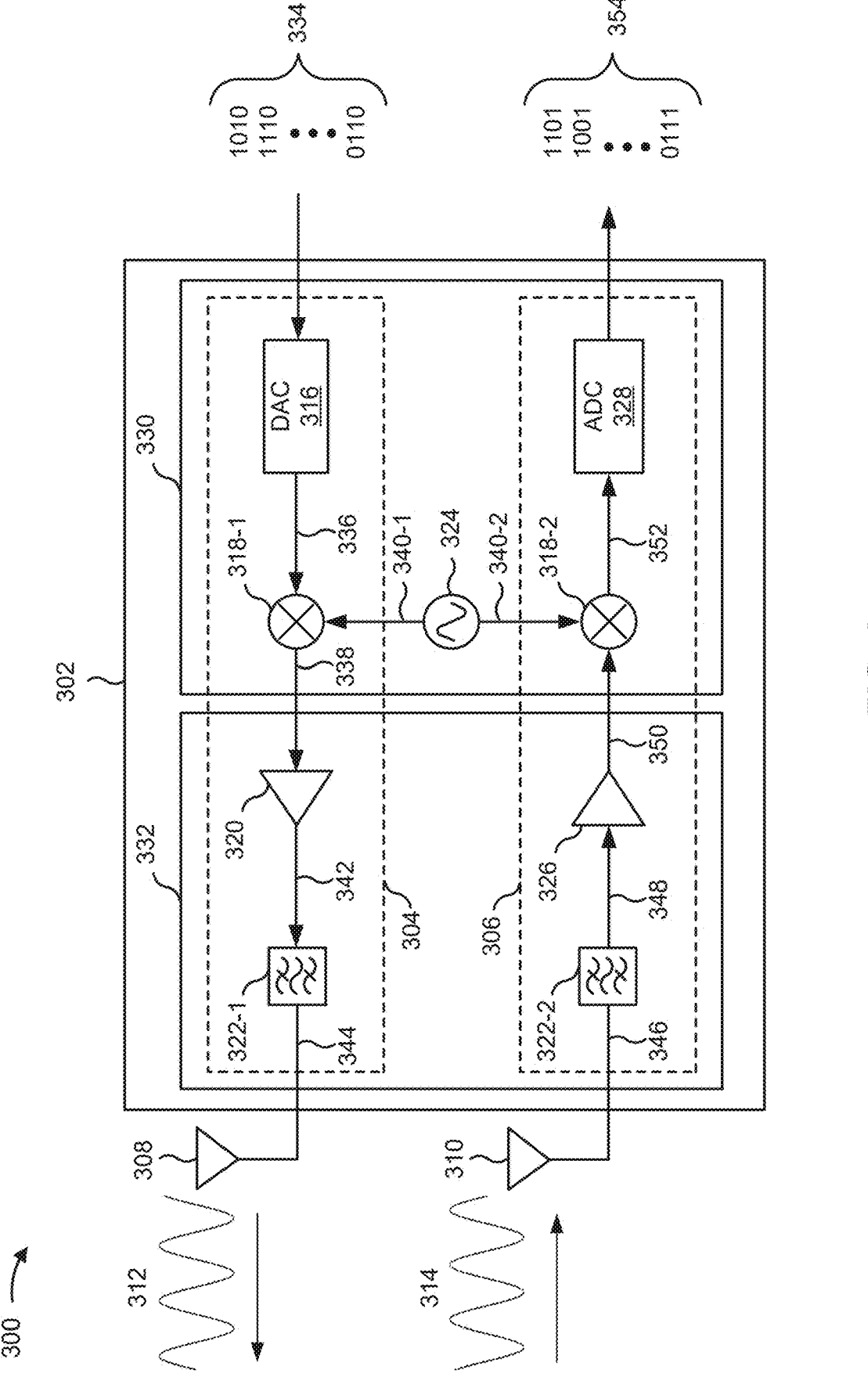
FIG. 3 is a diagram illustrating an example of a wireless transceiver that may be used by a device to communicate in a wireless network, in accordance with the present disclosure.

FIG. 3 is a diagram illustrating an example 300 of a wireless transceiver 302 that may be used by a device to communicate in a wireless network, in accordance with the present disclosure. In some aspects, the wireless transceiver 302 may include, or be included in, one or more components as described with regard to FIG. 2. To illustrate, one or more components of the wireless transceiver 302 may be coupled to, and/or included in, the modem 232 (e.g., one or more of the modems 232a through 232t) and or the modem 254 (e.g., one or more of the modems 254a through 254r).

A wireless transceiver 302 may include a transmitter 304 (shown with a dashed line) and/or a receiver 306 (shown with a dashed line). As shown by the example 300, the transmitter 304 may be coupled to at least a first antenna 308, and the receiver 306 may be coupled to at least a second antenna 310. However, in other examples, the transmitter 304 and the receiver 306 may be coupled to a same antenna through a switch and/or duplexer. In some aspects, the transmitter 304 may generate and transmit an outgoing RF signal 312, and the receiver 306 may receive and process an incoming RF signal 314.

As shown by the example 300, the transmitter 304 may include a digital-to-analog converter 316 (DAC), a first mixer 318-1, a first amplifier 320 (e.g., a power amplifier), and a first filter 322-1 (e.g., a surface-acoustic-wave (SAW) filter). The first mixer 318-1 may be coupled to a local oscillator (LO) 324. In some aspects, the DAC 316 may be coupled to an application processor or another processor associated with the wireless transceiver 302 (e.g., the modem 232 or the modem 254). Other examples of a transmitter may include multiple DACs, multiple mixers, multiple amplifiers, and/or multiple filters that are not shown by the example 300.

The receiver 306 may include a second filter 322-2 (e.g., a SAW filter), a second amplifier 326 (e.g., a low-noise amplifier), a second mixer 318-2, and an analog-to-digital converter 328 (ADC 328). The second mixer 318-2 may be coupled to the LO 324. Alternatively or additionally, the ADC 328 may be coupled to an application processor or another processor associated with the wireless transceiver 302 (e.g., the modem 232 or the modem 254). Other examples of a receiver may include multiple filters, multiple amplifiers, multiple mixers, and/or multiple ADCs that are not shown by the example 300.

In some aspects, the wireless transceiver 302 may be implemented using multiple circuits, such as multiple integrated circuits (ICs). To illustrate, the wireless transceiver 302 may include a transceiver circuit 330 and a radio-frequency front-end (RFFE) circuit 332. Accordingly, components used to form the transmitter 304 and the receiver 306 may be distributed across the multiple circuits. As one example, the transceiver circuit 330 and the RFFE circuit 332 may each include at least some components that form the transmitter 304 and/or at least some components that form the receiver 306. To illustrate, and with regard to the transmitter 304, the transceiver circuit 330 may include the DAC 316 and the first mixer 318-1 of the transmitter 304, and the RFFE circuit 332 may include the first amplifier 320 and the first filter 322-2 of the transmitter 304. Alternatively or additionally, and with regard to the receiver 306, the transceiver circuit 330 may include the second mixer 318-2 and the ADC 328 of the receiver 306, and the RFFE circuit 332 may include the second filter 322-2 and the second amplifier 326 of the receiver 306. In some aspects, the DAC 316 and/or the ADC 328 may be implemented on a circuit separate from the transceiver circuit 330, such as the modem 232 or the modem 254.

In some aspects, the transmitter 304 may generate the outgoing RF signal 312 based at least in part on one or more digital samples 334. A "digital sample", which may alternatively be referred to as a sample, may denote a representation of an analog signal, such as an amplitude representation of the analog signal at a point in time. Each sample of a set of samples that span a time duration may represent the analog signal at a different point in time within the time duration. To illustrate, a first sample may represent the signal at a first point in time, a second sample may represent the signal at a second, different point in time, up to an $n^{th}$ sample that may represent the signal at an $n^{th}$ point in time, where n is an integer and the points in time that span the time duration may be uniformly separated in time. In some aspects, a sample may capture an in-phase/quadrature (I/Q) signal. For example, a sample may include an in-phase component (I-component) value associated with the I/Q signal at the point in time and a quadrature component (Q-component) value at the point in time. A sample associated with an I/Q signal (e.g., that includes an I-component and a Q-component) may alternatively or additionally be referred to as a complex sample.

In some aspects, the DAC 316 may receive, as the digital sample(s) 334, one or more samples associated with a pre-upconversion signal (e.g., a baseband signal or an intermediate frequency (IF) signal). In some aspects, the DAC 316 may receive one or more samples that include DPD as further described with regard to FIG. 5. To illustrate, the DAC 316 may receive one or more samples from a multi-dimensional DPD apparatus as further described with regard to FIG. 13. Using the digital sample(s) 334, the DAC 316 may generate, as an output, an analog pre-upconversion signal 336.

The first mixer 318-1 may receive the analog pre-upconversion signal 336 as input, and generate, as an output, a prefiltered upconverted signal 338 using an LO signal 340-1 provided by the LO 324. The prefiltered upconverted signal 338 may be an RF signal and/or may include some noise and/or unwanted frequencies, such as a harmonic frequency. The first amplifier 320 may receive the prefiltered upconverted signal 338 and generate an amplified prefiltered signal 342.

The first filter 322-2 may receive the amplified prefiltered signal 342 as input and filter the amplified pre-filter transmit signal 342 to generate a filtered transmit signal 344. As part of the filtering process, the first filter 322-2 may attenuate the noise or unwanted frequencies included in the prefiltered upconverted signal 338 and/or the amplified prefiltered signal 342. The transmitter 304 may provide the filtered transmit signal 344 to the first antenna 308 for transmission as the outgoing RF signal 312.

In some aspects, the receiver 306 may receive the incoming RF signal 314 using the second antenna 310. As shown by the example 300, the second antenna 310 may generate a prefiltered receive signal 346. The second antenna 310 may be coupled to the second filter 322-2 such that the second filter 322-2 receives and filters the prefiltered receive signal 346 to remove noise and/or unwanted frequencies. Accordingly, the second filter 322-2 may generate a filtered receive signal 348.

The second amplifier 326 may receive and amplify the filtered receive signal 348 to generate an amplified filtered receive signal 350. Based at least in part on being coupled to the second amplifier 326, the second mixer 318-2 may receive the amplified filtered receive signal 350 and down-convert the amplified filtered receive signal 350 using a LO signal 340-2 (e.g., from the LO 324) to generate a down-converted receive signal 352, which may be a baseband signal or an IF signal. The ADC 328 may receive the downconverted receive signal 352 and generate a digital signal by generating one or more digital samples 354 as output. The one or more digital samples 354 may be processed by a processor associated with the wireless transceiver 302 and/or another processor, such as a processor associated with the modem 232 or the modem 254.

As indicated above, FIG. 3 is provided as an example. Other examples may differ from what is described with regard to FIG. 3. As one example, the wireless transceiver 302 may include one or more feedback mechanisms, such as a feedback path (e.g., a feedback receiver) that provides feedback associated with an output from the first amplifier 320 to a DPD apparatus (e.g., a multi-dimensional DPD apparatus as further described with regard to FIG. 13).

Figure 4:
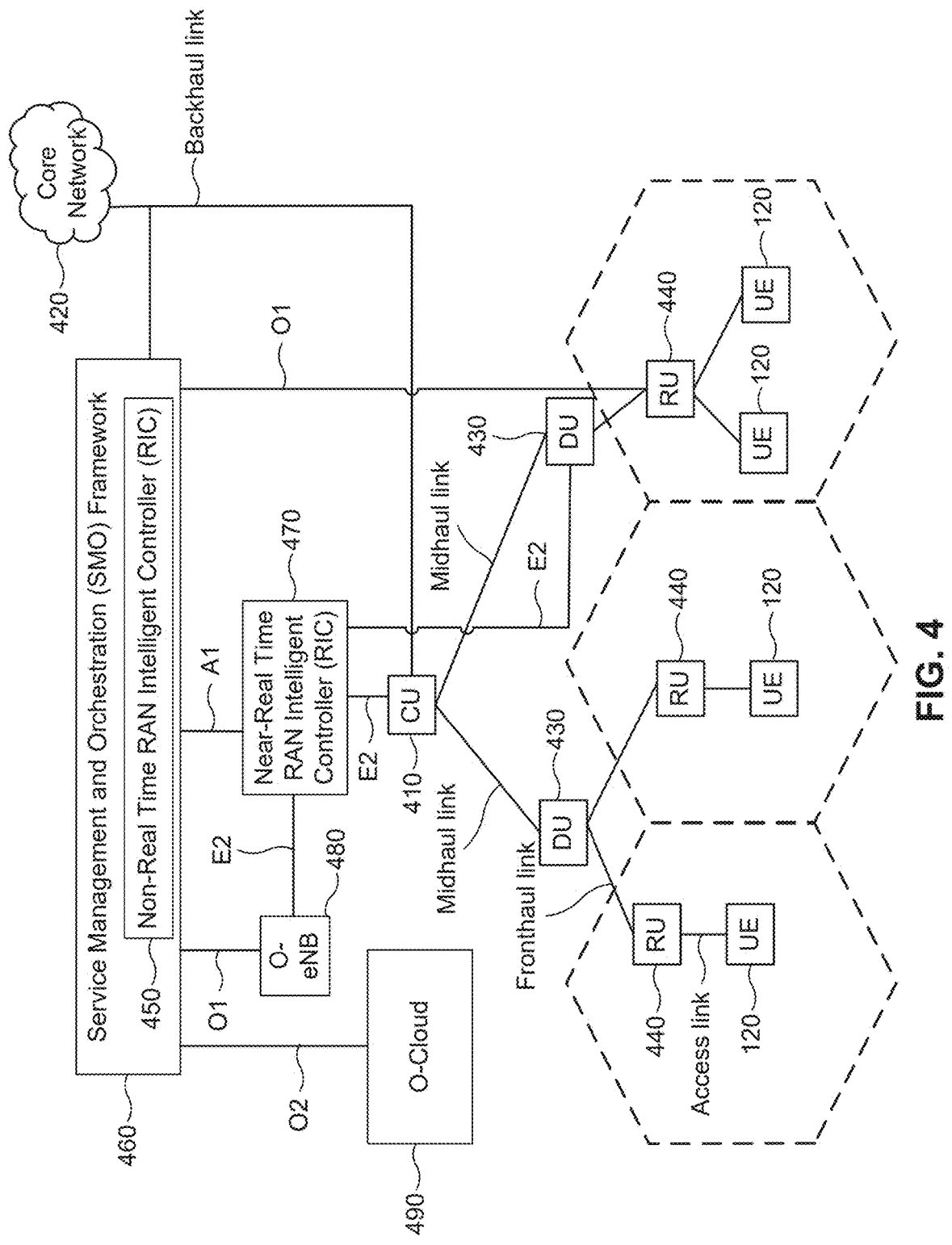
FIG. 4 is a diagram illustrating an example disaggregated base station architecture in accordance with the present disclosure.

FIG. 4 is a diagram illustrating an example disaggregated base station architecture 400 in accordance with the present disclosure. One or more components of the example disaggregated base station architecture 400 may be, may include, or may be included in one or more network nodes (such one or more network nodes 110). The disaggregated base station architecture 400 may include a CU 410 that can communicate directly with a core network 420 via a backhaul link, or that can communicate indirectly with the core network 420 via one or more disaggregated control units, such as a Non-RT RIC 450 associated with a Service Management and Orchestration (SMO) Framework 460 and/or a Near-RT RIC 470 (for example, via an E2 link). The CU 410 may communicate with one or more DUs 430 via respective midhaul links, such as via F1 interfaces. Each of the DUs 430 may communicate with one or more RUs 440 via respective fronthaul links. Each of the RUs 440 may communicate with one or more UEs 120 via respective RF access links. In some deployments, a UE 120 may be simultaneously served by multiple RUs 440.

Each of the components of the disaggregated base station architecture 400, including the CUs 410, the DUs 430, the RUs 440, the Near-RT RICs 470, the Non-RT RICs 450, and the SMO Framework 460, may include one or more interfaces or may be coupled with one or more interfaces for receiving or transmitting signals, such as data or information, via a wired or wireless transmission medium.

In some aspects, the CU 410 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 410 may be deployed to communicate with one or more DUs 430, as necessary, for network control and signaling. Each DU 430 may correspond to a logical unit that includes one or more base station functions to control the operation of one or more RUs 440. For example, a DU 430 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 430, or for communicating signals with the control functions hosted by the CU 410. Each RU 440 may implement lower layer functionality. In some aspects, real-time and non-real-time aspects of control and user plane communication with the RU(s) 340 may be controlled by the corresponding DU 430.

The SMO Framework 460 may support RAN deployment and provisioning of non-virtualized and virtualized network elements. For non-virtualized network elements, the SMO Framework 460 may support the deployment of dedicated physical resources for RAN coverage requirements, which may be managed via an operations and maintenance interface, such as an O1 interface. For virtualized network elements, the SMO Framework 460 may interact with a cloud computing platform (such as an open cloud (O-Cloud) platform 490) to perform network element life cycle management (such as to instantiate virtualized network elements) via a cloud computing platform interface, such as an O2 interface. A virtualized network element may include, but is not limited to, a CU 410, a DU 430, an RU 440, a non-RT RIC 450, and/or a Near-RT RIC 470. In some aspects, the SMO Framework 460 may communicate with a hardware aspect of a 4G RAN, a 5G NR RAN, and/or a 6G RAN, such as an open eNB (O-eNB) 480, via an O1 interface. Additionally or alternatively, the SMO Framework 460 may communicate directly with each of one or more RUs 440 via a respective O1 interface. In some deployments, this configuration can enable each DU 430 and the CU 410 to be implemented in a cloud-based RAN architecture, such as a vRAN architecture.

The Non-RT RIC 450 may include or may implement a logical function that enables non-real-time control and optimization of RAN elements and resources, AI/ML workflows including model training and updates, and/or policy-based guidance of applications and/or features in the Near-RT RIC 470. The Non-RT RIC 450 may be coupled to or may communicate with (such as via an A1 interface) the Near-RT RIC 470. The Near-RT RIC 470 may include or may implement a logical function that enables near-real-time control and optimization of RAN elements and resources via data collection and actions via an interface (such as via an E2 interface) connecting one or more CUs 410, one or more DUs 430, and/or an O-eNB with the Near-RT RIC 470.

In some aspects, to generate AI/ML models to be deployed in the Near-RT RIC 470, the Non-RT RIC 450 may receive parameters or external enrichment information from external servers. Such information may be utilized by the Near-RT RIC 470 and may be received at the SMO Framework 460 or the Non-RT RIC 450 from non-network data sources or from network functions. In some examples, the Non-RT RIC 450 or the Near-RT RIC 470 may tune RAN behavior or performance. For example, the Non-RT RIC 450 may monitor long-term trends and patterns for performance and may employ AI/ML models to perform corrective actions via the SMO Framework 460 (such as reconfiguration via an O1 interface) or via creation of RAN management policies (such as A1 interface policies).

As indicated above, FIG. 4 is provided as an example. Other examples may differ from what is described with regard to FIG. 4.

The network node 110, the controller/processor 240 of the network node 110, the UE 120, the controller/processor 280 of the UE 120, the CU 410, the DU 430, the RU 440, or any other component(s) of FIG. 1, 2, or 3 may implement one or more techniques or perform one or more operations associated with multi-antenna DPD, as described in more detail elsewhere herein. For example, the controller/processor 240 of the network node 110, the controller/processor 280 of the UE 120, any other component(s) of FIG. 2, the CU 410, the DU 430, or the RU 440 may perform or direct operations of, for example, process 1600 of FIG. 16, process 1700 of FIG. 17, or other processes as described herein (alone or in conjunction with one or more other processors). The memory 242 may store data and program codes for the network node 110, the network node 110, the CU 410, the DU 430, or the RU 440. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 410, the DU 430, or the RU 440, may cause the one or more processors to perform process 1600 of FIG. 16, process 1700 of FIG. 17, or other processes as described herein. In some examples, executing instructions may include running the instructions, converting the instructions, compiling the instructions, and/or interpreting the instructions, among other examples.

In some aspects, an apparatus (a network node 110, a transmitter 1002, and/or a modem 1204) includes means for generating a first plurality of digital output streams that are associated with a first sub-array of antenna elements of an antenna array by applying a first A-1 matrix to first one or more input digital streams associated with the first sub-array of antenna elements, the first A-1 matrix being based at least in part on: the first sub-array of antenna elements having a first set of border antenna elements that are adjacent to a second set of border antenna elements of a second sub-array of antenna elements of the antenna array, and the first set of border antenna elements having an isolation level between the second set of border antenna elements, the isolation level satisfying an isolation level threshold that indicates that an antenna crosstalk level between the first set of border antenna elements and the second set of border antenna elements is negligible; means for generating, using the first plurality of digital output streams, first one or more DPD digital output streams that are associated with the first sub-array of antenna elements by applying first DPD to the first plurality of digital output streams, the first DPD being based at least in part on a first power-amplifier-to-antenna-array network; means for generating a second plurality of digital output streams that are associated with the second sub-array of antenna elements by applying a second A-1 matrix to second one or more input digital streams that are associated with the second sub-array of antenna elements, the second A-1 matrix being based at least in part on the isolation level satisfying the isolation level threshold; and/or means for generating second one or more DPD digital output streams that are associated with the second sub-array of antenna elements by applying second DPD to the second plurality of digital output streams, the second DPD being based at least in part on a second power-amplifier-to-antenna-array network that is different from the first power-amplifier-to-antenna-array network. In some aspects, the means for the apparatus to perform operations described herein may include, for example, one or more of a multi-dimensional DPD apparatus 1300, A-1 signal processing logic 1012, and/or A-1 signal processing logic 1208.

In some aspects, an apparatus (e.g., a network node 110, a transmitter 1002, and/or a modem 1204 described below with regard to FIG. 12) includes means for operating in a first mode that is associated with multi-antenna DPD processing, the multi-antenna DPD processing including at least: means for generating, using digital signal processing logic, a plurality of digital output streams by applying an A-1 matrix to one or more input digital streams associated with a first sub-array of antenna elements of an antenna array, the A-1 matrix being based at least in part on: the first sub-array of antenna elements having a first set of border antenna elements that are adjacent to a second set of border antenna elements of a second sub-array of antenna elements of the antenna array, and the first set of border antenna elements having an isolation level between the second set of border antenna elements, the isolation level satisfying an isolation level threshold that indicates that an antenna crosstalk level between the first set of border antenna elements and the second set of border antenna elements is negligible; means for configuring at least a first DPD circuit that is coupled to an output of the digital signal processing logic and configured to generate first one or more DPD digital output streams based at least in part on: the plurality of digital output streams, and a multi-antenna DPD kernel that is based at least in part on a DPD kernel set and processes each respective output digital stream of the plurality of digital output streams as at least one of: a forward digital stream, or a reverse digital stream; means for transmitting the first one or more DPD digital output streams based at least in part on using the first sub-array of antenna elements; and/or means for operating in a second mode that is associated with multi-band DPD processing, the multi-band DPD processing comprising at least: means for generating, using a wideband signal, a first plurality of samples that are a first sub-band of the wideband signal, the first plurality of samples being sampled over a time duration; means for generating, using the wideband signal, a second plurality of samples that are a second sub-band of the wideband signal, the second plurality of samples being sampled over the time duration; and/or means for generating a DPD-processed wideband signal based at least in part on using at least: a second DPD circuit that processes the first plurality of samples and the second plurality of samples to generate a plurality of DPD digital output samples, the second DPD circuit configured with a multi-band DPD kernel, the second DPD circuit including replicate hardware to the first DPD circuit; and/or combining logic that generates the DPD-process wideband signal based at least in part on combining the plurality of DPD digital output samples. In some aspects, the means for the apparatus to perform operations described herein may include, for example, one or more of a multi-dimensional DPD apparatus 1300, A-1 signal processing logic 1012, and/or A-1 signal processing logic 1208. As indicated above, FIG. 4 is provided as an example. Other examples may differ from what is described with regard to FIG. 4.

Figure 5:
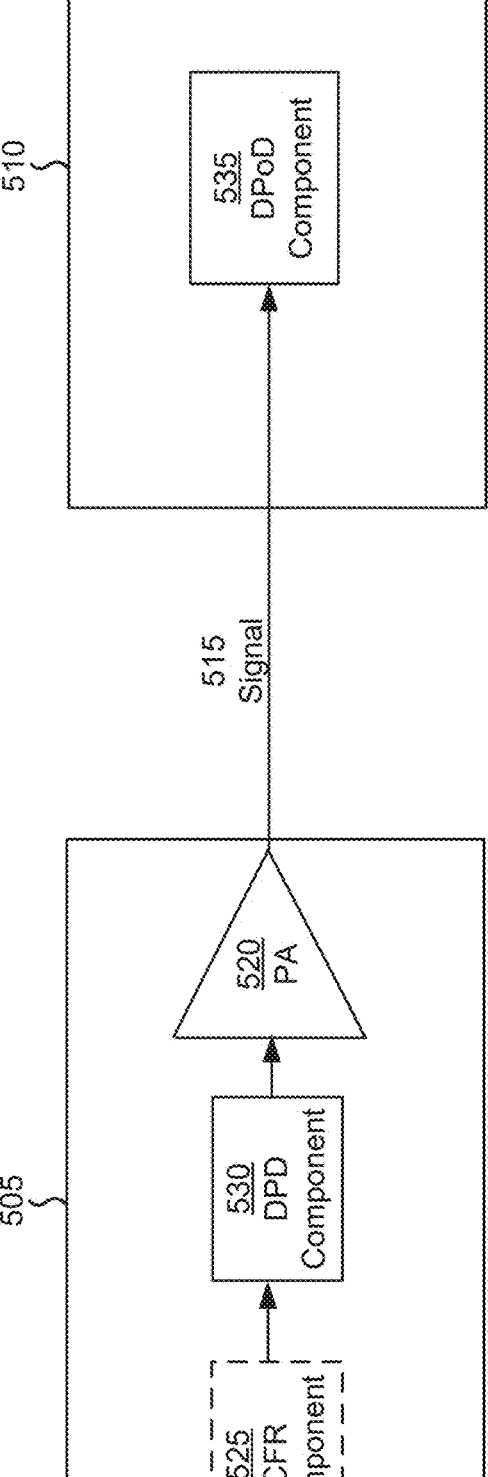
FIG. 5 is a diagram illustrating an example that includes a transmitter that may include digital predistortion (DPD) capabilities, and a receiver that may include digital post-distortion capabilities, in accordance with the present disclosure.

FIG. 5 is a diagram illustrating an example 500 that includes a transmitter 505 that may include DPD capabilities, and a receiver 510 that may include digital post-distortion (DPoD) capabilities, in accordance with the present disclosure. As shown in FIG. 5, the transmitter 505 may communicate with the receiver 510 using a wireless signal 515. In some aspects, a network node 110 (e.g., any network node described with regard to the disaggregated base station architecture 400) may include the transmitter 505 and UE 120 may include the receiver 510. Alternatively, or additionally, the UE 120 may include the transmitter 505 and the network node 110 may include the receiver 510. The block diagrams associated with the transmitter 505 and with the receiver 510 shown by the example 500 have been simplified for discussion purposes. Other examples may include alternative or additional features that have been omitted for clarity. For example, the transmitter 505 may include one or more components of the transmitter 304 described with regard to FIG. 3. Alternatively, or additionally, the transmitter 304 may include one or more components of the transmitter 505. As another example, the receiver 510 may include one or more components of the receiver 306 described with regard to FIG. 3 (or vice versa).

As shown by the example 500, the transmitter 505 may communicate with the receiver 510 based at least in part on transmitting the signal 515 to the receiver 510. The signal 515 may be pre-processed by the transmitter 505 to, among other benefits, reduce a power-back off value associated with transmission of the signal 515 to the receiver 510.

To illustrate, in some communications systems, the transmitter 505 may transmit signals with increasing nonlinearity based at least in part on power increases. For example, the transmitter 505 may include a power amplifier (PA) 520 (which, in some aspects, may be a high-power amplifier) with a limited dynamic range that may distort a transmitted signal as a result of a relatively high peak to average power ratio (PAPR). In some aspects, the PA 520 may be considered the first amplifier 320 as described with regard to FIG. 3. The nonlinear distortion may be an in-band distortion, which affects link performance in connection with mutual information and/or an error vector magnitude (EVM) amount, or an out-band distortion, which causes adjacent channel interference (ACI) and/or results in a high adjacent channel leakage ratio (ACLR) (e.g., the transmitted signal interferes with other signals on neighboring frequency bands, with the ACI and/or ACLR indicating how much the adjacent channel is polluted by a main transmission). To avoid nonlinearity distortions and accompanying interference, the transmitter 505 may apply a power back-off value to reduce transmit power, thereby reducing nonlinearity.

In some aspects, applying a power back-off value may result in reduced power efficiency (e.g., less available transmit power is used to transmit in a channel, thereby reducing range, signal to interference noise ratio, and/or the like). To illustrate, based at least in part on applying the power back-off value, the transmitter 505 may transmit the signal 515 with less power in channel and may dissipate more power as heat, which may result in reduced power efficiency. Accordingly, the transmitter 505 may use one or more pre-transmission signal processing techniques to reduce the power back-off value. For example, the transmitter may utilize crest factor reduction (CFR) processing and/or DPD processing. CFR processing may reduce the dynamic range of the signal, while DPD processing may reduce nonlinear distortion to less than a threshold level with a reduced level of power back-off, thereby increasing power efficiency relative to avoiding nonlinear distortion using only a power back-off. As shown in FIG. 5, the transmitter 505 may thus include a CFR component 525 for performing CFR processing to the signal 515 (e.g., pre-DPD signal conditioning to reduce PAPR in the signal 515 as much as possible and thus reduce the power back-off value). While the transmitter 505 shown by FIG. 5 includes the CFR component 525, other transmitter implementations may exclude the CFR component 525, further indicated through the use of a dashed line. Alternatively or additionally, the transmitter 505 may include a DPD circuit 530 for performing DPD processing to the signal 515 (e.g., to linearize the power amplifier's response). As one example, the DPD circuit 530 may perform DPD processing on a digital signal such that the digital sample(s) 334 of FIG. 3 have been modified to include DPD. To illustrate, the transmitter 304 as described with regard to FIG. 3 may include the DPD circuit 530 prior to the DAC 316.

However, CFR processing consumes additional resources (e.g., bandwidth resources, power resources, computational resources, or the like), and, in some cases, CFR processing may introduce in-band distortion (e.g., EVM distortion) and/or out-band distortion (e.g., ACI distortion). Moreover, although DPD processing may correct an in-dynamic-range nonlinearity effect, nonlinearity may still cause a clipping effect (e.g., resulting from the limited dynamic range). Thus, the effectiveness and/or power efficiency benefit of CFR processing and DPD processing are limited. To account for limitations of CFR and/or DPD processing, the receiver 510 may apply DPoD processing to the signal 515. DPoD processing may be similar to DPD processing but is performed in the receiver 510 rather than in the transmitter 505, and may be directed to processing for only EVM instead of processing for both EVM and ACI. More particularly, DPoD processing may be performed by a DPoD component 535 at the receiver 510, which may include hardware and/or software configured to implement an algorithm configured to remove nonlinear noise that is generated by a known model (e.g., PA clipping). DPoD processing thus may allow for reduced power back-out values and greater power efficiency.

As indicated above, FIG. 5 is provided as an example. Other examples may differ from what is described above.

Figures 6A, 6B:
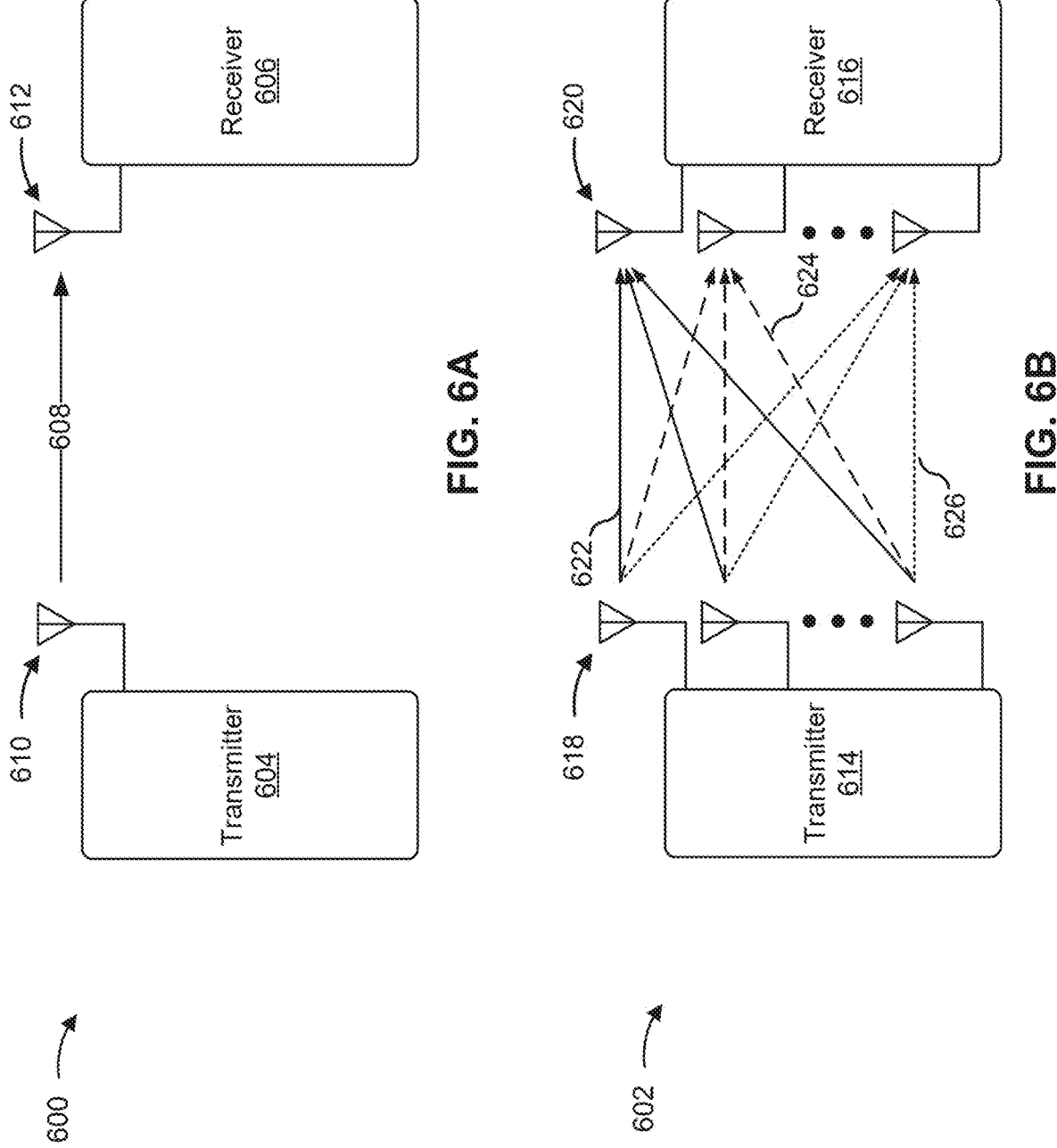
FIGS. 6A and 6B are diagrams illustrating a first example and a second example of a single-input-single-output system and a multiple-input-multiple-output system, respectively, in accordance with the present disclosure

FIGS. 6A and 6B are diagrams illustrating a first example 600 and a second example 602 of a single-input-single-output (SISO) system and a MIMO system, respectively, in accordance with the present disclosure.

SISO systems and MIMO systems are two approaches to wireless communications. The use of a SISO system versus a MIMO system may depend on a variety of operating factors, such as requested data rates, data transfer latency operating conditions, implementation costs, and/or network access demand. A SISO system may provide a cost-effective solution for areas that have low network access demand, while a MIMO system may provide higher data throughput and/or lower data transfer latencies relative to a SISO system.

The first example 600 shown by FIG. 6A is an example SISO system that includes a transmitter device 604 (e.g., a network node 110 and/or a UE 120) that wirelessly communicates with a receiver device 606 (e.g., a network node 110 and/or a UE 120) based at least in part on transmitting a wireless signal 608. In the SISO system, the transmitter device 604 includes a first (single) antenna 610 that is used to transmit the wireless signal 608, and the receiver device includes a second (single) antenna 612 to receive the wireless signal 608. In the SISO system, the transmitter device 604 may communicate a single data stream to the receiver device 606 via the wireless signal.

The second example 602 shown by FIG. 6B is an example MIMO system that includes a transmitter device 614 (e.g., a network node 110 and/or a UE 120) and a receiver device 616 (e.g., a network node 110 and/or a UE 120). In the MIMO system, the transmitter device 614 and the receiver device 616 wirelessly communicate with one another based at least in part on multiple antennas. To illustrate, the transmitter device 614 may include M antennas as shown by reference number 618, and the receiver device 616 may include N antennas as shown by reference number 620, where M and N are integers that may be equal or different from one another (e.g., M=N, M>N, and/or M<N). For clarity, the second example 602 shows a transmitter in communication with a single receiver, but in other examples, the transmitter may serve and/or communicate with multiple receivers using the same antennas.

In some aspects, the transmitter device 614 may transmit multiple data streams via the M antennas based at least in part on using signal diversity, such as spatial diversity and/or polarization diversity. Typically, the number of data streams transmitted by a transmitter device is fewer than a number of antennas. That is, the mapping of the number of data streams to the number of antennas is not 1:1. Rather, each stream may be mapped with a unique set of weighs to all of the available antenna such that all of the available antennas are used to transmit the multiple data streams. To illustrate, the transmitter device 614 may transmit a first data stream 622 (shown with a solid line) using all of the M antenna and a first set of precoding weights. That is, each antenna of the M antenna may transmit a respective signal that carries the first data stream, and the respective signal may be precoded using a particular weight in the first set of precoding weights. Alternatively, or additionally, the transmitter device 614 may transmit a second data stream 624 (shown with a dashed line) using all of the M antenna and a second set of precoding weights and/or a third data stream 626 (shown with a dotted line) using all of the M antenna and a third set of precoding weights. Other examples may include the transmitter device 614 transmitting each data stream using a respective subset of antennas of the M antennas.

"Spatial diversity" may denote spatially diverse signal transmissions. To illustrate, and as described above, the transmitter device 614 may apply precoding to multiple signals that, when summed together, form a first beam at a first carrier frequency, where the first beam propagates in a first direction with a first spatial beamwidth. For example, the precoding may adjust a respective phase and or amplitude of two or more signals that are transmitted by two or more antennas to constructively form the first beam, and the first beam may carry a first data stream. Alternatively, or additionally, the transmitter device 614 may apply precoding to multiple signals that, when summed together, form a second beam at a second carrier frequency (e.g., that may be the same carrier frequency as the first carrier frequency or a different carrier frequency from the first carrier frequency) that propagates in a second direction with a second spatial beamwidth. In some aspects, the second beam may carry a second data stream that is different from the first data stream. The transmitter device 614 may select the second propagation direction and/or the second spatial beamwidth to mitigate and/or avoid overlap with the first propagation direction and/or the first spatial beamwidth. That is, the first beam and the second beam may be spatially diverse based at least in part on propagating in non-overlapping directions with non-overlapping spatial beamwidths (or partially overlapping directions and/or spatial beamwidths).

"Polarization diversity" may denote at least two signals that have diverse polarizations. As one example, an electromagnetic (EM) wave may include an electric field (E-field) and magnetic field (H-field) that propagate along a same propagation line (e.g., a same direction) and are perpendicular to one another. For example, in an XYZ coordinate system that is characterized by an X-plane, a Y-plane, and a Z-plane that are perpendicular to one another, the E-field of the EM wave is separated from the H-field by 90 degrees. Accordingly, if an E-field that propagates along an X-axis with an amplitude that varies along the Y-axis (e.g., within a horizontal X-Y plane), the H-field may also propagate along the X-axis with an amplitude that varies along the Z-axis (e.g., in a perpendicular, vertical X-Z plane). In linear polarization, the E-field and the H-field may propagate without rotating around the propagation line, while in circular polarization, the E-field and the H-field may rotate around the propagation line. In some aspects, the transmitter device 614 may transmit a first signal that is based at least in part on a first carrier frequency and a first polarization. Alternatively, or additionally, the transmitter device 614 may transmit a second signal that is based at least in part on a second carrier frequency (e.g., that may be the same carrier frequency as the first carrier frequency or a different carrier frequency from the first carrier frequency) and a second polarization that is orthogonal to the first polarization. That is, the first signal and the second signal may have diverse polarizations. For example, the E-field of the first signal is orthogonal to the E-field of the second signal, and the H-field of the first signal is orthogonal to the H-field of the second signal. In some aspects, the first signal may carry first data, and the second signal may carry second data that is different from the first data. To illustrate, the transmitter device 614 may include at least a first antenna that is configured to generate a first signal that has a first polarization and a second antenna that is configured to generate a second signal that has a second polarization.

While the above example describes polarization with respect to orthogonal E-fields and orthogonal H-fields, other examples may use polarizations that are sufficiently decorrelated. For instance, two polarizations may be a complex weighted combination of E-field and H-field polarizations. As another example, the two polarizations may be based at least in part on a polarization distribution of the antenna elements in an antenna array. With enough decorrelation between polarizations, same of different spatial direction (e.g., transmit antenna weights), and same or different frequencies may be used for two transmission paths.

The demand for services provided by a wireless network continues to increase as more and more devices access the wireless network. A MIMO system may, in some cases, meet the demand based at least in part on the ability to simultaneously and/or contemporaneously transmit multiple data streams. To illustrate, and as described above, the use of multiple antennas in a MIMO system allow a transmitter device to simultaneously and/or contemporaneously transmit the multiple data streams using different paths (e.g., different spatial paths and/or different polarization paths), resulting in increased data throughput based at least in part on transmitting multiple data streams using diverse signals.

As indicated above, FIGS. 6A and 6B are provided as examples. Other examples may differ from what is described with regard to FIGS. 6A and 6B.

Figure 7:
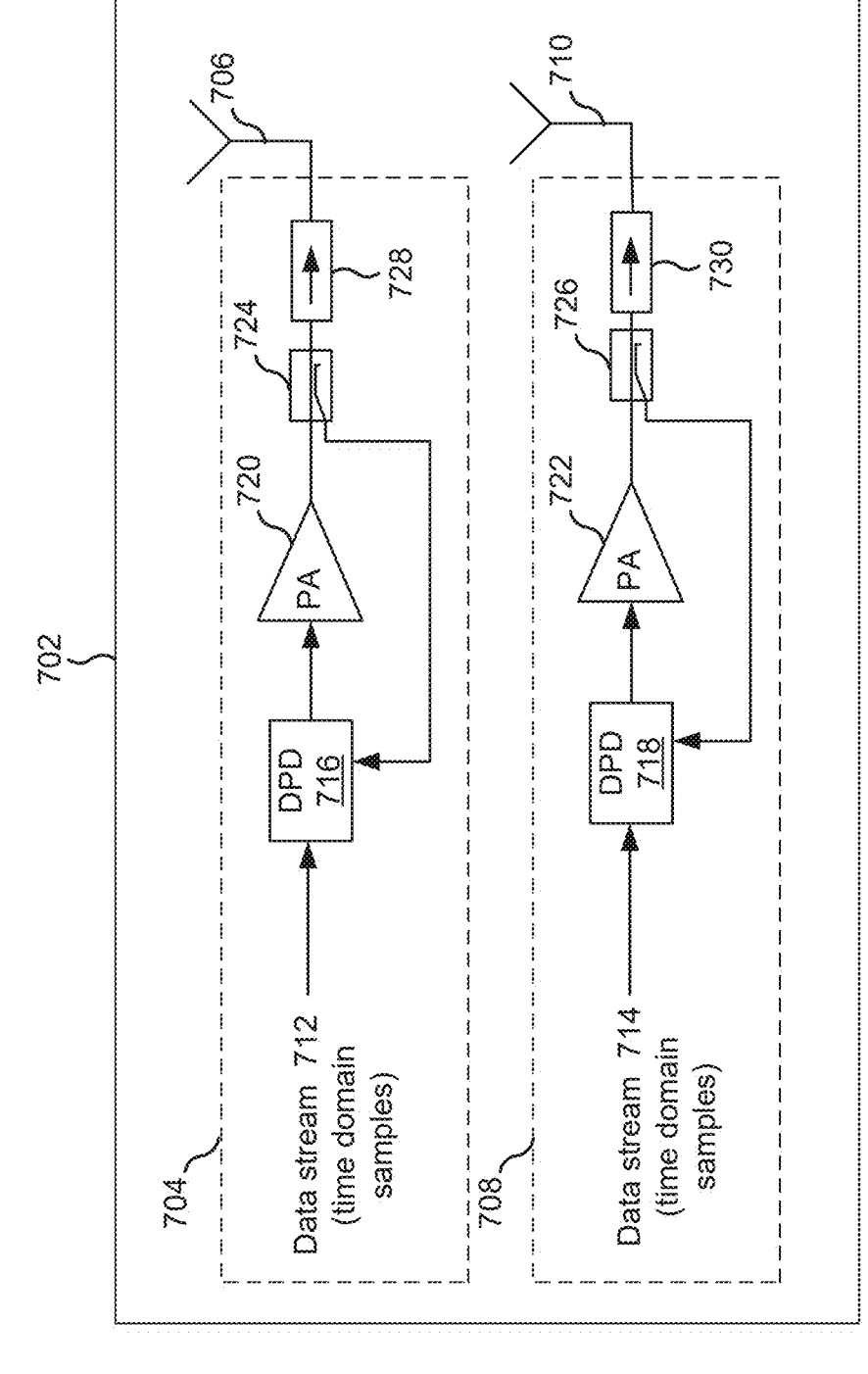
FIG. 7 is a diagram illustrating an example of a transmitter chain, in accordance with the present disclosure.

FIG. 7 is a diagram illustrating an example 700 of a transmitter chain, in accordance with the present disclosure.

As described with regard to FIG. 6, a MIMO systems may transmit multiple data streams using multiple antenna elements where, in some aspects, a number of data streams transmitted by a transmitter device is fewer than a number of antenna at the transmitter device. In some aspects, the transmitter device may generate and/or process each data stream using a respective transmitter chain. To illustrate, in the example 700, a wireless communication device 702 includes a first transmitter chain 704 that drives a first antenna 706 and a second transmitter chain 708 that drives a second antenna 710. The wireless communication device may use the first transmitter chain 704 to transmit a first data stream 712 (shown as being in the form of time domain samples of a first signal carrying data) and the second transmitter chain 708 to transmit a second data stream 714 (shown as being in the form of time domain samples of a second signal carrying data). As shown by FIG. 7, each transmitter chain includes a respective DPD circuit (e.g., DPD circuit 716 and DPD circuit 718), a respective power amplifier (e.g., PA 720 and PA 722), and a respective coupler component (e.g., coupler 724 and coupler 726) that provides feedback to the respective DPD circuit.

Based at least in part on any physical proximity, the first antenna 706 and the second antenna 710 may experience electromagnetic coupling, which may also be referred to as crosstalk. "Crosstalk" may denote a first signal from a first circuit or first hardware (e.g., the antenna 706 and/or the PA 720) unintentionally leaking and/or affecting a second signal at a second circuit and/or second hardware (e.g., the antenna 710 and/or the PA 722), and may lead to signal degradation.

To mitigate crosstalk, the first transmitter chain 704 and the second transmitter chain 708 in the example 700 each include a respective isolator component (e.g., isolator component 728 and isolator component 730). The inclusion of an isolator component in each transmitter chain may allow the respective signal generated by each PA to flow forward towards the respective antenna and may block a reverse signal (e.g., due to crosstalk) from traveling back into the PA. Accordingly, the inclusion of isolator components may mitigate crosstalk between the different transmitter chains and/or different antennas.

As wireless communication techniques advance, a wireless communication device may include more transmitter chains and/or more antenna elements. Increasing a number of transmitter chains and/or increasing a number of antenna elements may also result in an increase in PAs. To illustrate, a first wireless communication device with a first MIMO antenna array that is configured for 5G communications may include 32 or 64 PAs to amplify signals transmitted by the first MIMO antenna array. A second wireless communication device with a second MIMO antenna array that is configured for 6G communications may include 128 or several 100's of antenna elements and a corresponding large number of PAs for driving the antenna elements. While isolators prevent crosstalk between transmitter chains and enable each PA to meet a distortion target that is specified by a communication standard, increasing a number of PAs in a wireless communication device may lead to an increased manufacturing cost of the wireless communication. For example, increasing the number of PAs may also increase a number of isolator components used to mitigate crosstalk. Isolator components may have a higher cost relative to other hardware components, resulting in an increased manufacturing cost that may reduce a cost-effectiveness of the wireless communication device. While removing isolator components in each transmitter chain may reduce a manufacturing cost and/or increase the cost-effectiveness of building the wireless communication device, the removal of isolator components may adversely affect signal quality. To illustrate, removing isolator components from the first transmitter chain 704 and the second transmitter chain 708 may increase signal interference, increase signal distortion, and/or reduce performance (e.g., reduce data throughput, increase data recovery errors, and/or reduce communication reliability) in a wireless network.

Various aspects relate generally to multi-antenna DPD. Some aspects more specifically relate to using a multi-dimensional DPD that receives a dual stream input and corrects for cross-terms in signal distortion (e.g., crosstalk) based at least on a sparse implementation of crosstalk correction. In some aspects, an apparatus may include an antenna array that includes multiple antenna elements, first transceiver hardware that includes first digital signal processing logic and a first plurality of DPD circuits, and second transceiver hardware that includes second digital signal processing logic and a second plurality of DPD circuits. The first digital signal processing logic may be configured to generate a first plurality of digital output streams that are associated with a first sub-array of antenna elements of the antenna array by applying a first A-1 matrix to one or more first input digital streams associated with the first sub-array of antenna elements.

In some aspects, the first A-1 matrix may be based at least in part on mitigating cross talk for the antennas in the first sub-array. In some aspects, the first sub-array of antenna elements may have a first set of border antenna elements that are adjacent to a second set of border antenna elements of a second sub-array of antenna elements of the antenna array, and that the first set of border antenna elements have an isolation level between the second set of border antenna elements that satisfies an isolation level threshold that indicates that an antenna crosstalk level between the first set of border antenna elements and the second set of border antenna elements is negligible. That is, the first A-1 matrix may be constructed based at least in part on the antenna crosstalk level with other sub-arrays being negligible as described below with regard to FIG. 9, which may also be referred to a sparse implementation of the first A-1 matrix as each A-1 matrix may handle providing crosstalk mitigation for a single sub-array rather than the entire array. In other words, there may be some level of isolation between each sub-array either based on the physical position of the sub-arrays relative to each other or some isolation component that provides electrical isolation between the sub-arrays.

In some aspects, the first DPD circuits are coupled and/or connected to an output of the first digital signal processing logic such that the first DPD circuits receive the first plurality of digital output streams from the first digital signal processing logic, and output first one or more DPD digital output streams that are associated with the first sub-array of antenna elements by applying first DPD to the first plurality of digital output streams. Alternatively, or additionally, the first DPD circuits may apply crosstalk preconditioning to mitigate crosstalk between transceiver chains. Accordingly, the first DPD circuits may output one or more DPD-processed streams that include crosstalk correction, and the first DPD circuits may apply the crosstalk correction (e.g., the crosstalk preconditioning) based at least in part on a sparse implementation of the first A-1 matrix as described below.

Alternatively, or additionally, the second digital signal processing logic included in the second transceiver may generate a second plurality of digital output streams that are associated with the second sub-array of antenna elements by applying a second A-1 matrix to second one or more input digital streams that are associated with the second sub-array of antenna elements. In a similar manner as the first A-1 matrix, the second A-1 matrix may be based at least in part on mitigating cross talk for the antennas in the first sub-array. In some aspects, the isolation level between the first set of border antenna elements and the second set of border antenna elements may satisfying the isolation level threshold. That is, the second A-1 matrix may be constructed based at least in part on the antenna crosstalk level being negligible with other subarrays, which may also be referred to a sparse implementation of the second A-1 matrix. In a similar manner as the first plurality of DPD circuits, the second plurality of DPD circuits may be coupled to the second digital signal processing logic and may output second one or more DPD digital output streams that are associated with the second sub-array of antenna elements by applying second DPD to the second plurality of digital output streams. In some aspects, the second plurality of DPD circuit may output, as the second DPD digital output stream(s), one or more DPD-processed streams that include crosstalk correction that is based at least in part on a sparse implementation of the second A-1 matrix.

Particular aspects of the subject matter described in this disclosure can be implemented to realize one or more of the following potential advantages. In some examples, by constructing an A-1 matrix using a sparse implementation that is based at least in part on an isolation level between boarding antenna elements of antenna element sub-arrays, the described techniques can be used to implement a transmitter chain that does not include an isolator component (or includes less isolator components), reduce signal interference, reduce signal distortion, and/or increase performance (e.g., increase data throughput, decrease data recovery errors, and/or increase communication reliability) in a wireless network.

Alternatively, or additionally, using a sparse implementation (e.g., that is based at least in part on an isolation level between bordering antenna elements of antenna element sub-arrays indicating that border antenna element crosstalk is negligible) may reduce a complexity of the A-1 matrix used to apply crosstalk predistortion and, consequently, a multi-dimensional DPD circuit that generates a DPD-processed wideband signal using forward signals and reverse signals generated by the A-1 matrix as described below. To illustrate, the multi-dimensional DPD circuit may be implemented as an integrated circuit (IC), and an increase in complexity of the IC may proportionally increase a number of logic circuits included on the multi-dimensional DPD. To illustrate, a first IC with more complexity relative to a second IC may include more logic circuits, may have a larger size, may have a longer propagation delay through the IC, may consume more power, may be less scalable, and/or may be harder to debug. Accordingly, constructing an A-1 matrix using a sparse implementation that is based at least in part on an isolation level between boarding antenna elements of antenna element sub-arrays may reduce a complexity of the multi-dimensional DPD circuit, resulting in fewer logic circuits, a smaller size, may have a shorter propagation delay through the IC, less power consumption, may be more scalable, and/or may be easier to debug relative to a more complex DPD circuit that is not based at least in part on a sparse implementation of the A-1 matrix.

To illustrate, without using a sparse implementation, the A-1 matrix may be based at least in part on a square of the number of antennas in a multi antenna system (e.g., $N^2$, where N is the number of antennas). An A-1 matrix that mitigates crosstalk among the entire array (e.g., of more than 100 elements) may consume significant area and processing power. Using a sparse implementation with some level of isolation between sub-arrays allows for partitioning the A-1 matrix using M subarrays, where each sub array has K elements, enabling the use of $K^2$ for the number of antennas (e.g., instead of $N^2$), and K=N/M. The use of K elements also allows for the reduction of forward waves and reverse waves used to perform DPD computations as described with regard to FIGS. 8A and 8B. Each corresponding A-1 matrix for each corresponding sub-array may consume a more reasonable amount of resources. Accordingly, the sparse implementation allows for a reduction of a number of antenna used in computations, resulting in reduced processing and routing lines for forward waves and/or reverse waves (shown in FIG. 10, FIG. 11, and FIG. 12) to each transceiver chip, and a reduced number of computations performed by a DPD apparatus.

As indicated above, FIG. 7 is provided as an example. Other examples may differ from what is described with regard to FIG. 7.

Figure 8A:
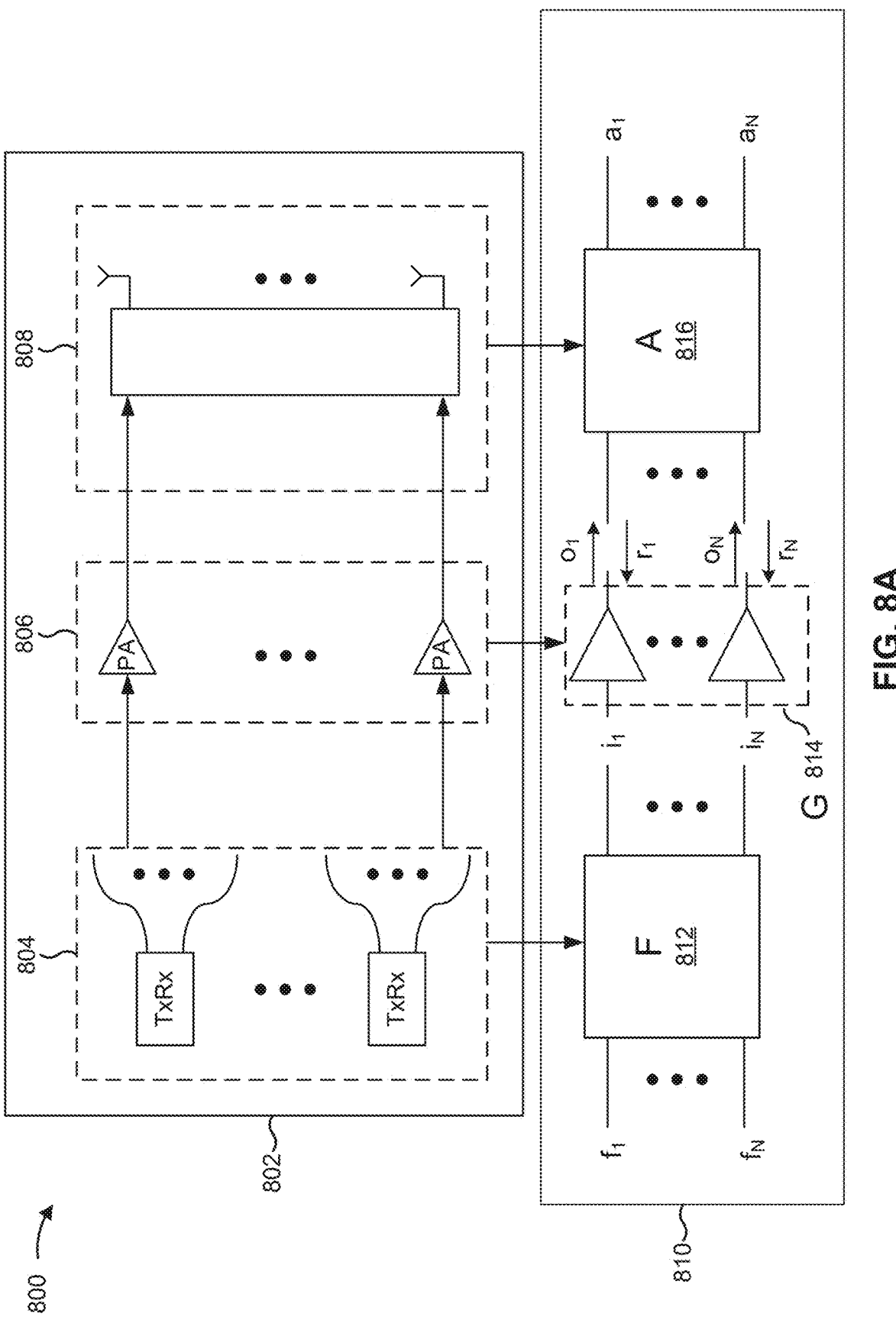
FIGS. 8A and 8B are diagrams illustrating a first example and a second example of a transceiver architecture with digital predistortion, in accordance with the present disclosure.
Figure 8B:
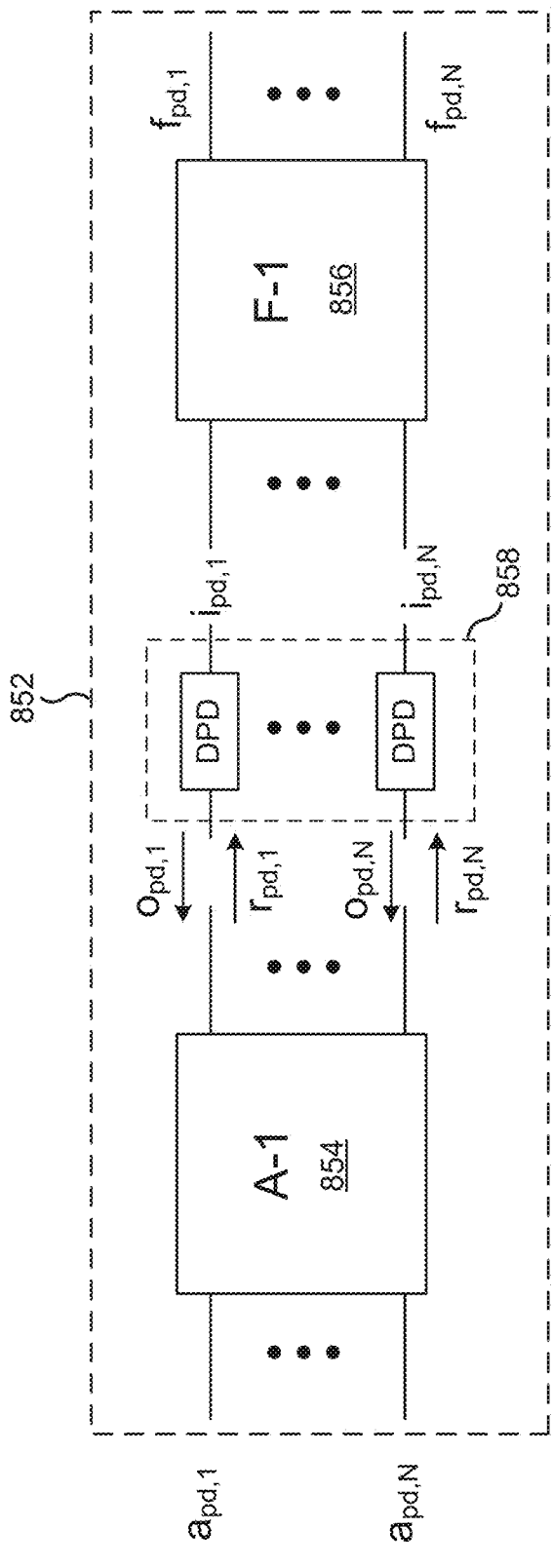

FIGS. 8A and 8B are diagrams illustrating a first example 800 and a second example 850 of a transceiver architecture with DPD, in accordance with the present disclosure. The example 800 shown by FIG. 8A includes a high-level schematic of hardware 802 that may be included in a transmitter chain. The hardware 802 may be partitioned into a feed network 804, one or more power amplifiers 806, and a power-amplifier-to-antenna network 808. In some aspects, the feed network 804 may include any combination of one or more signal conditioning components (e.g., one or more phase shifters, one or more frequency converters, and/or one or more modulators), one or more gain control circuits, one or more frequency filters, and/or one or more low noise amplifiers. Alternatively, or additionally, the power amplifier(s) 806 may be configured as load-sensitive power amplifiers that are connected to and/or drive different antenna elements and/or subsets of antenna elements. The power-amplifier-to-antenna network 808, which may also be referred to an RF front end, may include any combination of one or more antenna switches, power control circuitry, envelope-trackers, impedance matching networks, one or more RF filters, and/or one or more antenna matching networks. An output of the power-amplifier-to-antenna network 808 are shown by FIG. 8A as $a_1$, $a_2$, up to $a_N$.

The hardware 802 may be represented by a front-end block 810. As shown by FIG. 8A, the front-end block 810 may be partitioned into multiple sub-networks, such as a feed-network (F) matrix 812 corresponding to the feed network 804, an array G 814 that corresponds to the power amplifiers 806, and as a power-amplifier-to-antenna-network (A) matrix 816 that corresponds to the power-amplifier-to-antenna network 808. The feed-network matrix 812 and the power-amplifier-to-antenna-network matrix 816 may be 2N×2N matrices, and the array G 814 may be an N dimensional array, where N is an integer. Alternatively, or additionally, the feed-network matrix 812 and/or the power-amplifier-to-antenna-network matrix 816 may be obtained and/or known using scattering parameters (S-parameters). That is, the feed-network matrix 812 and/or the power-amplifier-to-antenna-network matrix 816 may be S-parameter matrices.

Processing performed by each sub-network (and related front-end hardware) may be characterized based at least in part on inputs to each sub-network and outputs generated by each sub-network. To illustrate, the processing performed by the feed network 804 may be represented at least in part on the feed-network matrix 812 (e.g., the F matrix 812) receiving $f_1$ to $f_N$ as input, and generating $i_1$ to $i_N$ as output, where $f_i$ and $i_i$ represent complex baseband waveforms, and i is an integer that ranges from 1 to N. The power amplifiers 806 processing the signals generated by the feed network 804 may be represented based at least in part on the array G 814 receiving $i_1$ to $i_N$ (e.g., generated by the feed network) as input, receiving reverse signals $r_1$ to $r_N$ as input, and generating $o_1$ to $o_N$ as output, where $o_i$ and $r_i$ represent complex baseband waveforms. The reverse signals $r_1$ to $r_N$ may alternatively be referred to as reflected signals and may be based at least in part on crosstalk. Processing performed by the power-amplifier-to-antenna network 808 may be represented based at least in part on the power-amplifier-to-antenna network matrix 816 (e.g., the A matrix 816) receiving $o_1$ to $o_N$ as input, generating $a_1$ to $a_N$ as output, and generating $r_1$ to $r_N$ as output, where $a_j$ represents an output (e.g., a signal output) of the power-amplifier-to-antenna network and j is an integer that ranges from 1 to N.

In some aspects, the forward signals $o_1$ to $o_N$ and the reverse signals $r_1$ to $r_N$ may be modeled as:

$$\begin{pmatrix} \vec{o} \\ \vec{r} \end{pmatrix} = \begin{pmatrix} o_1 \\ \vdots \\ o_N \\ r_1 \\ \vdots \\ r_n \end{pmatrix} = A^{-1} \begin{pmatrix} \vec{a} \\ 0 \end{pmatrix}, \begin{pmatrix} \vec{a} \\ 0 \end{pmatrix} = \begin{pmatrix} a_1 \\ \vdots \\ a_N \\ 0 \\ \vdots \\ 0 \end{pmatrix} \tag{1}$$

-continued $$\vec{o} = \begin{pmatrix} o_1 \\ \vdots \\ o_N \end{pmatrix} = A^{-1}\vec{a} \tag{1}$$

Based at least in part on the representations for the forward signals and the reverse signals, in combination with obtaining the feed-network matrix 812 and/or the power-amplifier-to-antenna-network matrix 816 as S-parameter matrices, digital crosstalk predistortion may be provided through the use of a predistortion network model. In equation (1), A-1 is a 2N×2N matrix that relates the forward signals o and the reverse signals r, after a power amplifier (e.g. array G 814) to forward signals and reverse signals at the antennas. The zeros in the bottom entries of the right hand side of equation (1) mean that the antennas receive a neglectable amount of signal that it transmits from the far field. Antenna coupling between antennas may be included in the A matrix.

S-parameters may be expressed as b=S*a, where S represents the scattering parameters, a is a vector of incident waves, and b is a vector of emitted waves. A 2N×2N S-parameter network may be expressed as (b1 b2)=S*(a1 a2), where b1 is the N dimensional vector of emitted waves at the first N ports, and b2 is the emitted waves at the second N port. (b1 b2) indicates the concatenation of the two vectors, a1 is a N dimensional vector of incident waves at first N ports and a2 is an N dimensional vector of incident waves at the second N ports. S-parameters may be transformed into transmission parameters (T-parameters), and, for a 2N×2N matrix, the transformation may result in expressing incident waves (e.g., forward waves) and emitted waves (e.g., reflected waves and/or reverse waves) at the first N ports as a T-matrix multiplication of the vector of the emitted waves and incident waves on the second N ports of the 2N×2N network, as (a2 b2)=T*(b1 a2). In some aspects, A-1 in equation (1), may be the T-matrix.

The second example 850 shown by FIG. 8B includes a predistortion block 852 that may be used to calculate compensation for crosstalk that is based at least in part on the front-end network block 810 described with regard to FIG. 8A. More particularly, the predistortion network block 852 may be used to perform a step-by-step de-embedding of the front-end hardware 802 (e.g., via the front-end network block 810) to isolate and/or calculate pre-distorted inputs to the feed network 804 that compensate for crosstalk. As shown by FIG. 8B, the de-embedding steps are performed (e.g., via the predistortion network block 852) in a reverse order and/or inverse sequence relative to the front-end network block 810. Accordingly, and as shown by FIG. 8B, the predistortion network model 852 includes an A-1 matrix 854 (e.g., an inverse power-amplifier-to-antenna-network matrix, alternatively referred to as A⁻¹), an F-1 matrix 856 (e.g., an inverse feed-network matrix, alternatively referred to as F⁻¹), and one or more multi-dimensional DPD blocks 858 that correspond to an inverse of the power amplifier(s) (e.g., the array G 814). "Multi-dimensional DPD" may denote a DPD processing unit (e.g., a multi-dimensional DPD apparatus and/or multi-dimensional DPD circuitry) that receives multiple inputs (e.g., multiple digital streams) and processes the multiple inputs to generate one or more outputs.

In a similar manner as described with regard to the front-end network block 810, processing performed by various sub-networks of the predistortion network block 852 may be characterized by inputs to, and outputs from, each sub-network. For example, in an inverse sequential manner relative to the front-end network model 810, the A-1 matrix 854 receives $a_{pd,1}$ to $a_{pd,N}$ as input, $o_{pd,1}$ to $o_{pd,N}$ as input, and outputs $r_{pd,1}$ to $r_{pd,N}$. As shown by FIG. 8B, the one or more multi-dimensional DPD blocks 858 receive $r_{pd,1}$ to $r_{pd,N}$ as input, output $o_{pd,1}$ to $o_{pd,N}$, and output $i_{pd,1}$ to $i_{pd,N}$. The F-1 matrix 856 receives $i_{pd,1}$ to $i_{pd,N}$ as input, and outputs $f_{pd,1}$ to $f_{pd,N}$. The notation pd is used to denote predistortion that may be added to each signal described with regard to the front-end network block 810 of FIG. 8A. To illustrate, $f_{pd,i}$ represents a feed network predistortion signal and $i_{pd,i}$ represents a predistortion input signal to a power amplifier. Based at least in part on the operations for the forward waves and the reverse waves described with regard to equation (1) above, the predistortion input to the power amplifier (e.g., $i_{pd,i}$) may be calculated as:

$$i_{pd,i} = G^{-1}(o_{pd,i}, r_{pd,i}), \forall i \in [1, \dots, N] \tag{2}$$

where $G^{-1}$ may be represented as:

$$G^{-1}(o, r) = \sum_{k=1}^{K} w_k g_k^{-1}(o, r) \text{ and:} \tag{2a}$$

$$\begin{pmatrix} \overrightarrow{f_{pd}} \\ 0 \end{pmatrix} = \begin{pmatrix} f_{pd,1} \\ \vdots \\ f_{pd,N} \\ 0 \\ \vdots \\ 0 \end{pmatrix} = F^{-1}\begin{pmatrix} \overrightarrow{i_{pd}} \\ 0 \end{pmatrix}, \begin{pmatrix} \overrightarrow{i_{pd}} \\ 0 \end{pmatrix} = \begin{pmatrix} i_{pd,1} \\ \vdots \\ i_{pd,N} \\ 0 \\ \vdots \\ 0 \end{pmatrix} \tag{3}$$

In the above example, equation (2) is based at least in part on using a dual input memory polynomial model of a DPD to represent the processing by one or more multi-dimensional DPD models 858. More particularly, equation (2) may be used to derive a DPD kernel that adds predistortion to correct for crosstalk between antenna elements in a sub-array. In some aspects, the equation (2) may be based at least in part on a sparse implementation of an A-1 matrix as described with regard to FIG. 9. $i_{pd,i}$ may be an inverse gain function of the forward signal o and reverse signal r that are output signals of the PA system (e.g., the multi-dimensional DPD models 858), for each line-up. The inverse gain function may be modeled as a memory polynomial, a generalized memory polynomial (GMP), a decomposed vector rotation (DVR) kernel model, or any other kernel model. In the case that the inverse gain is modelled as a kernel function, then the inverse gain may be expressed the complex weighted sum of kernel function contributions (2a), where $w_k$ in the equation 2a is a weight. As described below, the inverse gain function may be implemented as a cascade of different kernel models and/or one or more LUT based components as described below.

As indicated above, FIGS. 8A and 8B are provided as examples. Other examples may differ from what is described with regard to FIGS. 8A and 8B.

Figure 9:
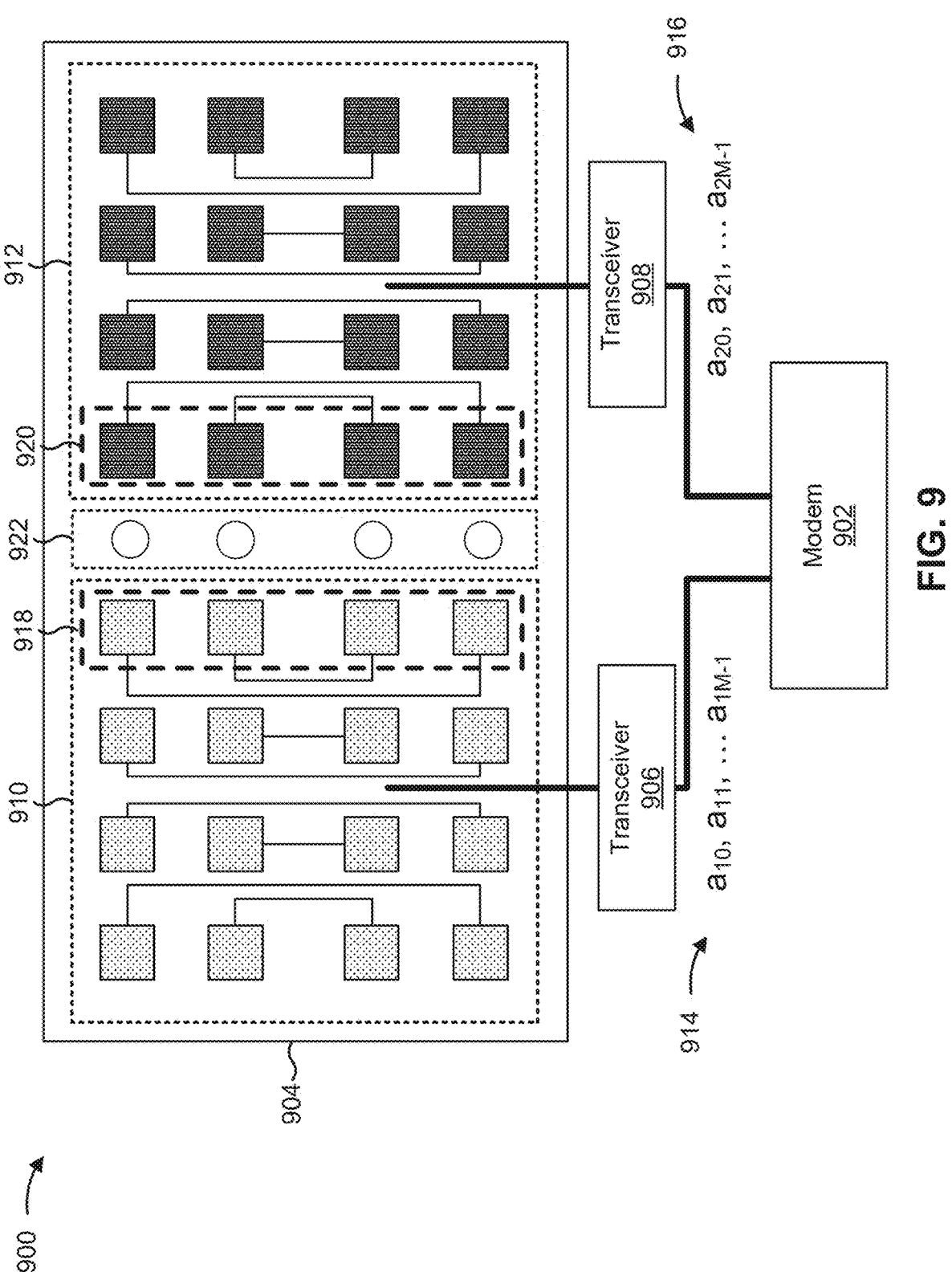
FIG. 9 is a diagram illustrating an example of sparse implementation modeling, in accordance with the present disclosure.

FIG. 9 is a diagram illustrating an example 900 of sparse multi-antenna DPD implementation, in accordance with the present disclosure.

The example 900 shown by FIG. 9 includes a modem 902 that drives transmissions by an antenna array 904 based at least in part on a first transceiver 906 and a second transceiver 908. As shown by FIG. 9, each transceiver may be coupled to and/or drive a respective sub-set of antenna elements included in the antenna array. To illustrate, the antenna array 904 may include 2M antenna elements that are partitioned into a first sub-array 910 and a second sub-array 912. The first sub-array 910 may include a first set of M antenna elements (shown in a light dotted pattern) of the 2M antenna elements and the second sub-array 912 may include a second set of M antenna elements (shown in a heavy dotted pattern) of the 2M antenna element. The first transceiver 906 may drive the first sub-array 910 using a first set of signals 914 (shown as $a_{10}$ to $a_{1M-1}$) and the second transceiver 908 may drive the second sub-array 912 using a second set of signals 916 (shown as $a_{20}$ to $a_{2M-1}$).

In some aspects, the first transceiver 906 and the second transceiver 908 may be configured to apply digital crosstalk predistortion to the first set of signals 914 and the second set of signals 916, such as through the use of signal processing logic that applies an A-1 matrix to one or more input signals. In other aspects, the modem 902 may apply the digital crosstalk predistortion to the first set of signals 914 and the second set of signals 916.

In an example, the A-1 matrix applied by the first transceiver 906 and/or modem 902 may apply digital crosstalk predistortion for the first sub-array 910 (e.g., to compensate for crosstalk between elements of the first sub-array 910). The A-1 matrix applied by the second transceiver 908 and/or modem 902 may apply digital crosstalk predistortion for the second sub-array 912 (e.g., to compensate for crosstalk between elements of the second sub-array 912). Isolation between the first sub-array 910 and the second sub-array 912 achieved either via positioning of elements or via components positioned to provide electrical isolation between the first sub-array 910 and the second sub-array 912 may result in sufficient mitigation of cross talk between bordering elements from each of the first sub-array 910 and the second sub-array 912.

In an aspect, the A-1 matrix applied by the first transceiver 906, the second transceiver 908, and/or the modem 902 may be based at least in part on bordering antenna elements in the first sub-array 910 having an isolation level from bordering antenna elements in the second sub-array 912 that makes crosstalk between the first sub-array 910 and the second sub-array 912 negligible. For example, the first sub-array 910 includes a first set of border antenna elements 918 that border the second sub-array 912, and the second sub-array 912 includes a second set of border antenna elements 920 that border the first sub-array 910. In some aspects, the A-1 matrix applied to the first set of signals 914 may be based at least in part on the isolation level between the first set of border antenna elements 918 and the second set of border antenna elements satisfying an isolation level threshold that indicates that an antenna crosstalk level between the first set of border antenna elements and the second set of border antenna elements is negligible. That is, the A-1 matrix may be based at least in part on a sparse implementation that simplifies a crosstalk model such that the A-1 matrix corrects for crosstalk between the antenna elements connected to a same transceiver. To illustrate, a first A-1 matrix may apply crosstalk predistortion that mitigates crosstalk between the antenna elements in the first sub-array 910, and a second A-1 matrix may apply crosstalk predistortion that mitigates crosstalk between the antenna elements in the second sub-array 912. The first A-1 matrix and the second A-1 matrix may not correct for crosstalk between the first set of border antenna elements 918 and the second set of border antenna elements 920 based at least in part on the simplification and/or assumption that the isolation level between the first set of border antenna elements 918 and the second set of border antenna elements 920 is negligible (e.g., satisfies the isolation level threshold). In some aspects, the antenna array 904 may achieve the isolation level based at least in part on including extra isolation between the bordering antenna elements, such as by including one or more spacers and/or standoff insulators (shown by reference number 922) between the first set of border antenna elements 918 and the second set of border antenna elements 920, such as plastic spacers, ceramic standoffs, glass standoffs, polymer (e.g., Teflon) insulators, and/or air gaps.

In some aspects, achieving an isolation level between bordering antenna elements (e.g., an isolation level that satisfies an isolation level threshold that indicates crosstalk is negligible) or between elements of different sub-arrays may be based at least in part on configuring the bordering antenna elements with a radiation antenna pattern that directs more radiation energy (e.g., 50%, 75%, 80%, and/or 95%) in the direction of the normal vector to the array plane, which may also be referred to as a directive radiation pattern. Configuring border antenna elements with a directive radiation antenna pattern may reduce antenna coupling such that the isolation level between border antenna elements satisfies the isolation level threshold. Alternatively, or additionally, each antenna element in a sub-array may be configured with a directive radiation pattern and/or a respective gradient of the directive radiation pattern. An example of respective gradients of the directive radiation pattern may include one or more centrally located antenna elements in a sub-array being configured with a first radiation pattern that directs a lesser amount of radiation energy in the direction of the normal vector to the array plane relative to border antenna elements in the sub-array being configured with a second radiation pattern that directs more radiation energy in the direction of the normal vector to the array plane. Antenna elements in between a border antenna element and a central element may use a respective directive radiation pattern that direct an intermediate amount of energy in the direction of the normal vector to the array plane (e.g., less directivity for antenna elements that are located closer to a center of the sub-array, and more directivity for antenna element(s) that are located closer to a border antenna element). "Level of directivity" may denote an amount of energy in the direction of the normal vector to the array plane, where a higher level of directivity indicates a larger amount of energy and a lower level of directivity indicates a lesser amount of energy.

Alternatively, or additionally, the isolation level between bordering antenna elements or between elements of different sub-arrays may be achieved based at least in part on including and/or positioning a metal structure around each sub-array to isolate the sub-arrays from one another and/or to mitigate antenna coupling. For example, a metal structure may include partitions that are positioned on the sides of a sub-array and extend outward away from an antenna array. The metal structure may be open (e.g., void of structure) on top of the antenna elements of the sub-array to avoid blocking transmissions from each antenna element. To illustrate, the metal structure may be formed in the shape of a rectangular box that is positioned around a perimeter of the sub-array of antenna elements and has an open top. In some aspects, the metal structure may be implemented as a solid metal structure, while in other aspects, the metal structure may be implemented as a mesh structure that includes openings. A size of the openings may be based at least in part on a wavelength such that each opening in the mesh structure is smaller than an electrical wavelength (e.g., the opening is smaller than a fraction of the wavelength) so that the mesh structure behaves like a solid metal surface for some wavelengths in regards to providing isolation between antenna elements. In some aspects, the metal structure may be connected to a ground plane in one or multiple locations. That is, the metal structure may include one or multiple connections to the ground plane.

As described herein, a sparse implementation of an A-1 matrix may be based at least in part on an implementation in which border antenna elements within the sub-array of antenna elements have an isolation level that satisfies an isolation level threshold that indicates crosstalk between border antenna elements in different sub-arrays is negligible. That is, the implementation is based at least in part on the crosstalk being low enough (e.g., indicated by the isolation level threshold) to disregard in calculations as described above. Alternatively, or additionally, the sparse implementation of an A-1 matrix may be based at least in part on a signal leakage level from any antenna element in a first group of antenna elements to any antenna element in a second group of antenna elements groups satisfying a signal leakage threshold, where the signal leakage threshold indicates that signal leakage is below a specified bound (e.g., a specified limit). To illustrate, for a multi-antenna system, an electromagnetic transfer from one antenna element to another antennal element may be described by a matrix of complex transfers coefficients (e.g., a matrix A of complex transfer coefficients). When the subsets of antenna elements in the matrix A have a signal transfer strength that satisfies the signal leakage threshold (e.g., for any antenna element in a first subset of antenna elements to any other antenna element in any other subset of antenna elements), the transmitted signal distortion may be negligible, and the matrix A and the inverse matrix (e.g., A-1) may be implemented as sparse matrices.

As indicated above, FIG. 9 is provided as an example. Other examples may differ from what is described with regard to FIG. 9. For example, while FIG. 9 shows two transceiver corresponding to two sub-arrays, the implementation may include more than two transceivers coupled to corresponding further sub-arrays. In addition, each transceiver such as the first transceiver 906 may be implemented in a dedicated IC (e.g., each of the first transceiver 906 and the second transceiver 908 are implemented in separate ICs). In this case there may be an array or tile of transceiver ICs coupled to one or more modems such as modem 902 integrated into a system where each transceiver chip drives a respective sub-array. Other implementations with difference integrated circuit combinations are possible and described in further detail below.

Figure 10:
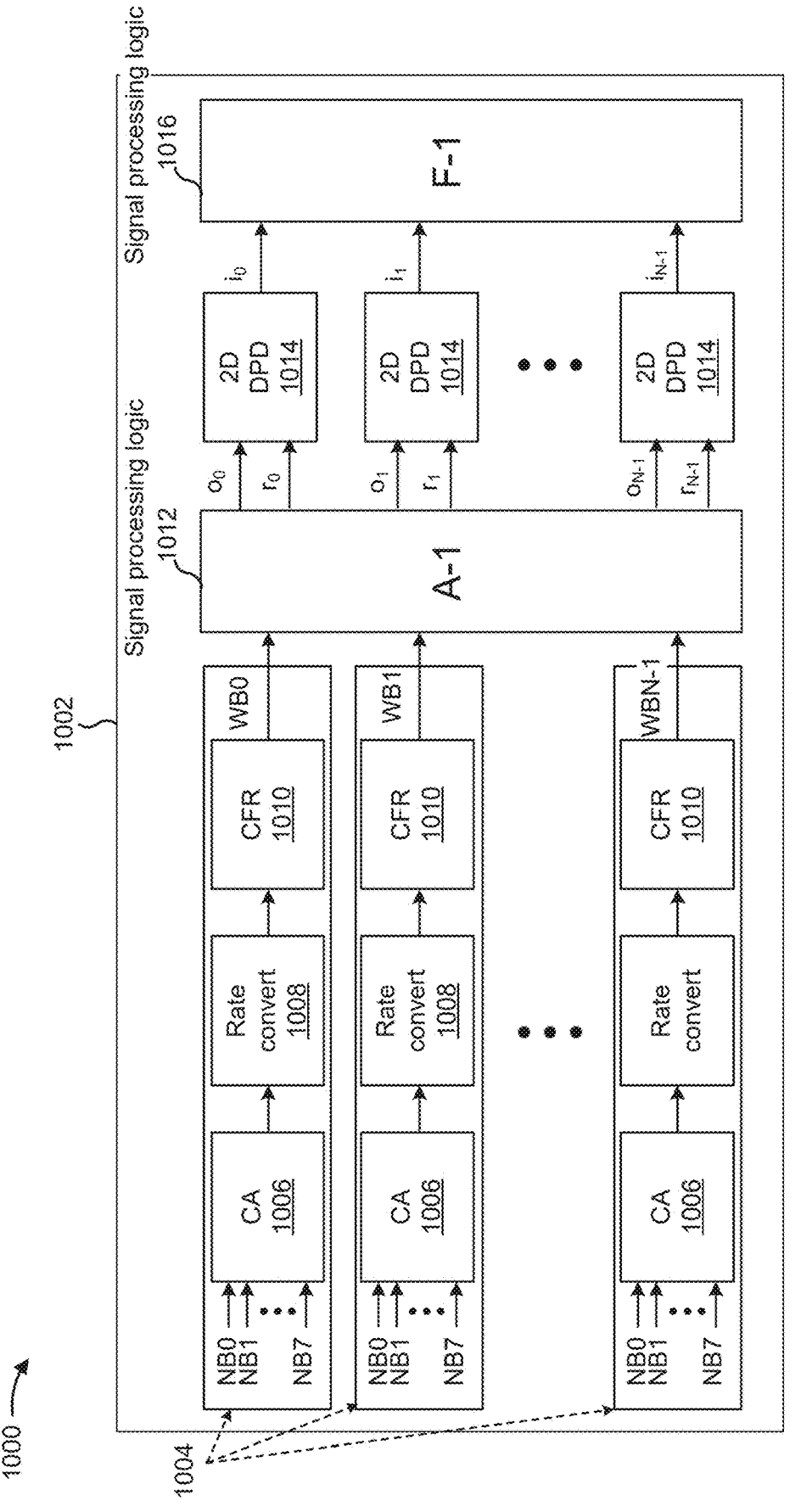
FIG. 10 is a diagram illustrating an example of a transmitter that may apply crosstalk predistortion, in accordance with the present disclosure.

FIG. 10 is a diagram illustrating an example 1000 of a transmitter 1002 that may apply crosstalk predistortion, in accordance with the present disclosure.

The transmitter 1002 shown by FIG. 10 may be a stand-alone transmitter or include in a transceiver, such as transceiver 302 described with regard to FIG. 3. In some aspects, the transmitter 1002 may drive a sub-array of antenna elements that are included in an antenna array, such as the first sub-array 910 or the second sub-array 912 described with regard to FIG. 9 (e.g., and the transmitter 1002 may form part of the transceiver 906 or the transceiver 908 of FIG. 9). The transmitter 1002 includes N multiple wideband signal processing paths as shown by reference number 1004. Each wideband signal processing path includes a respective carrier aggregation (CA) component 1006 that is configured to aggregate up to eight component carriers (shown as NB0, NB1, up to NB7). For instance, a first CA component 1006 of a first wideband signal processing path shown by reference 1004 may aggregate a first set of component carriers to generate a first wideband signal (WB0), a second CA component 1006 of a second wideband signal processing path shown by reference 1004 may aggregate a second set of component carriers (e.g., different from the first set of component carriers) to generate a second wideband signal (WB1), and an N-th CA component 1006 of an N-th wideband signal processing path shown by reference 1004 may aggregate an N-th set of component carriers to generate an N-th wideband signal (WBN−1). Each wideband signal may pass through one or more signal conditioning components, such as a rate converter 1008 and/or a CFR 1010.

The transmitter 1002 may include A-1 signal processing logic 1012 that implements an A-1 matrix that applies crosstalk preconditioning to each wideband signal. Examples of signal processing logic may include logic circuits, such as an AND gate, an OR gate, a NAND gate, a NOR gate, an exclusive OR gate, an exclusive NOR gate, a buffer gate, and/or an inverter. The A-1 signal processing logic 1012 may apply the crosstalk preconditioning (e.g., via the to the wideband signals as described with regard to FIGS. 8A and 8B. In some aspects, the A-1 signal processing logic 1012 may be based at least in part on a sparse implementation that models the crosstalk preconditioning based at least in part on crosstalk within the sub-array of antenna elements driven by the transmitter 1002. Alternatively, or additionally, the sparse implementation used to model the crosstalk preconditioning may be based at least in part on border antenna elements within the sub-array of antenna elements having an isolation level that indicates cross talk between border antenna elements in different sub-arrays is negligible.

The A-1 signal processing logic 1012 may output a respective forward signal and a respective reverse signal for each wideband signal. For instance, in the example 1000, the A-1 signal processing logic 1012 outputs a forward signal $o_0$ and a reverse signal $r_0$ that are associated with WB0, a forward signal $o_1$ and a reverse signal $r_1$ that are associated with WB1, and a forward signal $o_{N-1}$ and a reverse signal $r_{N-1}$ that are associated with WBN−1. Each forward signal/reverse signal pair may be used as input to a respective DPD circuitry, such as multi-dimensional DPD circuitry that is shown by FIG. 10 as being respective 2D DPD circuitry 1014 for each wideband signal processing path. In some aspects, the A-1 signal processing logic 1012 may be based at least in part on one or more S-parameters, and each S-parameter of the A-1 signal processing logic 1012 may be obtained as part of a calibration procedure and/or stored by the transmitter 1002.

Each 2D DPD circuitry 1014 may apply a multi-antenna DPD kernel to the respective forward signal $o_{N-1}$ and a reverse signal $r_{N-1}$ input to the 2D DPD circuitry 1014. In some aspects, the multi-antenna DPD kernel may be based at least in part on a DPD kernel set, such as the DPD kernel sets described with regard to FIG. 14. As shown by FIG. 10, each 2D DPD circuitry 1014 may generate, by way of the multi-antenna DPD kernel, a respective digital stream that includes a DPD-processed wideband signal that includes crosstalk predistortion. To illustrate, each 2D DPD circuitry 1014 outputs a respective stream shown by FIG. 10 as $i_0$, $i_1$, and $i_{N-1}$. "DPD kernel" may denote a core processing algorithm that performs digital pre-distortion processing that is based at least in part on a DPD algorithm. In some aspects, a DPD kernel may be implemented at least in part in hardware, such any combination of hardware described with regard to the apparatus 1300 of FIG. 13.

In the example 1000, the transmitter 1002 includes an F-1 matrix 1016 that may be implemented using signal processing logic circuits (e.g., feed processing logic) in a similar manner as the A-1 signal processing logic 1012. While the example 1000 includes the F-1 matrix 1016, other examples may not include the F-1 matrix 1016 and/or the signal processing logic circuits that implement the F-1 matrix 1016. The F-1 matrix 1016 may receive the output streams from the respective 2D DPDs as input, and apply feed network predistortion to mitigate signal distortion associated the feed network. In some aspects, the F-1 matrix 1016 may be based at least in part on one or more S-parameters, and each S-parameter of the F-1 matrix 1016 may be obtained as part of a calibration procedure and/or stored by the transmitter 1002.

Constructing an A-1 matrix using a sparse implementation that is based at least in part on an isolation level between boarding antenna elements of antenna element sub-arrays may enable a transmitter chain to not include an isolator component or less isolator components, reduce signal interference, reduce signal distortion, and/or increase performance (e.g., increase data throughput, decrease data recovery errors, and/or increase communication reliability) in a wireless network. Alternatively, or additionally, using the sparse implementation (e.g., that is based at least in part on the isolation level between boarding antenna elements of antenna element sub-arrays indicating that border antenna element crosstalk is negligible) may reduce a complexity of the A-1 matrix used to apply crosstalk predistortion and, consequently, a multi-dimensional DPD circuit that generates a DPD-processed wideband signal using forward signals and reverse signals generated by the A-1 matrix. Reducing the complexity of the A-1 matrix and the multi-dimensional DPD circuit may result in in fewer logic circuits, a smaller chip size, a shorter propagation delay through the logic circuits, less power consumption, a more scalable implementation, and/or an easier debugging system relative to a more complex solutions (e.g., an A-1 matrix and/or a DPD circuit) that is not based at least in part on a sparse implementation of the A-1 matrix. This may enable achieving cost effective solutions for network devices with massive MIMO arrays including 64 or more antenna elements.

As indicated above, FIG. 10 is provided as an example. Other examples may differ from what is described with regard to FIG. 10.

Figure 11:
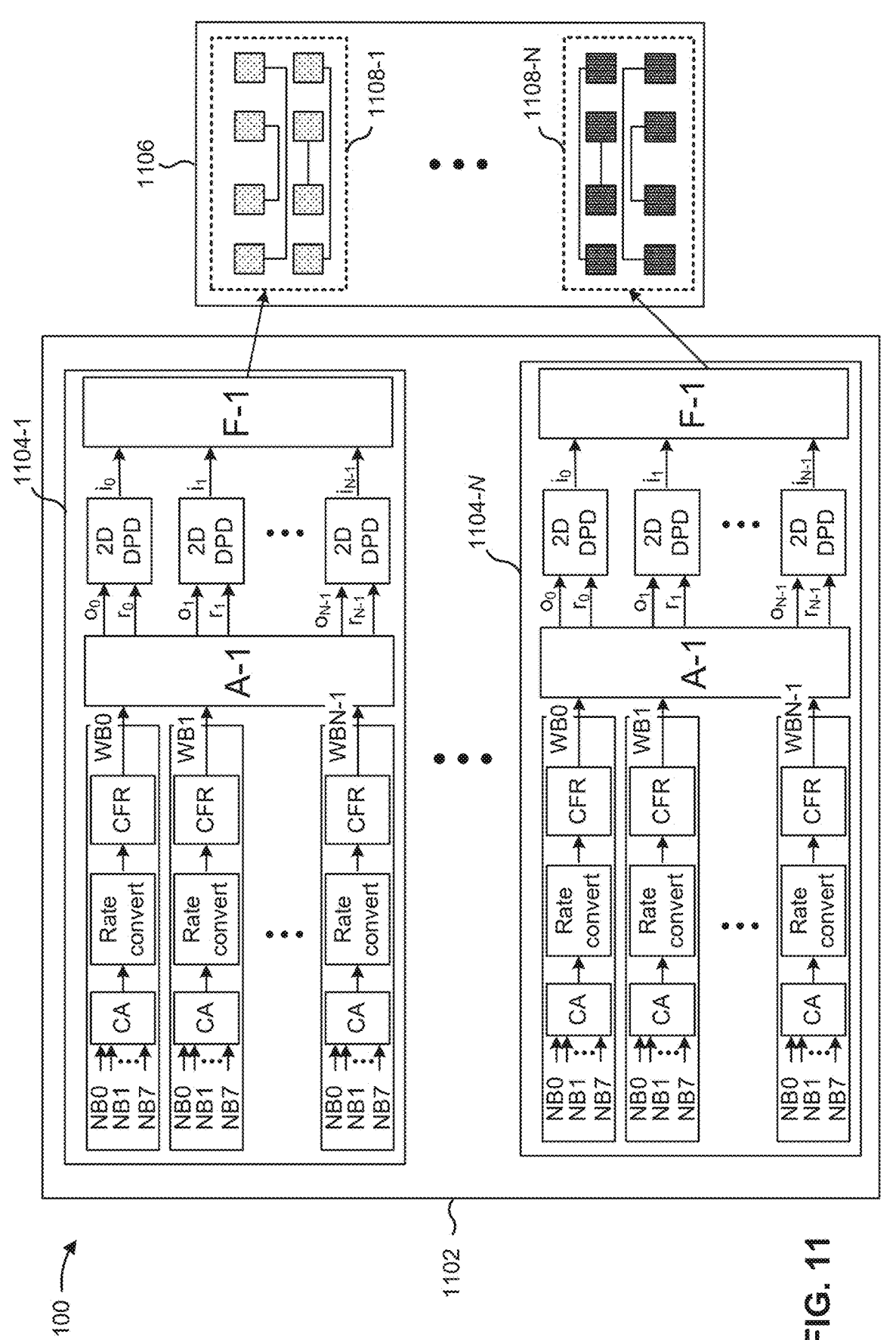
FIG. 11 is a diagram illustrating an example of a transceiver chip, in accordance with the present disclosure.

FIG. 11 is a diagram illustrating an example 1100 of a transceiver chip 1102, in accordance with the present disclosure.

The transceiver chip 1102 may be implemented using electronic hardware, such as an IC, an SoC, and/or logic circuits (e.g., signal processing logic). In some aspects, the transceiver chip 1102 is implemented as a single IC. As shown by FIG. 11, the transceiver chip 1100 may include a plurality of transceiver hardware, shown as transceiver hardware 1104-1 up to transceiver hardware 1104-N. As one example, each transceiver hardware of the plurality of transceiver hardware may be implemented based at least in part on the transmitter 1002 described with regard to FIG. 10. Accordingly, the transceiver hardware 1104-1 up to transceiver hardware 1104-N may include duplicate hardware, such as duplicate DPD circuitry that, in some examples, are implemented based at least in part on a multi-dimensional DPD (e.g., a 2D DPD) as described below with regard to FIG. 13. Alternatively, or additionally, each transceiver hardware may include signal processing logic to apply crosstalk predistortion using a respective A-1 matrix. In some aspects, each respective A-1 matrix may be based at least in part on a respective sub-array of an antenna array that is driven by the respective transceiver hardware and/or a spare implementation that models the crosstalk between respective sub-arrays as being negligible.

To illustrate, the example 1100 includes an antenna array 1106 that includes multiple antenna elements and is coupled to the transceiver chip 1102. In some aspects, the antenna elements of the antenna array 1106 are partitioned into sub-arrays of antenna elements, shown as sub-array 1108-1 up to sub-array 1108-N. As shown by FIG. 11, each sub-array may be coupled to respective transceiver hardware of the plurality of transceiver hardware included in the transceiver chip 1102. That is, each respective transceiver hardware may drive a respective sub-array of the antenna array 1106. To illustrate, the transceiver hardware 1104-1 may drive the sub-array 1108-1 with one or more signals (shown as a first set of WB0 up to WBN−1), and the transceiver hardware 1104-N may drive the sub-array 1108-N with one or more signals (shown as a second set of WB0 up to WBN−1). As described herein, the respective A-1 matrix implemented by each transceiver hardware may be based at least in part on the respective sub-array being driven by the transceiver hardware. Accordingly, the A-1 matrix implemented by the transceiver hardware 1102-1 may be based at least in part on the sub-array 1108-1, and the A-1 matrix implemented by the transceiver hardware 1104-N may be based at least in part on the sub-array 1108-N. The antenna array 1106 may be configured to provide additional isolation between bordering antenna elements of each sub-array relative to isolation between antenna elements in a same sub-array. To illustrate, the antenna array 1106 may include one or more spacers and/or standoff insulators between border antenna elements, such as plastic spacers, ceramic standoffs, glass standoffs, polymer (e.g., Teflon) insulators, and/or air gaps In some aspects, each respective A-1 matrix may be based at least in part on one or more S-parameters, and each S-parameter of the respective A-1 matrix may be obtained as part of a calibration procedure and/or stored by the transceiver chip 1102. Alternatively, or additionally, each respective F-1 matrix may be based at least in part on one or more S-parameters, and each S-parameter of the respective F-1 matrix may be obtained as part of a calibration procedure and/or stored by the transceiver chip 1102.

As indicated above, FIG. 11 is provided as an example. Other examples may differ from what is described with regard to FIG. 11.

Figure 12:
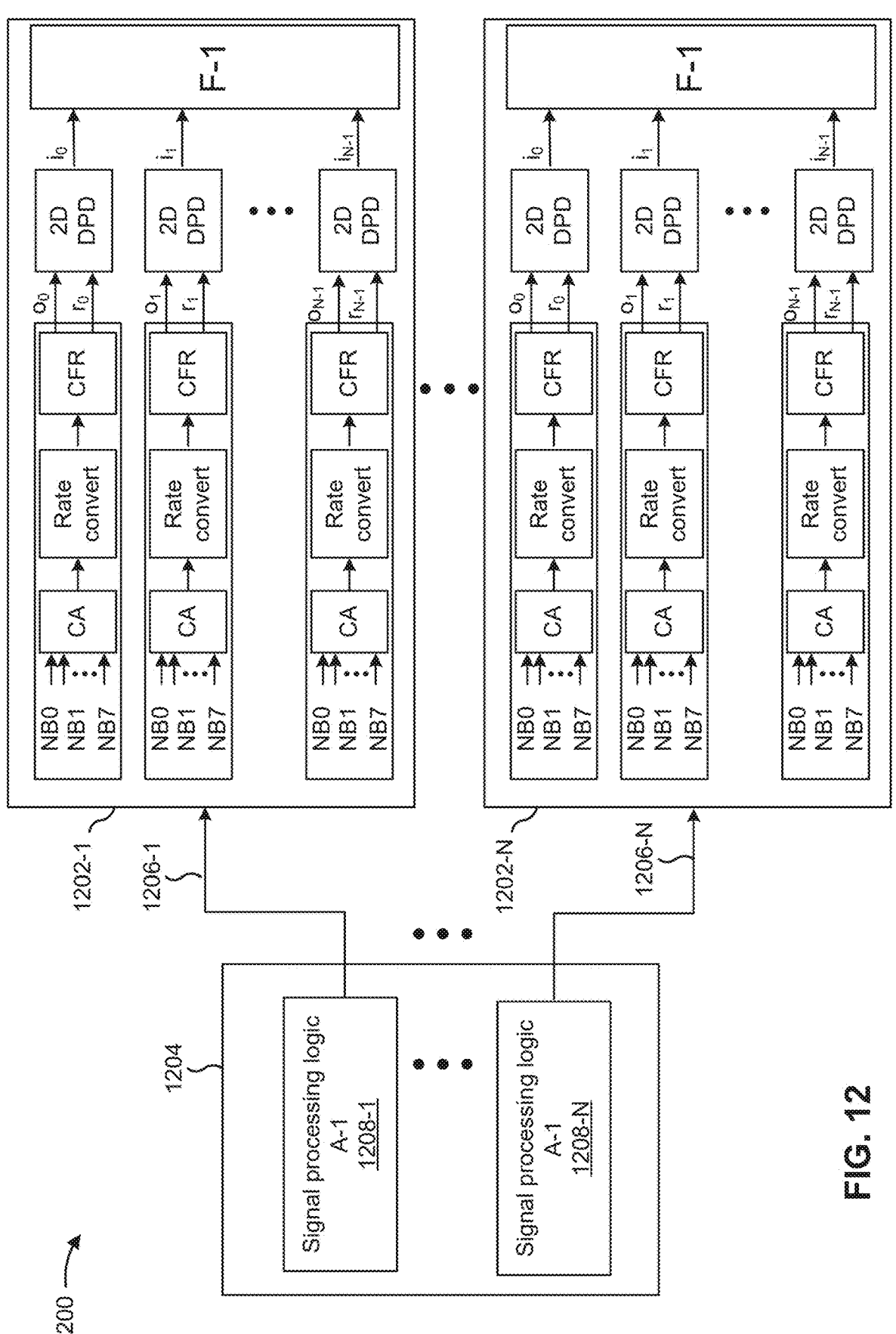
FIG. 12 is a diagram illustrating an example of digital crosstalk predistortion that may be applied at a modem, in accordance with the present disclosure.

FIG. 12 is a diagram illustrating an example 1200 of digital crosstalk predistortion that may be applied at a modem, in accordance with the present disclosure.

Some wireless communication devices may include a modem (e.g., a modulator-demodulator) that coverts binary data into digital signals and/or analog signal for transmission, or vice versa for reception. In some aspects a modem may drive transceiver hardware based at least in part on providing a signal input (e.g., a digital signal, a digital stream and/or an analog signal) to the transceiver for transmission.

To illustrate, the example 1200 includes a set of N transceiver hardware, shown as transceiver hardware 1202-1 to transceiver hardware 1202-N. In a similar manner as described with regard to FIG. 11. The set of N transceiver hardware may be included in a same wireless communication device (e.g., a network node 110) and/or a same IC, and each respective transceiver hardware may drive a respective sub-array of antenna elements of an antenna array. The example 1200 also includes a modem 1204 that may be implemented using a variety of hardware, firmware, software, and/or processing units. Examples include a microprocessor, memory, instructions stored on the memory, a power supply, a modulator, a demodulator, front-end circuitry, one or more ICs, and/or a digital signal processor. As shown by FIG. 12, the modem 1204 may be coupled to each transceiver hardware, shown as coupling 1206-1 to coupling 1206-N, and the coupling may enable the modem 1204 to communicate a respective signal input to the respective transceiver hardware.

In some aspects, the modem 1204 may apply respective crosstalk preprocessing to the respective input signals. To illustrate, the modem 1204 may include signal processing logic and/or programming instructions that implement a respective A-1 matrix (shown as A-1 signal processing logic 1208-1 to A-1 signal processing logic 1208-N) that applies the respective crosstalk preprocessing to the signal inputs in a similar manner as described with regard to the A-1 signal processing logic 1012. In similar manner as described above, each A-1 matrix may be based at least in part on a respective sub-array of an antenna array that is driven by the respective transceiver hardware and/or a spare implementation that models the crosstalk between respective sub-arrays as being negligible. Each respective A-1 matrix may be based at least in part on one or more S-parameters, and each S-parameter of the respective A-1 matrix may be obtained as part of a calibration procedure and/or stored by the modem 1204.

As indicated above, FIG. 12 is provided as an example. Other examples may differ from what is described with regard to FIG. 12.

Figure 13:
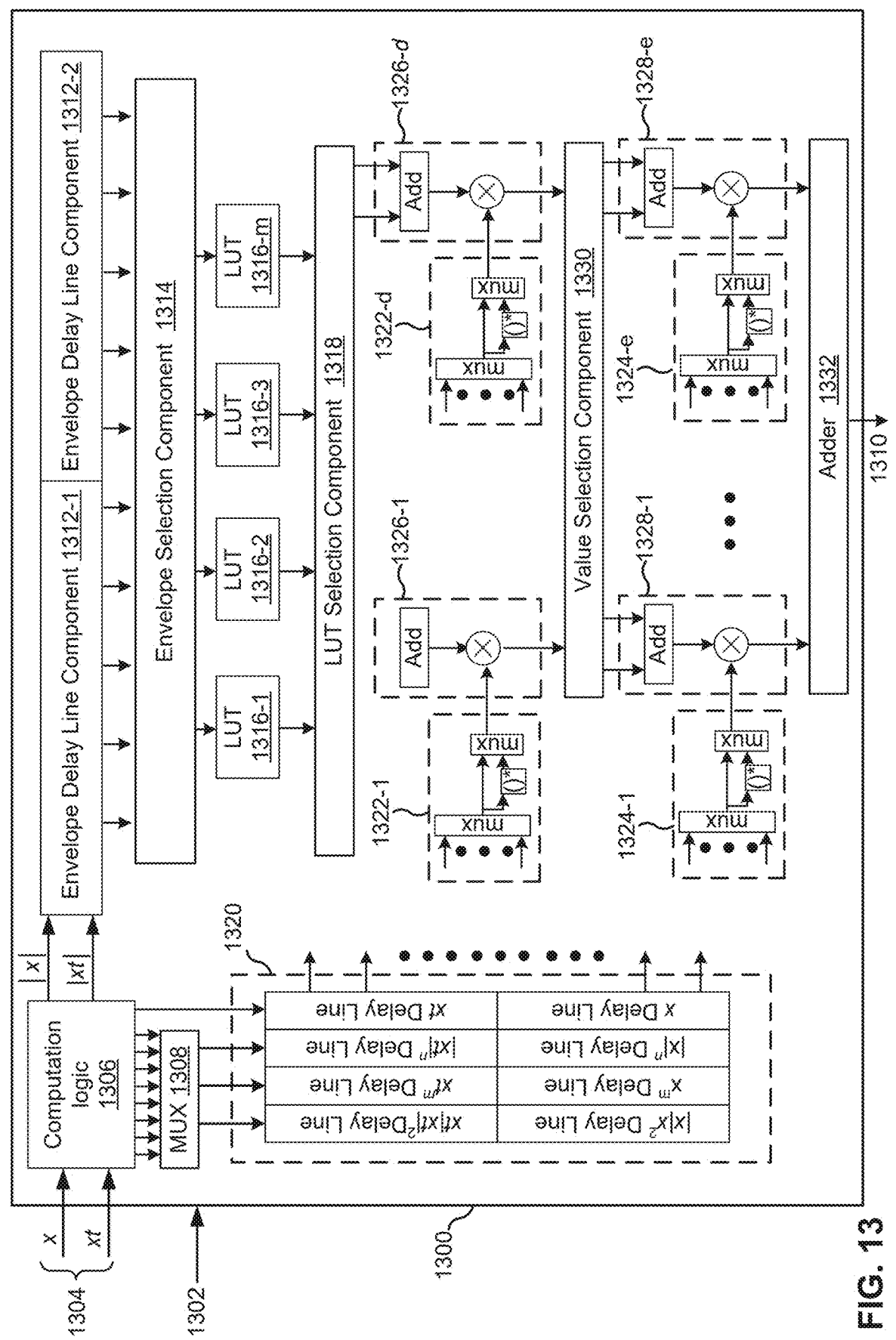
FIG. 13 is a diagram illustrating an example of a multi-dimensional DPD apparatus, in accordance with the present disclosure.

FIG. 13 is a diagram illustrating an example of a multi-dimensional DPD apparatus 1300, in accordance with the present disclosure. In some aspects, the multi-dimensional DPD apparatus 1300 may be implemented using one or more integrated circuits (ICs) and/or one or more System-on-Chips (SoCs) as further described below. The multi-dimensional DPD apparatus 1300 may be included in (and/or coupled to) a wireless transceiver of a network node (e.g., the network node 110 described with regard to FIG. 1 and/or any network node described with regard to the disaggregated base station architecture 400) and/or a UE (e.g., the UE 120 as described with regard to FIG. 1).

As shown by FIG. 13, the multi-dimensional DPD apparatus 1300 includes a first input mechanism 1302 configured to receive an indication of a selected DPD kernel. As one example, the first input mechanism 1302 may include one or more input lines connected to an input of an IC and/or SoC, such as a pin. In some aspects, the first input mechanism 1302 may include a receive logic circuit (e.g., digital logic) and/or a clock to receive one or more bits serially and/or in parallel via the one or more input lines. Alternatively or additionally, the multi-dimensional DPD apparatus may include a mapping logic circuit that maps the one or more bits to an index value and/or an identifier (ID) associated with one of multiple DPD kernels supported and/or implemented by the multi-dimensional DPD apparatus 1300. The first input mechanism 1302 is coupled to one or more communication circuits included in the multi-dimensional DPD apparatus 1300, where a communication circuit communicates and/or forwards an indication of the selected DPD kernel to one or more configurable components as further described below. In some aspects, the selected DPD kernel may be implemented using a DPD kernel set, an example of which is described with regard to FIG. 14.

The multi-dimensional DPD apparatus 1300 includes one or more second input mechanisms 1304 that are shown in FIG. 13 as including two input mechanisms. Each input mechanism of the second input mechanism(s) 1304 may be configured to receive one or more input samples (e.g., a digital sample) of a respective input signal and/or a respective input stream. For example, a first input mechanism of the second input mechanism(s) 1304 may include one or more input lines that are used to receive a complex sample that is associated with a first I/Q signal (shown in FIG. 13 as "x") associated with a first digital stream, and a second input mechanism of the second input mechanisms 1304 may include one or more input lines that are used to receive a complex sample (shown in FIG. 13 as "xt") that is associated with a second I/Q signal of a second digital stream. Accordingly, a plurality of samples may be associated with a digital stream. In some aspects, the first I/Q signal may be associated with a forward signal and the second I/Q signal may be associated with a reverse signal.

In some aspects, the second input mechanism(s) 1304 may be coupled to computational logic 1306 that may be implemented, at least in part, using digital logic, such as an adder circuit, a subtraction circuit, a multiplier circuit, and/or a division circuit. As one example, the second input mechanism(s) 1304 may be coupled to first computation logic that generates an envelope value (e.g., an absolute value) based at least in part on a respective received sample (shown in FIG. 13 as "|x|" and "|xt|"), second computation logic that generates a cubed value based at least in part on a respective received sample (e.g. "$x^3$" and/or "$xt^3$"), third computation logic that generates a squared value based at least in part on a respective received sample (e.g., "$x^2$" and/or "$xt^2$"), and/or fourth computation logic that generates an absolute value squared value based at least in part on a respective received sample (e.g., "$|x|^2$" and/or "$|xt|^2$"). Some computation logic may be replicated and/or duplicated to enable parallel processing of a computation of a first input (e.g., "x") and a second input (e.g., "xt"). Other examples of computational circuits may include logic that generates a complex conjugate computation value, a complex conjugate squared computation value, an absolute value squared computation value, a complex conjugate cubed computation value, an absolute value squared multiplied by the sample computation value, and/or an absolute value squared multiplied by a complex conjugate value. In some aspects, the computational logic 1306 may store values without performing a computation, such as a "1" value or a sample value. Alternative, or additional computations are described with regard to FIG. 14. For example, the computation logic 1306 may perform one or more computations that are part of a DPD kernel.

In some aspects, the multi-dimensional DPD apparatus 1300 is configured to receive, by way of the first input mechanism 1302, a computation indication that specifies one or more computational circuits to enable and/or disable, such as an indication to enable a complex conjugate computation circuit, an indication to disable an absolute value squared computation circuit, and/or an indication to enable a constant value (e.g., 1). Alternatively, or additionally, the multi-dimensional DPD apparatus 1300 may include a computational multiplexer (MUX) 1308 that selects one or more computational outputs from the computation logic 1306, such as by selecting one or more computational outputs based at least in part on a selected DPD kernel indicated via the first input mechanism 1302. For instance, the computation circuits in the computation logic 1306 may output a plurality of different computational values, and, based at least in part on a selected DPD kernel, the MUX 1308 may select a subset of the computational values to output. Accordingly, the computational values generated and/or stored by the multi-dimensional DPD apparatus 1300 may be configurable by way of the first input mechanism 1302, the computation logic 1306, and/or the MUX 1308. The MUX 1308 may be coupled to the outputs of the computation logic 1306 and/or the input mechanism 1302.

As shown by FIG. 13, the multi-dimensional DPD apparatus 1300 may include one or more output mechanisms 1310 configured to output one or more modified samples (e.g., a DPD-processed sample, such as an input sample x modified with DPD and/or an input sample xt modified with DPD). As one example, the output mechanism 1310 may include one or more output lines coupled to a clock and/or one or more output logic circuits to output the modified sample(s). To illustrate, the output mechanism 1310 may output the modified sample(s) (e.g., a DPD-process sample that is represented by one or more bits) serially and/or in parallel via the one or more output lines. In some aspects, such as in a scenario that includes a single output mechanism 1310 for outputting a modified sample, the multi-dimensional DPD apparatus 1300 may output a single modified sample per clock cycle, and the multi-dimensional DPD apparatus 1300 may alternate between outputting a modified x sample and a modified xt sample each clock cycle. In other aspects, such as in a scenario that includes multiple output mechanisms 1310, the multi-dimensional DPD apparatus 1300 may output a modified x sample and a modified xt sample (e.g., a DPD-processed x sample and a DPD-processed xt sample) in parallel each clock cycle and using a respective output mechanism.

In some aspects, the multi-dimensional DPD apparatus 1300 includes one or more envelope delay line components, shown as envelope delay line component 1312-1 and envelope delay line component 1312-2, that are configured to store one or more envelope value, which may be referred to collectively as an envelope delay line component 1312. The envelope delay line component 1312-1 and envelope delay line component 1312-2 may alternatively or additionally be referred to as an envelope delay line segmentation to indicate that the envelope delay line component 1312-1 and envelope delay line component 1312-2 may be included in a same envelope storage component as partitions of the envelope storage components or may be implemented in separate envelope storage components. While FIG. 13 illustrates two envelope delay line components, other examples may include more than two envelope delay line components and/or envelope delay line segmentation. Each envelope delay line component (e.g., the envelope delay line component 1312-1 and the envelope delay line component 1312-2) may include a respective envelope storage component that has a storage capacity associated with storing an input envelope value (e.g., |x| and/or |xt|) as one of multiple envelope values that span a time duration. For instance, each envelope storage component may include memory or a shift register. In some aspects, each respective envelope storage component may be configured to store multiple envelope values associated with multiple samples of a same I/Q signal, where each envelope value may be associated with a respective sample of the I/Q signal at a respective point in time of the time duration. To illustrate, as each respective envelope delay line component receives a new input envelope value (e.g., |x| and/or |xt|), the respective envelope storage component may include one or more logic circuits (e.g., an AND gate, an OR gate, a NAND gate, a NOR gate, an exclusive OR gate, an exclusive NOR gate, a buffer gate, and/or an inverter) to remove an envelope value associated with an oldest point in time and replace the removed envelope value with the new input envelope value (e.g., a circular buffer). Alternatively, or additionally, each respective envelope storage component may include shifting logic that shifts the multiple envelope values one position such that a second oldest envelope value is shifted from a current position in memory into a new position in memory associated with the (removed) oldest envelope value.

The envelope delay line component 1312-1 and the envelope delay line component 1312-2 are coupled to one or more envelope selection components 1314 that include selection logic configured to select a subset of envelope values from the multiple envelope values stored by the envelope delay line component 1312-1 and/or the envelope delay line component 1312-1. As one example, the envelope selection component(s) 1314 may include one or more multiplexers that select a subset of envelope values based at least in part on the selected DPD kernel. In some aspects, the envelope selection component(s) 1314 may be configured to select the subset of envelope values based at least in part on a timing advance and/or a timing delay relative to a computation time reference (e.g., a current sample being processed with DPD). Thus, the envelope selection component(s) 1314 may be configured to select any envelope value from the envelope delay line component 1312-1 and/or the envelope delay line component 1312-1 and, subsequently, an envelope value with any timing advance and/or a timing delay (e.g., relative to the n$^{th}$ sample) stored within the envelope delay line component 1312-1 and/or the envelope delay line component 1312-1 at discrete times within the time duration.

In FIG. 13, the envelope selection component(s) 1314 are coupled to one or more look up table (LUT) components, shown as LUT component 1316-1, LUT component 1316-2, LUT component 1316-3, up to LUT component 1316-*m*, where m represents an integer. Accordingly, while the multi-dimensional DPD apparatus 1300 illustrates four LUT components, other examples may include more or fewer LUT components. Collectively, the LUT components may be referred to as the LUT components 1316 (e.g., without a sub-designator). An LUT component may include one or more input mechanisms (e.g., one or more input lines), one or more storage components (e.g., memory), and one or more output mechanisms (e.g., one or more output lines). In some aspects, the LUT component may store, in the one or more storage components, multiple envelope computational values associated with a calculation result that is based at least in part on one or more envelope values, such as summation computations as described with regard to FIG. 10. FIG. 11A, and FIG. 11B. To illustrate, an LUT component may store a computation of a value associated with an approximation of a piece-wise linear envelope function as described with regard to FIG. 10, FIG. 11A, and FIG. 11B. Alternatively, or additionally, the LUT component may store, in the one or more storage components, cross-reference information associated with each envelope computation value such that the LUT component may receive a subset of envelope values (e.g., via the input mechanism(s)) and identify an envelope computation value associated with the subset of envelope values. Alternatively or additionally, the cross-reference information may include an indication of a DPD kernel associated with the envelope computation value.

In the example of the multi-dimensional DPD apparatus 1300, the LUT components 1316 are coupled to an LUT selection component 1318. The LUT selection component 1318 receives m envelope computational values as input and outputs one or more envelope computational values based at least in part on a selected DPD kernel. As one example, the LUT selection component includes one or more crossbar (XBAR) multiplexers that select one or more envelope computational values based at least in part on the selected DPD kernel. Alternatively or additionally the XBAR multiplexer(s) route the selected envelope computational values to one or more inputs to a combiner component as further described below. The ability to select and route envelope computational values (e.g., by the LUT selection component 1318) based at least in part on a selected DPD enables the multi-dimensional DPD apparatus 1300 to dynamically change which envelope computation value(s) are input to a combiner component and, subsequently, a type of DPD kernel implemented by the multi-dimensional DPD apparatus.

In some aspects, the multi-dimensional DPD apparatus 1300 includes one or more computation delay line components 1320 that store multiple computational values. To illustrate, and in a similar manner as described with regard to the envelope delay line component 1312-1 and the envelope delay line component 1312-2, the computation delay line component(s) 1320 may include one or more input mechanisms to receive one or more computational values (e.g., generated by a computational circuit), one or more computation storage components with storage capacity for storing multiple computational values, and one or more output mechanisms to output the one or more stored computational values.

As shown by FIG. 13, the computation delay line component(s) 1320 may include multiple computation delay lines, such as a first computation delay line (shown as an $x|x|^2$ delay line) with storage to store multiple computational values associated with a first computation (e.g., $x^3$) applied to each sample of the multiple samples of a first input (e.g., x) and a second computation delay line (shown as an $xt|xt|^2$ delay line) with storage to store multiple values associated with a second computation (e.g., $x^2$) applied to each sample of the multiple samples of a second input (e.g., xt). The computation delay line component(s) 1320 may alternatively or additionally include a third computation delay line (shown as an $x^m$ delay line) with storage to store multiple values associated with a third computation (e.g., $x^m$, m being an integer) applied to each sample of the multiple samples of the first input, a fourth computation delay line (shown as an $xt^m$ delay line) with storage to store multiple values associated with a fourth computation (e.g., $xt^m$) applied to each sample of the multiple samples of the second input, a fifth computation delay line (shown as an $|x|^n$ delay line) with storage to store multiple values associated with a fifth computation (e.g., $|x|^n$, n being an integer) applied to each sample of the multiple samples of the first input, a sixth computation delay line (shown as an $|xt|^n$ delay line) with storage to store multiple values associated with a fifth computation (e.g., $|xt|^n$) applied to each sample of the multiple samples of the second input, a seventh delay line (a samples delay line, which may be implemented as an IQ delay line) with storage to store the multiple samples of the first input, and/or an eighth delay line (a samples delay line, which may be implemented as an IQ delay line) with storage to store the multiple samples of the second input. While the multi-dimensional DPD apparatus 1300 includes eight computation delay lines, other examples may include more or fewer computation delay lines. The computational values stored by the computation delay line component(s) 1320 may be configurable based at least in part on the first input mechanism 1302, the MUX 1308, and/or selection of one or more computational circuits as further described above. Alternatively, the type of computational values (e.g., based at least in part on a computation type applied to a sample) stored by the computation delay line component(s) 1320 may be fixed.

The computation delay line component(s) 1320 are coupled to one or more computation selection components. To illustrate, and as shown by FIG. 13, the computation delay line component(s) 1320 are coupled to a first set and/or layer of computation selection components, shown as a first computation selection component 1322-1 up to a $d^{th}$ computation selection component 1322-d, where d is an integer. The first set of computation selection components may be collectively referred to as the computation selection components 1322 (e.g., without a sub-designator). The computation delay line components 1320 are also coupled to a second set and/or layer of computation delay line components, shown as computation selection component 1324-1 up to computation selection component 1324-e, where e is an integer. The second set of computation selection components may be collectively referred to as the computation selection components 1324 (e.g., without a sub-designator). The first set of computation selection component(s) 1322 and/or the second set of computation selection component(s) 1324 may be configured to select any computation value from any computation delay line component 1320 and, subsequently, a computation value with any timing advance and/or a timing delay (e.g., relative to the $n^{th}$ sample) stored within the computation delay line component 1320 at discrete times within the time duration. In some aspects, an additional MUX may couple the output of the computation delay line component(s) 1320 to the inputs of the computation selection component(s) 1322 and/or the computation selection components 1324. The additional MUX may be configured to output a select set of outputs from the computation delay line component(s) 1320 based at least in part on a selected DPD kernel.

In some aspects, each computation selection component may include one or more selection logic circuits configured to select one or more subsets of computational values stored by the computation storage component(s) of the computation delay line component(s) 1320. To illustrate, each computation selection component may include one or more multiplexers that select the subset(s) of computational values based at least in part on the selected DPD kernel. As one example, each computation selection component may be coupled to the mapping logic circuit that receives the indication of the selected DPD kernel, where the computation selection component may configure one or more multiplexers to select subset(s) of computational values based at least in part on the selected DPD kernel.

For clarity, the computation selection component 1322-1, the computation selection component 1322-d, the computation selection component 1324-1, and the computation selection component 1324-e are shown as separate components in the multi-dimensional DPD apparatus 1300. However, in alternate or additional examples, the computation selection component 1322-1, the computation selection component 1322-d, the computation selection component 1324-1, and the computation selection component 1324-e may be included in a same (single) component, such as a single multiplexer component and/or a delay line-multiplexer selection component as further described below, that is coupled to one or more of the computation delay line component(s) 1320.

As shown by FIG. 13, the multi-dimensional DPD apparatus 1300 includes one or more combiner components that are coupled to one or more computation components. As one example, a first combiner component 1326-1 is coupled to the first computation selection component 1322-1 up to a $d^{th}$ combiner component 1326-d that is coupled to the $d^{th}$ computation selection component 1322-d (which are collectively referred to as the combiner components 1326). The combiner components 1326 are also coupled to the LUT selection component 1318 such that each combiner component of the combiner components 1326 receives at least a first input from the LUT selection component 1318 and at least a second input from a respective computation selection component.

As also shown by FIG. 13, a first combiner component 1328-1 up to an e-th combiner component 1328-_e_ are coupled to a respective computation selection (shown as the computation selection component 1324-1 and the computation selection component 1324-_e_, respectively) and a value selection component 1330 (further described below) such that each combiner component 1328 (e.g., the first combiner component 1328-1 the e-th combiner component 1328-_e_) receives at least a first input from the respective computation selection component and at least a second input from the value selection component 1330. The first combiner component 1328-1 up to the e-th combiner component 1328-_e_ may be collectively referred to as the combiner components 1328.

Each combiner component includes one or more logic circuits that are configured to generate an output based at least in part on combining one or more envelope computational values with the subset(s) of computational values. As an example, a combiner component may include a multiplier circuit that combines the values using at least a multiplication operation and/or an adder circuit that combines the values using at least a summation operation. To illustrate, an adder circuit of a combiner component (e.g., the combiner component 1326-1) couples to an LUT selection component (e.g., the LUT selection component 1318), and combines the (approximate) envelope computational values selected and routed by the LUT selection component. As another example, a multiplier circuit of the combiner component couples to one or more computation selection components (e.g., the computation selection component 1322-1), and combines the subset(s) of computational values with the (added) envelope computational values.

The value selection component 1330 includes logic circuitry that selects, based at least in part on the selected DPD kernel, one or more combined values generated by one or more combiner components (e.g., the combiner component(s) 1326) and outputs the selected combined value(s). To illustrate, the value selection component 1330 may include one or more multiplexers and/or one or more XBAR multiplexers that select (and/or route) the combined values based at least in part on the selected DPD kernel. The ability to select and route different combined values generated by a combiner component based at least in part on a selected DPD enables the multi-dimensional DPD apparatus 1300 to dynamically change which combined value is input to a combiner component (e.g. the combiner component 1328) and, subsequently, a type of DPD kernel implemented by the multi-dimensional DPD apparatus 1300.

The multi-dimensional DPD apparatus 1300 includes an adder component 1332 that combines two or more outputs that are generated based at least in part on the combiner components 1328. In some aspects, a selected DPD kernel may be based at least in part on a DPD kernel set, such as the DPD kernel set described with regard to FIG. 14, and each DPD kernel in a DPD kernel set may be implemented based at least in part on a respective computation path, such as a first computation path that is implemented based at least in part on the computation selection component 1322-1, the computation selection component 1324-1, the combiner component 1326-1, and the combiner component 1328-1 and/or a second computation path that is implemented based at least in part the computation selection component 1322-_d_, the computation selection component 1324-_d_, the combiner component 1326-_d_, and the combiner component 1328-_e_. The adder component 1332 may combine the respective outputs of the respective DPD kernels in a DPD kernel set to generate a combined DPD-processed output sample that is based at least in part on the selected DPD kernel. For example, the combined DPD-processed output sample may be based at least in part on the adder component 1332 combining the respective outputs of each output generated by a respective DPD kernel in a DPD kernel set. In some aspects, the selected DPD kernel may be a multi-band DPD kernel that applies DPD to a wideband signal based at least in part on processing sub-band partitions of the wideband signal, while in other aspects, the selected DPD kernel may be a wideband DPD kernel that applies to a wideband signal without partitioning the wideband signal into sub-bands.

In some aspects, the multi-dimensional DPD apparatus 1300 may be implemented, at least in part, as an IC device, an SoC device, and/or logic circuits (signal processing logic). An IC device may include electronic circuits formed on a semiconductor substrate, such as silicon. Example types of IC devices include memory IC devices (e.g., dynamic random access memory devices or flash memory devices, among other examples), processing IC devices (e.g., microprocessors, digital signal processors, or microcontrollers, computation circuits, among other examples), transceiver IC devices (e.g., RF or mixed-signal transceivers, among other examples), or power amplifier IC devices (e.g., operation amplifier devices, among other examples). An SoC device (e.g., an SoC IC device) may include a combination of one or more types of IC devices.

Structures of an IC device (e.g., transistors, memory cells, logic gates, or interconnects, among other example) may be fabricated using semiconductor fabrication processes that include using deposition, photolithography, and etching techniques. Deposition techniques may form layers of dielectric or conductive materials on or over a semiconductor substrate, after which photolithography and etching techniques may form patterns of structures from the layers of dielectric or conductive materials (e.g., form the transistors, memory cells, logic gates, or interconnects).

As indicated above, FIG. 13 is provided as an example. Other examples may differ from what is described above.

Figure 14:
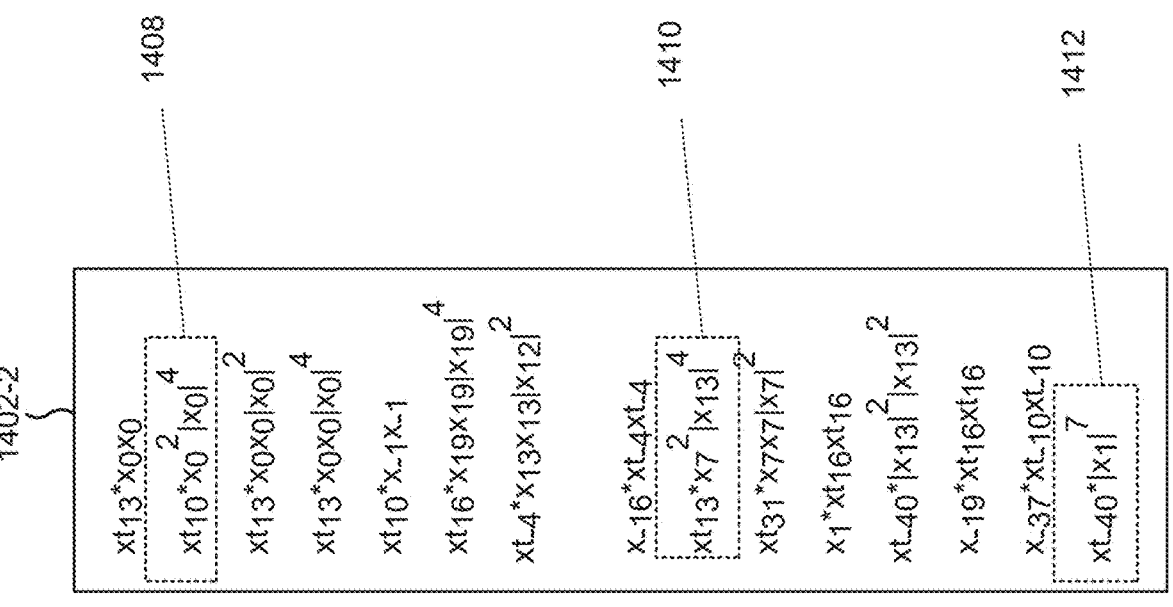
FIG. 14 is a diagram illustrating an example of a multi-antenna DPD kernel, in accordance with the present disclosure.

FIG. 14 is a diagram illustrating an example 1400 of a multi-antenna DPD kernel, in accordance with the present disclosure.

The example 1400 includes a first table 1402-1 and a second table 1420-2 that collectively implement an example multi-antenna DPD kernel. As shown by FIG. 14, the multi-antenna DPD kernel may be based at least in part on a DPD kernel set. In some aspects, each DPD kernel in the DPD kernel set may be implemented using a multi-dimensional DPD, such as the multi-dimensional DPD apparatus 1300 described with regard to FIG. 13. A multi-antenna DPD kernel may apply DPD to one or more signals that share multiple antennas (e.g., a sub-array of antenna elements), and the multi-antenna DPD kernel may be based at least in part on mitigating crosstalk between the antenna elements that are shared by the one or more signals (e.g., the antenna elements in the sub-array).

To illustrate a first DPD kernel 1404 may be implemented by the multi-dimensional DPD apparatus 1300 based at least in part on 1324 selecting a particular sample (e.g., $xt_{13}$) from a computation delay line component 1320 (e.g., xt delay line). A second DPD kernel 1406 may be implemented by the multi-dimensional DPD apparatus 1300 based at least in part on selecting an envelope value (e.g., $|x_0|$) from an envelope delay line component 1312, using an LUT component 1316 for an approximation of $|x_0|^3$, and a computational selection component 1324 selecting xt13 from a computation delay line component 1320. The multi-dimensional DPD apparatus 1300 may use various combiner components (e.g., combiner component 1326 and/or combiner component 1328) to combine the selected values, approximated values, and/or generated values.

A third DPD kernel 1408 may be implemented based at least in part on the multi-dimensional DPD apparatus 1300 being configured to use a computation selection component 1324 to select $xt_{10}$ from a first computation delay line 1320 and generate a complex conjugate (e.g., $xt_{10}^*$). Alternatively, or additionally, the multi-dimensional DPD apparatus 1300 may be configured to select an envelope value (e.g., $|x_0|$) from an envelope delay line component 1312 and use an LUT component 1316 for an approximation of $|x_0|^4$. The multi-dimensional DPD apparatus 1300 may also be configured to select $x_0^2$ from a second computation delay line 1320. The multi-dimensional DPD apparatus 1300 may use various combiner components (e.g., combiner component 1326 and/or combiner component 1328) to combine the selected values, approximated values, and/or generated values.

A fourth DPD kernel 1410 may be implemented based at least in part on the multi-dimensional DPD apparatus 1300 being configured to use a computation selection component 1324 to select $xt_{13}$ from a first computation delay line 1320 and generate a complex conjugate (e.g., $xt_{13}^*$). The multi-dimensional DPD apparatus 1300 may also be configured to select $x_7^2$ from a second computation delay line 1320. Alternatively, or additionally, the multi-dimensional DPD apparatus 1300 may be configured to select an envelope value (e.g., $|xt_{13}|$) from an envelope delay line component 1312 and use an LUT component 1316 for an approximation of $|xt_{13}|^4$. The multi-dimensional DPD apparatus 1300 may use various combiner components (e.g., combiner component 1326 and/or combiner component 1328) to combine the selected values, approximated values, and/or generated values.

A fifth DPD kernel 1412 may be implemented based at least in part on the multi-dimensional DPD apparatus 1300 being configured to use a computation selection component 1324 to select $xt_{-40}$ from a first computation delay line 1320 and generate a complex conjugate (e.g., $xt_{-40}^*$). Alternatively, or additionally, the multi-dimensional DPD apparatus 1300 may be configured to select an envelope value (e.g., $|x_1|$) from an envelope delay line component 1312 and use an LUT component 1316 for an approximation of $|x_1|^7$. The multi-dimensional DPD apparatus 1300 may use various combiner components (e.g., combiner component 1326 and/or combiner component 1328) to combine the selected values, approximated values, and/or generated values.

As indicated above, FIG. 14 is provided as an example. Other examples may differ from what is described with regard to FIG. 14. For example, a DPD kernel set and/or a DPD kernel may be implemented based at least in part on a variety of models (e.g., that can model a non-linear system, such as distortion and/or pre-distortion), such as a DPD kernel set and/or DPD kernel that is based at least in part on any combination of a Volterra series, a decomposed vector rotation (DVR) series, a generalized memory polynomial (GMP) series, a memory polynomial (MP) series, and/or a dynamic deviation reduction (DDR) series.

Figure 15:
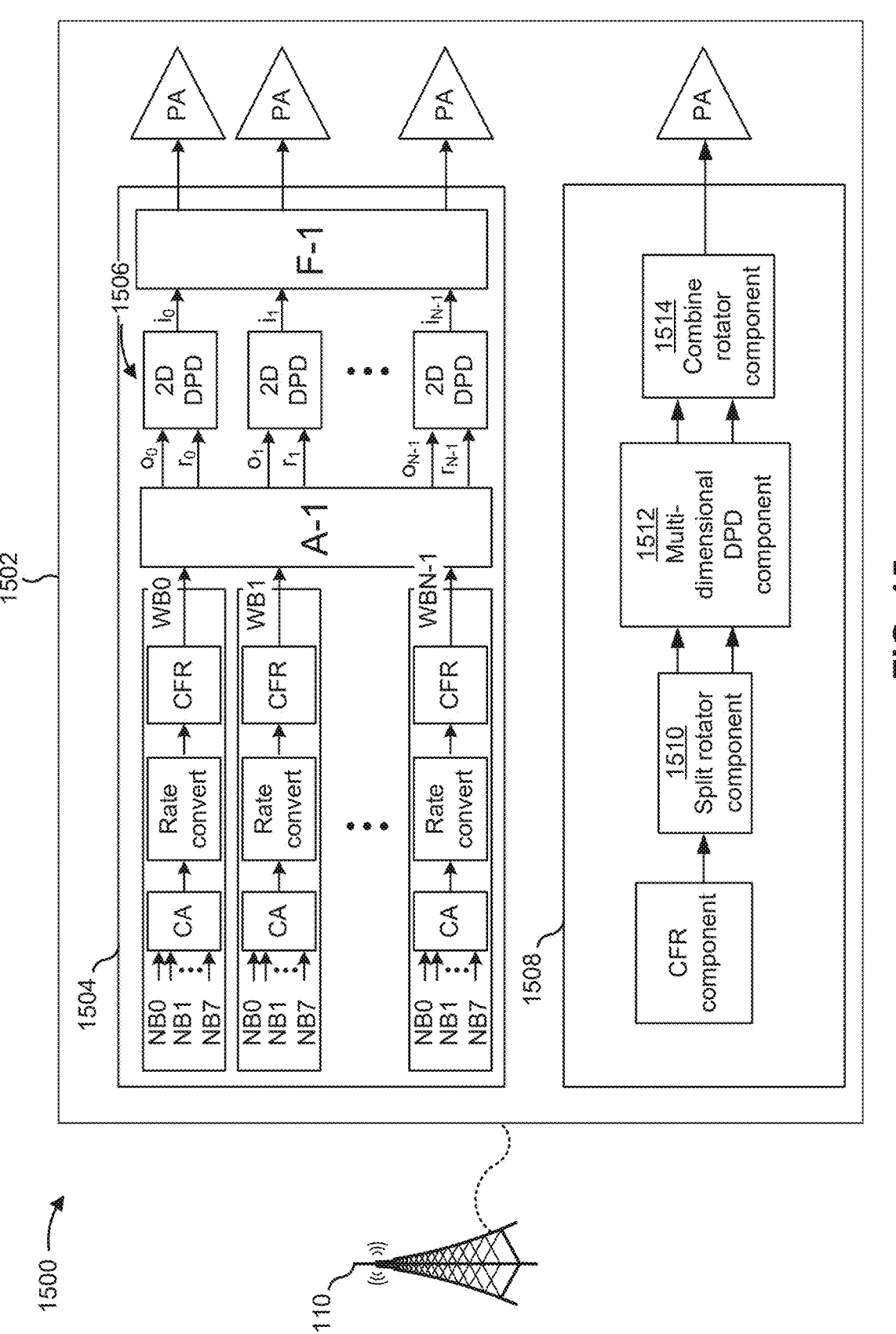
FIG. 15 is a diagram illustrating an example of DPD reuse, in accordance with the present disclosure.

FIG. 15 is a diagram illustrating an example 1500 of DPD reuse, in accordance with the present disclosure.

The example 1500 includes example hardware 1502 that may be included in a wireless communication device, such as a network node 110. The hardware 1502 includes first transceiver hardware 1504 that includes a plurality of DPDs as shown by reference number 1506. In some aspects, the plurality of DPDs may be implemented as multi-dimensional DPDs, which are shown in FIG. 15 as 2D DPDs. In some aspects the first transceiver hardware 1504 may be the transmitter 1002 described with regard to FIG. 10. Accordingly, the plurality of DPDs shown by reference number 1506 may be configured as a multi-antenna DPD that applies digital crosstalk predistortion using an A-1 matrix as described with regard to FIGS. 8A, 8B, 9, 10, and 11. In some aspects, each DPD of the plurality of DPDs shown by reference number 1506 may be configured to apply a multi-antenna DPD kernel (e.g., that uses a DPD kernel set as described with regard to FIG. 14) to a forward signal and a reverse signal to generate a respective output sample that includes DPD processing (shown as $i_0$, $i_1$, up to $i_{N-1}$).

As shown by FIG. 15, the example hardware 1502 includes second transceiver hardware 1508 that is configured to process a wideband signal based at least in part on splitting the wideband signal into multiple distinct sub-bands (e.g., respective component carriers of the wideband signal). To illustrate, the second transceiver hardware 1508 includes a split rotator component 1510 that receives a wideband signal as input (e.g., a plurality of digital samples at a first sampling frequency), and separates the wideband signal into sub-bands that use a second sampling frequency that is lower than the first sampling frequency. In some aspects, and the wideband signal may be a sparse wideband signal that includes multiple component carriers that are separated by a frequency gap that includes negligible signal power (e.g., a signal power that satisfies a noise floor and/or a low signal power threshold).

As shown by FIG. 15, the second transceiver hardware 1508 may include a multi-dimensional DPD component 1512 that receives the sub-bands as input and generates DPD-processed outputs. In some aspects, the multi-dimensional DPD component 1512 is an instance of a same hardware component and/or same hardware circuitry used to implement one or more of the DPD components shown by reference number 1506. That is, the first transceiver hardware 1504 and the second transceiver hardware 1508 may use the same hardware (e.g., a DPD component and the multi-dimensional DPD component 1512) that is configured to apply different DPD kernels. For instance, the multi-dimensional DPD component 1512 may apply a multi-band DPD kernel (e.g., that uses a DPD kernel set) that applies DPD to sub-bands of a wideband signal, while the DPDs shown by reference number 1506 apply a multi-antenna DPD kernel. As described above, a multi-band DPD kernel may apply DPD to a wideband signal based at least in part on processing sub-band partitions of the wideband signal, and a multi-antenna DPD kernel may apply DPD to one or more signals that share multiple antennas based at least in part on mitigating crosstalk between the shared antenna elements. As shown by FIG. 15, the multi-dimensional DPD component 1512 may output DPD-processed sub-band samples that are input to a combine rotator component 1514, and the combine rotator component 1510 may generate a DPD-processed wideband signal based at least in part on the DPD-processed sub-band samples.

The multi-dimensional DPD component 1512 and the DPDs shown by reference number 1506 may be respective instances of an adaptable DPD apparatus that may include an ability to dynamically switch and/or apply different DPD kernels (e.g., a multi-band DPD kernel and a multi-antenna DPD kernel) using a same architecture and/or replicate hardware. For instance, the multi-dimensional DPD component 1512 and the DPDs shown by reference number 1506 may include the same components as described with regard to FIG. 13, such as a first input mechanism configured to receive an indication of a selected digital DPD kernel from a plurality of DPD kernels supported by the DPD apparatus, a second input mechanism configured to receive at least a first input stream and a second input stream, an envelope delay line component comprising a first envelope storage segmentation configured to store a first input envelope value as one of a first plurality of envelope values associated with the first input stream and a second envelope storage segmentation configured to store a second input envelope value as one of a second plurality of envelope values associated with the second input stream, an envelope selection component configured to select a subset of envelope values from at least one of the first plurality of envelope values or the second plurality of envelope values based at least in part on the selected DPD kernel, one or more LUT components coupled to the envelope selection component configured to receive the subset of envelope values and output an envelope computation value that is based at least in part on the subset of envelope values and the selected DPD kernel, a computation delay line component comprising one or more computation storage components configured to store multiple computational values that are based at least in part on the first input stream and/or the second input stream, one or more computation selection components coupled to the computation delay line component and configured to select, based at least in part on the selected DPD kernel, one or more subsets of computational values from the multiple computational values stored by the computation storage component, one or more combiner components coupled to the one or more computation selection components and the one or more LUT components, the one or more combiner components configured to generate a respective output that is based at least in part on combining the envelope computation value with the one or more subsets of computational values, and/or an adder component coupled the one or more combiner components and configured to generate a DPD-processed output sample based at least in part on combining the respective output from at least a subset of the one or more combiner components.

As indicated above, FIG. 15 is provided as an example. Other examples may differ from what is described with regard to FIG. 15.

FIG. 16 is a diagram illustrating an example process 1600 performed, for example, at an apparatus or an apparatus of an apparatus, in accordance with the present disclosure. Example process 1600 is an example where the apparatus (e.g., a network node 110, a transceiver 302, a transmitter 1002, and/or a modem 1204) performs operations associated with multi-antenna digital predistortion.

As shown in FIG. 16, in some aspects, process 1600 may include generating a first plurality of digital output streams that are associated with a first sub-array of antenna elements of an antenna array by applying a first A-1 matrix to first one or more input digital streams associated with the first sub-array of antenna elements, the first A-1 matrix being based at least in part on the first sub-array of antenna elements (block 1610). For example, the apparatus (e.g., using A-1 signal processing logic 1012, signal processing logic 1208, and/or a multi-dimensional DPD apparatus

1300) may generate a first plurality of digital output streams that are associated with a first sub-array of antenna elements of an antenna array by applying a first A-1 matrix to first one or more input digital streams associated with the first sub-array of antenna elements, the first A-1 matrix being based at least in part on the first sub-array of antenna elements, as described above.

As further shown in FIG. 16, in some aspects, process 1600 may include generating, using the first plurality of digital output streams, first one or more DPD digital output streams that are associated with the first sub-array of antenna elements by applying first DPD to the first plurality of digital output streams, the first DPD being based at least in part on a first power-amplifier-to-antenna-array network (block 1620). For example, the apparatus (e.g., using A-1 signal processing logic 1012, signal processing logic 1208, and/or a multi-dimensional DPD apparatus 1300) may generate, using the first plurality of digital output streams, first one or more DPD digital output streams that are associated with the first sub-array of antenna elements by applying first DPD to the first plurality of digital output streams, the first DPD being based at least in part on a first power-amplifier-to-antenna-array network, as described above.

As further shown in FIG. 16, in some aspects, process 1600 may include generating a second plurality of digital output streams that are associated with a second sub-array of antenna elements of an antenna array by applying a second A-1 matrix to second one or more input digital streams that are associated with the second sub-array of antenna elements, the second A-1 matrix being based at least in part on the second sub-array of antenna elements (block 1630). For example, the apparatus (e.g., using A-1 signal processing logic 1012, signal processing logic 1208, and/or a multi-dimensional DPD apparatus 1300) may generate a second plurality of digital output streams that are associated with a second sub-array of antenna elements of an antenna array by applying a second A-1 matrix to second one or more input digital streams that are associated with the second sub-array of antenna elements, the second A-1 matrix being based at least in part on the second sub-array of antenna elements, as described above.

As further shown in FIG. 16, in some aspects, process 1600 may include generating second one or more DPD digital output streams that are associated with the second sub-array of antenna elements by applying second DPD to the second plurality of digital output streams, the second DPD being based at least in part on a second power-amplifier-to-antenna-array network that is different from the first power-amplifier-to-antenna-array network (block 1640). For example, the apparatus (e.g., using A-1 signal processing logic 1012, signal processing logic 1208, and/or a multi-dimensional DPD apparatus 1300) may generate second one or more DPD digital output streams that are associated with the second sub-array of antenna elements by applying second DPD to the second plurality of digital output streams, the second DPD being based at least in part on a second power-amplifier-to-antenna-array network that is different from the first power-amplifier-to-antenna-array network, as described above.

Process 1600 may include additional aspects, such as any single aspect or any combination of aspects described below and/or in connection with one or more other processes described elsewhere herein.

In a first aspect, the first A-1 matrix and the second A-1 matrix are based at least in part on the first sub-array of antenna elements being different from, and electrically isolated from, the second sub-array of antenna elements, and the first sub-array of antenna elements includes a first border antenna element that is located adjacent to a second boarder antenna element included in the second sub-array of antenna elements.

In a second aspect, the first A-1 matrix and the second A-1 matrix are based at least in part on the first sub-array of antenna elements having a first set of border antenna elements that are adjacent to a second set of border antenna elements of a second sub-array of antenna elements of the antenna array, and the first set of border antenna elements having an isolation level between the second set of border antenna elements, the isolation level satisfying an isolation level threshold that indicates that an antenna crosstalk level between the first set of border antenna elements and the second set of border antenna elements is negligible.

In a third aspect, generating the first plurality of digital output streams and generating the first one or more DPD digital output streams is based at least in part on using first transceiver hardware that includes first digital signal processing logic configured to generate the first plurality of digital output streams, and a first plurality of DPD circuits that are coupled to an output of the first digital signal processing logic and configured to generate the first one or more DPD digital output streams using the first plurality of digital output streams, and generating the second plurality of digital output streams and generating the second one or more DPD digital output streams is based at least in part on using second transceiver hardware that includes second digital signal processing logic configured to generate the second plurality of digital output streams, and a second plurality of DPD circuits that are coupled to the second digital signal processing logic and configured to generate the second one or more DPD digital output streams using the first plurality of digital output streams.

In a fourth aspect, process 1600 includes generating first one or more baseband digital streams by applying a first F-1 matrix to the first one or more DPD digital output streams, the first F-1 matrix being based at least in part on each baseband digital stream of the first one or more baseband digital streams being used as an input to the first sub-array of antenna elements, and generating second one or more baseband digital streams that are associated with the second sub-array of antenna elements by applying a second F-1 matrix to the second one or more DPD digital output streams, the second F-1 matrix being based at least in part on each baseband digital stream of the second one or more baseband digital streams being used as an input to the second sub-array of antenna elements.

In a fifth aspect, generating the first one or more baseband digital streams includes generating the first one or more baseband digital streams using first feed processing logic that is coupled to a first plurality of DPD circuits that generate the first one or more DPD digital output streams, and generating the second one or more baseband digital streams includes generating the second one or more baseband digital streams using second feed processing logic that is coupled to a second plurality of DPD circuits that generate the second one or more DPD digital output streams.

In a sixth aspect, the first A-1 matrix is based at least in part on a first set of scattering parameters that characterize a first power-amplifier-to-antenna-array network that includes the first sub-array of antenna elements and excludes the second sub-array of antenna elements, and the second A-1 matrix is based at least in part on a second set of scattering parameters that characterize a second power-amplifier-to-antenna-array network that includes the second sub-array of antenna elements and excludes the first sub-array of antenna elements.

In a seventh aspect, the first A-1 matrix is independent from the second A-1 matrix.

In an eighth aspect, the first A-1 matrix is based at least in part on mitigating antenna crosstalk within the first sub-array of antenna elements, and the second A-1 matrix is based at least in part on mitigating antenna crosstalk within the second sub-array of antenna elements.

In a ninth aspect, the first A-1 matrix and the second A-1 matrix are based at least in part on calibration data associated with the antenna array.

In a tenth aspect, process 1600 includes a first input digital stream of the first one or more input digital streams is a first narrowband signal that is part of a wideband signal, and a second input digital stream of the first one or more input digital streams is a second narrowband signal of the wideband signal.

In an eleventh aspect, process 1600 includes generating, by the first A-1 matrix and as part of the first plurality of digital output streams a respective forward digital stream, and a respective reverse digital stream, for each respective input digital stream of the first one or more input digital streams.

In a twelfth aspect, generating the first one or more digital DPD digital output streams includes processing the respective forward digital stream and the respective reverse digital stream using a DPD kernel.

In a thirteenth aspect, process 1600 includes a first digital stream of the first one or more input digital streams is a first narrowband signal that is included in a first wideband signal, and a second digital stream of the first one or more input digital streams is a second narrowband signal that is included in a second wideband signal, and the first wideband signal and the second wideband signal share the first sub-array of antenna elements.

In a fourteenth aspect, applying the first A-1 matrix includes applying the first A-1 matrix to the first one or more input digital streams in a modem that is coupled to first transceiver hardware that includes a first plurality of DPD circuits that generate the first one or more DPD digital output streams using the first plurality of digital output streams, and applying the second A-1 matrix includes applying the second A-1 matrix to the second one or more input digital streams in the modem, the modem being coupled to second transceiver hardware that includes a second plurality of DPD circuits that generate the second one or more DPD digital output streams using the second plurality of digital output streams.

In a fifteenth aspect, the first A-1 matrix is included in first transceiver hardware that includes a first plurality of DPD circuits that generate the first one or more DPD digital output streams using the first plurality of digital output streams, and the second A-1 matrix is included in second transceiver hardware that includes a second plurality of DPD circuits that generate the second one or more DPD digital output streams using the second plurality of digital output streams.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

FIG. 17 is a diagram illustrating an example process 1700 performed, for example, at an apparatus or an apparatus of an apparatus, in accordance with the present disclosure. Example process 1700 is an example where the apparatus (e.g., a network node 110, a transceiver 302, a transmitter 1002, and/or a modem 1204) performs operations associated with multi-antenna DPD.

As shown in FIG. 17, in some aspects, process 1700 may include operating in a first mode that is associated with multi-antenna DPD processing (multi-antenna DPD processing), the multi-antenna DPD processing includes at least: generating, using digital signal processing logic, a plurality of digital output streams by applying an A-1 matrix to one or more input digital streams associated with a first sub-array of antenna elements of an antenna array, the first A-1 matrix being based at least in part on the first sub-array of antenna elements; configuring at least a first instance of a DPD circuit (e.g., a multi-dimensional DPD circuit) that is coupled to an output of the digital signal processing logic and configured to generate first one or more DPD digital output streams based at least in part on: the plurality of digital output streams, and a multi-antenna DPD kernel that is based at least in part on a DPD kernel set and processes each respective output digital stream of the plurality of digital output streams as at least one of: a forward digital stream, or a reverse digital stream; transmitting the first one or more DPD digital output streams based at least in part on using the first sub-array of antenna elements (block 1710). For example, the apparatus (e.g., using A-1 signal processing logic 1012, signal processing logic 1208, and/or a multi-dimensional DPD apparatus 1300) may operate in a first mode that is associated with multi-antenna DPD processing (multi-antenna DPD processing), the multi-antenna DPD processing including at least: generating, using digital signal processing logic, a plurality of digital output streams by applying an A-1 matrix to one or more input digital streams associated with a first sub-array of antenna elements of an antenna array, the first A-1 matrix being based at least in part on the first sub-array of antenna elements; configuring at least a first instance of a DPD circuit that is coupled to an output of the digital signal processing logic and configured to generate first one or more DPD digital output streams based at least in part on: the plurality of digital output streams, and a multi-antenna DPD kernel that is based at least in part on a DPD kernel set and processes each respective output digital stream of the plurality of digital output streams as at least one of: a forward digital stream, or a reverse digital stream; transmitting the first one or more DPD digital output streams based at least in part on using the first sub-array of antenna elements, as described above.

As further shown in FIG. 17, in some aspects, process 1700 may include operating in a second mode that is associated with multi-band DPD processing, the multi-band DPD processing including at least: generating, using a wideband signal, a first plurality of samples that are a first sub-band of the wideband signal, the first plurality of samples being sampled over a time duration; generating, using the wideband signal, a second plurality of samples that are a second sub-band of the wideband signal, the second plurality of samples being sampled over the time duration; and generating a DPD-processed wideband signal based at least in part on using at least: a second instance of the DPD circuit (e.g., a multi-dimensional DPD circuit) that processes the first plurality of samples and the second plurality of samples to generate a plurality of DPD digital output samples, the second DPD circuit configured with a multi-band DPD kernel, the second DPD circuit including repli- cate hardware to the first DPD circuit; and combining logic that generates the DPD-processed wideband signal based at least in part on combining the plurality of DPD digital output samples (block 1720). For example, the apparatus (e.g., using A-1 signal processing logic 1012, signal processing logic 1208, and/or a multi-dimensional DPD apparatus 1300) may operate in a second mode that is associated with multi-band DPD processing, the multi-band DPD processing including at least: generating, using a wideband signal, a first plurality of samples that are a first sub-band of the wideband signal, the first plurality of samples being sampled over a time duration; generating, using the wideband signal, a second plurality of samples that are a second sub-band of the wideband signal, the second plurality of samples being sampled over the time duration; and generating a DPD-processed wideband signal based at least in part on using at least: a second instance of the DPD circuit that processes the first plurality of samples and the second plurality of samples to generate a plurality of DPD digital output samples, the second DPD circuit configured with a multi-band DPD kernel, the second DPD circuit including replicate hardware to the first DPD circuit; and combining logic that generates the DPD-processed wideband signal based at least in part on combining the plurality of DPD digital output samples, as described above.

Process 1700 may include additional aspects, such as any single aspect or any combination of aspects described below and/or in connection with one or more other processes described elsewhere herein.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

The following provides an overview of some Aspects of the present disclosure:

Aspect 1: A method performed by an apparatus, the method comprising: generating a first plurality of digital output streams that are associated with a first sub-array of antenna elements of an antenna array by applying a first inverse power-amplifier-to-antenna-array network (A-1) matrix to first one or more input digital streams associated with the first sub-array of antenna elements, the first A-1 matrix being based at least in part on the first sub-array of antenna elements; generating, using the first plurality of digital output streams, first one or more digital predistortion (DPD) digital output streams that are associated with the first sub-array of antenna elements by applying first DPD to the first plurality of digital output streams, the first DPD being based at least in part on a first power-amplifier-to-antenna-array network; generating a second plurality of digital output streams that are associated with a second sub-array of antenna elements of an antenna array by apply- ing a second A-1 matrix to second one or more input digital streams that are associated with the second sub-array of antenna elements, the second A-1 matrix being based at least in part on the second sub-array of antenna elements; and generating second one or more DPD digital output streams that are associated with the second sub-array of antenna elements by applying second DPD to the second plurality of digital output streams, the second DPD being based at least in part on a second power-amplifier-to-antenna-array net- work that is different from the first power-amplifier-to- antenna-array network.

Aspect 3: The method of Aspect 1, wherein the first A-1 matrix and the second A-1 matrix are based at least in part on: the first sub-array of antenna elements having a first set of border antenna elements that are adjacent to a second set of border antenna elements of a second sub-array of antenna elements of the antenna array, and the first set of border antenna elements having an isolation level between the second set of border antenna elements, the isolation level satisfying an isolation level threshold that indicates that an antenna crosstalk level between the first set of border antenna elements and the second set of border antenna elements is negligible.

Aspect 4: The method of any of Aspects 1-3, wherein generating the first plurality of digital output streams and generating the first one or more DPD digital output streams is based at least in part on using first transceiver hardware that comprises: first digital signal processing logic configured to generate the first plurality of digital output streams, and a first plurality of DPD circuits that are coupled to an output of the first digital signal processing logic and configured to generate the first one or more DPD digital output streams using the first plurality of digital output streams, and wherein generating the second plurality of digital output streams and generating the second one or more DPD digital output streams is based at least in part on using second transceiver hardware that comprises: second digital signal processing logic configured to generate the second plurality of digital output streams, and a second plurality of DPD circuits that are coupled to the second digital signal processing logic and configured to generate the second one or more DPD digital output streams using the first plurality of digital output streams.

Aspect 5: The method of any of Aspects 1-4, further comprising: generating first one or more baseband digital streams by applying a first inverse feed network (F-1) matrix to the first one or more DPD digital output streams, the first F-1 matrix being based at least in part on: each baseband digital stream of the first one or more baseband digital streams being used as an input to the first sub-array of antenna elements, and generating second one or more baseband digital streams that are associated with the second sub-array of antenna elements by applying a second F-1 matrix to the second one or more DPD digital output streams, the second F-1 matrix being based at least in part on: each baseband digital stream of the second one or more baseband digital streams being used as an input to the second sub-array of antenna elements.

Aspect 6: The method of Aspect 5, wherein generating the first one or more baseband digital streams comprises: generating the first one or more baseband digital streams using first feed processing logic that is coupled to a first plurality of DPD circuits that generate the first one or more DPD digital output streams, and wherein generating the second one or more baseband digital streams comprises: generating the second one or more baseband digital streams using second feed processing logic that is coupled to a second plurality of DPD circuits that generate the second one or more DPD digital output streams.

Aspect 7: The method of any of Aspects 1-6, wherein the first A-1 matrix is based at least in part on a first set of scattering parameters that characterize a first power-amplifier-to-antenna-array network that includes the first sub-array of antenna elements and excludes the second sub-array of antenna elements, and wherein the second A-1 matrix is based at least in part on a second set of scattering parameters that characterize a second power-amplifier-to-antenna-array network that includes the second sub-array of antenna elements and excludes the first sub-array of antenna elements.

Aspect 8: The method of any of Aspects 1-7, wherein the first A-1 matrix is independent from the second A-1 matrix.

Aspect 9: The method of any of Aspects 1-8, wherein the first A-1 matrix is based at least in part on mitigating antenna crosstalk within the first sub-array of antenna elements, and wherein the second A-1 matrix is based at least in part on mitigating antenna crosstalk within the second sub-array of antenna elements.

Aspect 10: The method of any of Aspects 1-9, wherein the first A-1 matrix and the second A-1 matrix are based at least in part on calibration data associated with the antenna array.

Aspect 11: The method of any of Aspects 1-10, wherein: a first input digital stream of the first one or more input digital streams is a first narrowband signal that is part of a wideband signal, and a second input digital stream of the first one or more input digital streams is a second narrowband signal of the wideband signal.

Aspect 12: The method of any of Aspects 1-11, further comprising: generating, by the first A-1 matrix and as part of the first plurality of digital output streams: a respective forward digital stream, and a respective reverse digital stream, for each respective input digital stream of the first one or more input digital streams.

Aspect 13: The method of Aspect 12, wherein generating the first one or more digital DPD digital output streams comprises: processing the respective forward digital stream and the respective reverse digital stream using a DPD kernel.

Aspect 14: The method of any of Aspects 1-13, wherein: a first digital stream of the first one or more input digital streams is a first narrowband signal that is included in a first wideband signal, and a second digital stream of the first one or more input digital streams is a second narrowband signal that is included in a second wideband signal, wherein the first wideband signal and the second wideband signal share the first sub-array of antenna elements.

Aspect 15: The method of any of Aspects 1-14, wherein applying the first A-1 matrix comprises: applying the first A-1 matrix to the first one or more input digital streams in a modem that is coupled to first transceiver hardware that includes a first plurality of DPD circuits that generate the first one or more DPD digital output streams using the first plurality of digital output streams, and wherein applying the second A-1 matrix comprises: applying the second A-1 matrix to the second one or more input digital streams in the modem, the modem being coupled to second transceiver hardware that includes a second plurality of DPD circuits that generate the second one or more DPD digital output streams using the second plurality of digital output streams.

Aspect 16: The method of any of Aspects 1-15, wherein the first A-1 matrix is included in first transceiver hardware that includes a first plurality of DPD circuits that generate the first one or more DPD digital output streams using the first plurality of digital output streams, and wherein the second A-1 matrix is included in second transceiver hardware that includes a second plurality of DPD circuits that generate the second one or more DPD digital output streams using the second plurality of digital output streams.

Aspect 17: A method performed by an apparatus, the method comprising: operating in a first mode that is associated with multi-antenna digital predistortion (DPD) processing (multi-antenna DPD processing), the multi-antenna DPD processing comprising at least: generating, using digital signal processing logic, a plurality of digital output streams by applying an inverse power-amplifier-to-antenna-array network (A-1) matrix to one or more input digital streams associated with a first sub-array of antenna elements of an antenna array, the first A-1 matrix being based at least in part on the first sub-array of antenna elements; configuring at least a first instance of a DPD circuit that is coupled to an output of the digital signal processing logic and configured to generate first one or more DPD digital output streams based at least in part on: the plurality of digital output streams, and a multi-antenna DPD kernel that is based at least in part on a DPD kernel set and processes each respective output digital stream of the plurality of digital output streams as at least one of: a forward digital stream, or a reverse digital stream; transmitting the first one or more DPD digital output streams based at least in part on using the first sub-array of antenna elements; and operating in a second mode that is associated with multi-band DPD processing, the multi-band DPD processing comprising at least: generating, using a wideband signal, a first plurality of samples that are a first sub-band of the wideband signal, the first plurality of samples being sampled over a time duration; generating, using the wideband signal, a second plurality of samples that are a second sub-band of the wideband signal, the second plurality of samples being sampled over the time duration; and generating a DPD-processed wideband signal based at least in part on using at least: a second instance of the DPD circuit that processes the first plurality of samples and the second plurality of samples to generate a plurality of DPD digital output samples, the second DPD circuit configured with a multi-band DPD kernel, the second DPD circuit including replicate hardware to the first DPD circuit; and combining logic that generates the DPD-processed wideband signal based at least in part on combining the plurality of DPD digital output samples.

Aspect 18: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-17.

Aspect 19: An apparatus for wireless communication at a device, the apparatus comprising one or more memories and one or more processors coupled to the one or more memories, the one or more processors configured to cause the device to perform the method of one or more of Aspects 1-17.

Aspect 20: An apparatus for wireless communication, the apparatus comprising at least one means for performing the method of one or more of Aspects 1-17.

Aspect 21: A non-transitory computer-readable medium storing code for wireless communication, the code comprising instructions executable by one or more processors to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

Aspect 23: A device for wireless communication, the device comprising a processing system that includes one or more processors and one or more memories coupled with the one or more processors, the processing system configured to cause the device to perform the method of one or more of Aspects 1-17.

Aspect 24: An apparatus for wireless communication at a device, the apparatus comprising one or more memories and one or more processors coupled to the one or more memories, the one or more processors individually or collectively configured to cause the device to perform the method of one or more of Aspects 1-17.

Aspect 25: An apparatus for wireless communication comprising at least: first transceiver hardware comprising: first digital signal processing logic configured to: generate a first plurality of digital output streams that are associated with a first sub-array of antenna elements of an antenna array by applying a first inverse power-amplifier-to-antenna-array network (A-1) matrix to one or more first input digital streams associated with the first sub-array of antenna elements; and a first plurality of digital predistortion (DPD) circuits that are coupled to an output of the first digital signal processing logic and configured to: receive the first plurality of digital output streams from the first digital signal processing logic; and output first one or more DPD digital output streams that are associated with the first sub-array of antenna elements by applying first DPD to the first plurality of digital output streams; and at least second transceiver hardware comprising: second digital signal processing logic configured to: generate a second plurality of digital output streams that are associated with a second sub-array of antenna elements of the antenna array by applying a second A-1 matrix to second one or more input digital streams that are associated with the second sub-array of antenna elements, and a second plurality of DPD circuits that are coupled to the second digital signal processing logic and configured to: output second one or more DPD digital output streams that are associated with the second sub-array of antenna elements by applying second DPD to the second plurality of digital output streams.

Aspect 26: The apparatus of Aspect 25, wherein the first A-1 matrix and the second A-1 matrix are based at least in part on the first sub-array of antenna elements being different from, and electrically isolated from, the second sub-array of antenna elements, and wherein the first sub-array of antenna elements includes a first border antenna element that is located adjacent to a second boarder antenna element included in the second sub-array of antenna elements.

Aspect 27: The apparatus of Aspect 25 or Aspect 26, wherein the first A-1 matrix is independent from the second A-1 matrix.

Aspect 28: The apparatus of any of Aspects 25-27, wherein first A-1 matrix and the second A-1 matrix are based at least in part on: the first sub-array of antenna elements having a first set of border antenna elements that are adjacent to a second set of border antenna elements of a second sub-array of antenna elements of the antenna array, and the first set of border antenna elements having an isolation level between the second set of border antenna elements, the isolation level satisfying an isolation level threshold that indicates that an antenna crosstalk level between the first set of border antenna elements and the second set of border antenna elements is negligible.

Aspect 29: The apparatus of any of Aspects 25-28, wherein the apparatus includes the first sub-array of antenna elements and the second sub-array of antenna elements, and wherein the isolation level between the first set of border antenna elements and the second set of border antenna elements is based at least in part on one or more standoff insulators.

Aspect 30: The apparatus of any of Aspects 25-29, wherein the first transceiver hardware further comprises: first feed processing logic coupled to the first plurality of DPD circuits and configured to: generate first one or more baseband digital streams by applying a first inverse feed network (F-1) matrix to the first one or more DPD digital output streams, the first F-1 matrix being based at least in part on: a first feed network that is based at least in part on the first sub-array of antenna elements, and wherein the second transceiver hardware further comprises: second feed processing logic coupled to the second plurality of DPD circuits and configured to: generate second one or more baseband digital streams that are associated with the second sub-array of antenna elements by applying a second F-1 matrix to the second one or more DPD digital output streams, the second F-1 matrix being based at least in part on: a second feed network that is based at least in part on the second sub-array of antenna elements.

Aspect 31: The apparatus of any of Aspects 25-30, wherein the first A-1 matrix is based at least in part on a first set of scattering parameters that characterize a first power-amplifier-to-antenna-array network that includes the first sub-array of antenna elements and does not include the second sub-array of antenna elements, and wherein the second A-1 matrix is based at least in part on a second set of scattering parameters that characterize a second power-amplifier-to-antenna-array network that includes the second sub-array of antenna elements and excludes the first sub-array of antenna elements.

Aspect 32: The apparatus of any of Aspects 25-31, wherein the first A-1 matrix is based at least in part on mitigating first antenna crosstalk within the first sub-array of antenna elements, and wherein the second A-1 matrix is based at least in part on mitigating second antenna crosstalk within the second sub-array of antenna elements.

Aspect 33: The apparatus of any of Aspects 25-32, wherein the first A-1 matrix and the second A-1 matrix are based at least in part on calibration data associated with the antenna array.

Aspect 34: The apparatus of any of Aspects 25-33, wherein the apparatus includes more than two transceiver hardware segments, wherein the first transceiver hardware is a first transceiver hardware segment of the more than two transceiver hardware segments and the second transceiver hardware is a second transceiver hardware segment of the more than two transceiver hardware segments, and wherein each transceiver hardware segment of the more than two transceiver hardware segments includes: respective digital signal processing logic configured to generate a respective one or more digital output streams by applying a respective A-1 matrix to a respective one or more input digital streams associated with a respective sub-array of antenna elements of the antenna array, the respective A-1 matrix being based at least in part on a respective sub-array of antenna elements, and a respective plurality of DPD circuits that are coupled to the respective digital signal processing logic and configured to apply respective DPD to the respective one or more digital output streams.

Aspect 35: The apparatus of any of Aspects 25-34, wherein the first A-1 matrix is configured to process the first one or more input digital streams as a respective narrowband signal of at least a first wideband signal.

Aspect 36: The apparatus of any of Aspects 25-35, wherein the first A-1 matrix is configured to output, for each respective input digital stream of the first one or more input digital streams and as part of the first plurality of digital output streams: a respective forward digital stream, and a respective reverse digital stream.

Aspect 37: The apparatus of any of Aspects 25-36, wherein the first plurality of DPD circuits are configured to: receive, as the first plurality of digital output streams, the respective forward digital stream and the respective reverse digital stream, wherein, to output the first one or more DPD digital output streams, the first plurality of DPD circuits are configured to process the respective forward digital stream and the respective reverse digital stream using a DPD kernel.

Aspect 38: The apparatus of any of Aspects 25-37, wherein the first A-1 matrix is configured to process the first one or more input digital streams as at least: a first input digital stream of the first one or more input digital streams being a first narrowband signal that is included in a first wideband signal, and a second input digital stream of the first one or more input digital streams being a second narrowband signal that is included in in a second wideband signal, based at least in part on the first wideband signal and the second wideband signal sharing the first sub-array of antenna elements.

Aspect 39: The apparatus of any of Aspects 25-38, wherein the first DPD is based at least in part on a first power-amplifier-to-antenna-array network that includes the first sub-array of antenna elements and excludes the second sub-array of antenna elements, and wherein the second DPD is based at least in part on a second power-amplifier-to-antenna-array network that includes the second sub-array of antenna elements and excludes the first sub-array of antenna elements.

Aspect 40: The apparatus of any of Aspects 25-39, wherein the first transceiver hardware and the second transceiver hardware are co-located on an integrated circuit (IC) as two of a plurality of transceiver hardware included on the IC.

Aspect 41: An apparatus comprising: an antenna array that includes multiple antenna elements; one or more power amplifiers, each power amplifier being coupled to one or more antenna elements of the antenna array; at least a first instance and a second instance of a digital predistortion (DPD) circuit; first transceiver hardware that is coupled to at least a first power amplifier of the one or more power amplifiers and configured to drive at least a first portion of the antenna array, the first transceiver hardware comprising: the first instance of the DPD circuit configured to apply first DPD to a first plurality of input streams using a multi-band DPD kernel; and second transceiver hardware that is coupled to at least a second power amplifier of the one or more power amplifiers and configured to drive at least a second portion of the antenna array, the second transceiver hardware comprising: the second instance of the DPD circuit configured to apply second DPD to a second plurality of input streams using a multi-antenna DPD kernel that is based at least in part on a DPD kernel set, the first instance of the DPD circuit and the second instance of the DPD circuit being configured to dynamically switch between DPD kernel types that are used to apply DPD to the first plurality of input streams or the second of input streams, respectively.

Aspect 42: The apparatus of Aspect 41, wherein the DPD circuit comprises: a first input mechanism configured to receive an indication of a selected digital DPD kernel from a plurality of DPD kernels, a second input mechanism configured to receive a first input stream and a second input stream; an envelope delay line component comprising: a first envelope storage segmentation configured to store a first input envelope value as one of a first plurality of envelope values associated with the first input stream, and a second envelope storage segmentation configured to store a second input envelope value as one of a second plurality of envelope values associated with the second input stream; an envelope selection component configured to select a subset of envelope values from at least one of the first plurality of envelope values or the second plurality of envelope values based at least in part on the selected DPD kernel; one or more look-up-table (LUT) components coupled to the envelope selection component configured to: receive the subset of envelope values, and output an envelope computation value that is based at least in part on the subset of envelope values and the selected DPD kernel; a computation delay line component comprising one or more computation storage components configured to store multiple computational values that are based at least in part on at least one of: the first input stream, or the second input stream; one or more computation selection components coupled to the computation delay line component and configured to select, based at least in part on the selected DPD kernel, one or more subsets of computational values from the multiple computational values stored by the computation storage component; one or more combiner components coupled to the one or more computation selection components and the one or more LUT components, the one or more combiner components configured to generate a respective output that is based at least in part on combining the envelope computation value with the one or more subsets of computational values; and an adder component coupled the one or more combiner components and configured to generate a DPD-processed output sample based at least in part on combining the respective output from at least a subset of the one or more combiner components.

Aspect 43: A method performed by an apparatus, the method comprising: operating in a first mode that is associated with multi-antenna digital predistortion (DPD) processing (multi-antenna DPD processing), the multi-antenna DPD processing comprising at least: generating, using digital signal processing logic, a plurality of digital output streams by applying an inverse power-amplifier-to-antenna-array network (A-1) matrix to one or more input digital streams associated with a first sub-array of antenna elements of an antenna array, the first A-1 matrix being based at least in part on the first sub-array of antenna elements; configuring at least a first instance of a DPD circuit that is coupled to an output of the digital signal processing logic and configured to generate first one or more DPD digital output streams based at least in part on: the plurality of digital output streams, and a multi-antenna DPD kernel that is based at least in part on a DPD kernel set and processes each respective output digital stream of the plurality of digital output streams as at least one of: a forward digital stream, or a reverse digital stream; transmitting the first one or more DPD digital output streams based at least in part on using the first sub-array of antenna elements; and operating in a second mode that is associated with multi-band DPD processing, the multi-band DPD processing comprising at least: generating, using a wideband signal, a first plurality of samples that are a first sub-band of the wideband signal, the first plurality of samples being sampled over a time duration; generating, using the wideband signal, a second plurality of samples that are a second sub-band of the wideband signal, the second plurality of samples being sampled over the time duration; and generating a DPD-processed wideband signal based at least in part on using at least: a second instance of the DPD circuit that processes the first plurality of samples and the second plurality of samples to generate a plurality of DPD digital output samples, the second DPD circuit configured with a multi-band DPD kernel; and combining logic that generates the DPD-processed wideband signal based at least in part on combining the plurality of DPD digital output samples.

Aspect 44: An apparatus for wireless communication at a device, the apparatus comprising one or more processors; one or more memories coupled with the one or more processors; and instructions stored in the one or more memories and executable by the one or more processors to cause the apparatus to perform the method of Aspect 43.

Aspect 45: An apparatus for wireless communication at a device, the apparatus comprising one or more memories and one or more processors coupled to the one or more memories, the one or more processors configured to cause the device to perform the method of Aspect 43.

Aspect 46: An apparatus for wireless communication, the apparatus comprising at least one means for performing the method of Aspect 43.

Aspect 47: A non-transitory computer-readable medium storing code for wireless communication, the code comprising instructions executable by one or more processors to perform the method of Aspect 43.

Aspect 48: A non-transitory computer-readable medium storing a set of instructions for wireless communication, the set of instructions comprising one or more instructions that, when executed by one or more processors of a device, cause the device to perform the method of Aspect 43.

Aspect 49: A device for wireless communication, the device comprising a processing system that includes one or more processors and one or more memories coupled with the one or more processors, the processing system configured to cause the device to perform the method of Aspect 43.

Aspect 50: An apparatus for wireless communication at a device, the apparatus comprising one or more memories and one or more processors coupled to the one or more memories, the one or more processors individually or collectively configured to cause the device to perform the method of Aspect 43.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication comprising at least:

first transceiver hardware comprising:

first digital signal processing logic configured to:

generate a first plurality of digital output streams that are associated with a first sub-array of antenna elements of an antenna array by applying a first inverse power-amplifier-to-antenna-array network (A-1) matrix to one or more first input digital streams associated with the first sub-array of antenna elements; and a first plurality of digital predistortion (DPD) circuits that are coupled to an output of the first digital signal processing logic and configured to:

receive the first plurality of digital output streams from the first digital signal processing logic; and output first one or more DPD digital output streams that are associated with the first sub-array of antenna elements by applying first DPD to the first plurality of digital output streams; and at least second transceiver hardware comprising:

second digital signal processing logic configured to:

generate a second plurality of digital output streams that are associated with a second sub-array of antenna elements of the antenna array by applying a second A-1 matrix to second one or more input digital streams that are associated with the second sub-array of antenna elements, and a second plurality of DPD circuits that are coupled to the second digital signal processing logic and configured to:

output second one or more DPD digital output streams that are associated with the second sub-array of antenna elements by applying second DPD to the second plurality of digital output streams.

2. The apparatus of claim 1, wherein the first A-1 matrix and the second A-1 matrix are based at least in part on the first sub-array of antenna elements being different from, and electrically isolated from, the second sub-array of antenna elements, and wherein the first sub-array of antenna elements includes a first border antenna element that is located adjacent to a second boarder antenna element included in the second sub-array of antenna elements.

3. The apparatus of claim 1, wherein the first A-1 matrix is independent from the second A-1 matrix.

4. The apparatus of claim 1, wherein the first A-1 matrix and the second A-1 matrix are based at least in part on:

the first sub-array of antenna elements having a first set of border antenna elements that are adjacent to a second set of border antenna elements of the second sub-array of antenna elements of the antenna array, and the first set of border antenna elements having an isolation level between the second set of border antenna elements, the isolation level satisfying an isolation level threshold that indicates that an antenna crosstalk level between the first set of border antenna elements and the second set of border antenna elements is negligible.

5. The apparatus of claim 4, wherein the apparatus includes the first sub-array of antenna elements and the second sub-array of antenna elements, and wherein the isolation level between the first set of border antenna elements and the second set of border antenna elements is based at least in part on one or more standoff insulators.

6. The apparatus of claim 1, wherein the first transceiver hardware further comprises:

first feed processing logic coupled to the first plurality of DPD circuits and configured to:

generate first one or more baseband digital streams by applying a first inverse feed network (F-1) matrix to the first one or more DPD digital output streams, the first F-1 matrix being based at least in part on:

a first feed network that is based at least in part on the first sub-array of antenna elements, and wherein the second transceiver hardware further comprises:

second feed processing logic coupled to the second plurality of DPD circuits and configured to:

generate second one or more baseband digital streams that are associated with the second sub-array of antenna elements by applying a second F-1 matrix to the second one or more DPD digital output streams, the second F-1 matrix being based at least in part on:

a second feed network that is based at least in part on the second sub-array of antenna elements.

7. The apparatus of claim 1, wherein the first A-1 matrix is based at least in part on a first set of scattering parameters that characterize a first power-amplifier-to-antenna-array network that includes the first sub-array of antenna elements and does not include the second sub-array of antenna elements, and wherein the second A-1 matrix is based at least in part on a second set of scattering parameters that characterize a second power-amplifier-to-antenna-array network that includes the second sub-array of antenna elements and excludes the first sub-array of antenna elements.

8. The apparatus of claim 1, wherein the first A-1 matrix is based at least in part on mitigating first antenna crosstalk within the first sub-array of antenna elements, and wherein the second A-1 matrix is based at least in part on mitigating second antenna crosstalk within the second sub-array of antenna elements.

9. The apparatus of claim 1, wherein the first A-1 matrix and the second A-1 matrix are based at least in part on calibration data associated with the antenna array.

10. The apparatus of claim 1, wherein the apparatus includes more than two transceiver hardware segments, wherein the first transceiver hardware is a first transceiver hardware segment of the more than two transceiver hardware segments and the second transceiver hardware is a second transceiver hardware segment of the more than two transceiver hardware segments, and wherein each transceiver hardware segment of the more than two transceiver hardware segments includes:

respective digital signal processing logic configured to generate a respective one or more digital output streams by applying a respective A-1 matrix to a respective one or more input digital streams associated with a respective sub-array of antenna elements of the antenna array, the respective A-1 matrix being based at least in part on a respective sub-array of antenna elements, and a respective plurality of DPD circuits that are coupled to the respective digital signal processing logic and configured to apply respective DPD to the respective one or more digital output streams.

11. The apparatus of claim 1, wherein the first A-1 matrix is configured to process the first one or more input digital streams as a respective narrowband signal of at least a first wideband signal.

12. The apparatus of claim 1, wherein the first A-1 matrix is configured to output, for each respective input digital stream of the first one or more input digital streams and as part of the first plurality of digital output streams:

a respective forward digital stream, and a respective reverse digital stream.

13. The apparatus of claim 12, wherein the first plurality of DPD circuits are configured to:

receive, as the first plurality of digital output streams, the respective forward digital stream and the respective reverse digital stream, wherein, to output the first one or more DPD digital output streams, the first plurality of DPD circuits are configured to process the respective forward digital stream and the respective reverse digital stream using a DPD kernel.

14. The apparatus of claim 1, wherein the first A-1 matrix is configured to process the first one or more input digital streams as at least:

a first input digital stream of the first one or more input digital streams being a first narrowband signal that is included in a first wideband signal, and a second input digital stream of the first one or more input digital streams being a second narrowband signal that is included in in a second wideband signal, based at least in part on the first wideband signal and the second wideband signal sharing the first sub-array of antenna elements.

15. The apparatus of claim 1, wherein the first DPD is based at least in part on a first power-amplifier-to-antenna-array network that includes the first sub-array of antenna elements and excludes the second sub-array of antenna elements, and wherein the second DPD is based at least in part on a second power-amplifier-to-antenna-array network that includes the second sub-array of antenna elements and excludes the first sub-array of antenna elements.

16. The apparatus of claim 1, wherein the first transceiver hardware and the second transceiver hardware are co-located on an integrated circuit (IC) as two of a plurality of transceiver hardware included on the IC.

17. A method performed by an apparatus, the method comprising:

generating a first plurality of digital output streams that are associated with a first sub-array of antenna elements of an antenna array by applying a first inverse power-amplifier-to-antenna-array network (A-1) matrix to first one or more input digital streams associated with the first sub-array of antenna elements, the first A-1 matrix being based at least in part on the first sub-array of antenna elements;

generating, using the first plurality of digital output streams, first one or more digital predistortion (DPD) digital output streams that are associated with the first sub-array of antenna elements by applying first DPD to the first plurality of digital output streams, the first DPD being based at least in part on a first power-amplifier-to-antenna-array network;

generating a second plurality of digital output streams that are associated with a second sub-array of antenna elements of the antenna array by applying a second A-1 matrix to second one or more input digital streams that are associated with the second sub-array of antenna elements, the second A-1 matrix being based at least in part on the second sub-array of antenna elements; and generating second one or more DPD digital output streams that are associated with the second sub-array of antenna elements by applying second DPD to the second plurality of digital output streams, the second DPD being based at least in part on a second power-amplifier-to-antenna-array network that is different from the first power-amplifier-to-antenna-array network.

18. The apparatus of claim 17, wherein the first A-1 matrix and the second A-1 matrix are based at least in part on the first sub-array of antenna elements being different from, and electrically isolated from, the second sub-array of antenna elements, and wherein the first sub-array of antenna elements includes a first border antenna element that is located adjacent to a second boarder antenna element included in the second sub-array of antenna elements.

19. The method of claim 17, wherein the first A-1 matrix and the second A-1 matrix are based at least in part on:

the first sub-array of antenna elements having a first set of border antenna elements that are adjacent to a second set of border antenna elements of a second sub-array of antenna elements of the antenna array, and the first set of border antenna elements having an isolation level between the second set of border antenna elements, the isolation level satisfying an isolation level threshold that indicates that an antenna crosstalk level between the first set of border antenna elements and the second set of border antenna elements is negligible.

20. The method of claim 17, wherein generating the first plurality of digital output streams and generating the first one or more DPD digital output streams is based at least in part on using first transceiver hardware that comprises:

first digital signal processing logic configured to generate the first plurality of digital output streams, and a first plurality of DPD circuits that are coupled to an output of the first digital signal processing logic and configured to generate the first one or more DPD digital output streams using the first plurality of digital output streams, and wherein generating the second plurality of digital output streams and generating the second one or more DPD digital output streams is based at least in part on using second transceiver hardware that comprises:

second digital signal processing logic configured to generate the second plurality of digital output streams, and a second plurality of DPD circuits that are coupled to the second digital signal processing logic and configured to generate the second one or more DPD digital output streams using the first plurality of digital output streams.

21. The method of claim 17, further comprising:

generating first one or more baseband digital streams by applying a first inverse feed network (F-1) matrix to the first one or more DPD digital output streams, the first F-1 matrix being based at least in part on:

each baseband digital stream of the first one or more baseband digital streams being used as an input to the first sub-array of antenna elements, and generating second one or more baseband digital streams that are associated with the second sub-array of antenna elements by applying a second F-1 matrix to the second one or more DPD digital output streams, the second F-1 matrix being based at least in part on:

each baseband digital stream of the second one or more baseband digital streams being used as an input to the second sub-array of antenna elements.

22. The method of claim 21, wherein generating the first one or more baseband digital streams comprises:

generating the first one or more baseband digital streams using first feed processing logic that is coupled to a first plurality of DPD circuits that generate the first one or more DPD digital output streams, and wherein generating the second one or more baseband digital streams comprises:

generating the second one or more baseband digital streams using second feed processing logic that is coupled to a second plurality of DPD circuits that generate the second one or more DPD digital output streams.

23. The method of claim 17, wherein the first A-1 matrix is based at least in part on a first set of scattering parameters that characterize a first power-amplifier-to-antenna-array network that includes the first sub-array of antenna elements and excludes the second sub-array of antenna elements, and wherein the second A-1 matrix is based at least in part on a second set of scattering parameters that characterize a second power-amplifier-to-antenna-array network that includes the second sub-array of antenna elements and excludes the first sub-array of antenna elements.

24. The method of claim 17, wherein the first A-1 matrix is independent from the second A-1 matrix.

25. The method of claim 17, wherein the first A-1 matrix is based at least in part on mitigating antenna crosstalk within the first sub-array of antenna elements, and wherein the second A-1 matrix is based at least in part on mitigating antenna crosstalk within the second sub-array of antenna elements.

26. The method of claim 17, wherein the first A-1 matrix and the second A-1 matrix are based at least in part on calibration data associated with the antenna array.

27. The method of claim 17, wherein:

a first input digital stream of the first one or more input digital streams is a first narrowband signal that is part of a wideband signal, and a second input digital stream of the first one or more input digital streams is a second narrowband signal of the wideband signal.

28. The method of claim 17, further comprising:

generating, by the first A-1 matrix and as part of the first plurality of digital output streams:

a respective forward digital stream, and a respective reverse digital stream, for each respective input digital stream of the first one or more input digital streams.

29. The method of claim 28, wherein generating the first one or more digital DPD digital output streams comprises:

processing the respective forward digital stream and the respective reverse digital stream using a DPD kernel.

30. The method of claim 17, wherein:

a first digital stream of the first one or more input digital streams is a first narrowband signal that is included in a first wideband signal, and a second digital stream of the first one or more input digital streams is a second narrowband signal that is included in a second wideband signal, wherein the first wideband signal and the second wideband signal share the first sub-array of antenna elements.

31. The method of claim 17, wherein applying the first A-1 matrix comprises:

applying the first A-1 matrix to the first one or more input digital streams in a modem that is coupled to first transceiver hardware that includes a first plurality of DPD circuits that generate the first one or more DPD digital output streams using the first plurality of digital output streams, and wherein applying the second A-1 matrix comprises:

applying the second A-1 matrix to the second one or more input digital streams in the modem, the modem being coupled to second transceiver hardware that includes a second plurality of DPD circuits that generate the second one or more DPD digital output streams using the second plurality of digital output streams.

32. The method of claim 17, wherein the first A-1 matrix is included in first transceiver hardware that includes a first plurality of DPD circuits that generate the first one or more DPD digital output streams using the first plurality of digital output streams, and wherein the second A-1 matrix is included in second transceiver hardware that includes a second plurality of DPD circuits that generate the second one or more DPD digital output streams using the second plurality of digital output streams.

33. An apparatus comprising:

an antenna array that includes multiple antenna elements;

one or more power amplifiers, each power amplifier being coupled to one or more antenna elements of the antenna array;

at least a first instance and a second instance of a digital predistortion (DPD) circuit;

first transceiver hardware that is coupled to at least a first power amplifier of the one or more power amplifiers and configured to drive at least a first portion of the antenna array, the first transceiver hardware comprising:

the first instance of the DPD circuit configured to apply first DPD to a first plurality of input streams using a multi-band DPD kernel; and second transceiver hardware that is coupled to at least a second power amplifier of the one or more power amplifiers and configured to drive at least a second portion of the antenna array, the second transceiver hardware comprising:

the second instance of the DPD circuit configured to apply second DPD to a second plurality of input streams using a multi-antenna DPD kernel that is based at least in part on a DPD kernel set, the first instance of the DPD circuit and the second instance of the DPD circuit being configured to dynamically switch between DPD kernel types that are used to apply DPD to the first plurality of input streams or the second of input streams, respectively.

34. The apparatus of claim 33, wherein the DPD circuit comprises:

a first input mechanism configured to receive an indication of a selected digital DPD kernel from a plurality of DPD kernels, a second input mechanism configured to receive a first input stream and a second input stream;

an envelope delay line component comprising:

a first envelope storage segmentation configured to store a first input envelope value as one of a first plurality of envelope values associated with the first input stream, and a second envelope storage segmentation configured to store a second input envelope value as one of a second plurality of envelope values associated with the second input stream;

an envelope selection component configured to select a subset of envelope values from at least one of the first plurality of envelope values or the second plurality of envelope values based at least in part on the selected DPD kernel;

one or more look-up-table (LUT) components coupled to the envelope selection component configured to:

receive the subset of envelope values, and output an envelope computation value that is based at least in part on the subset of envelope values and the selected DPD kernel;

a computation delay line component comprising one or more computation storage components configured to store multiple computational values that are based at least in part on at least one of:

the first input stream, or the second input stream;

one or more computation selection components coupled to the computation delay line component and configured to select, based at least in part on the selected DPD kernel, one or more subsets of computational values from the multiple computational values stored by the computation storage component;

one or more combiner components coupled to the one or more computation selection components and the one or more LUT components, the one or more combiner components configured to generate a respective output that is based at least in part on combining the envelope computation value with the one or more subsets of computational values; and an adder component coupled the one or more combiner components and configured to generate a DPD-processed output sample based at least in part on combining the respective output from at least a subset of the one or more combiner components.

35. A method performed by an apparatus, the method comprising:

operating in a first mode that is associated with multi-antenna digital predistortion (DPD) processing (multi-antenna DPD processing), the multi-antenna DPD processing comprising at least:

generating, using digital signal processing logic, a plurality of digital output streams by applying an inverse power-amplifier-to-antenna-array network (A-1) matrix to one or more input digital streams associated with a first sub-array of antenna elements of an antenna array, the first A-1 matrix being based at least in part on the first sub-array of antenna elements;

configuring at least a first instance of a DPD circuit that is coupled to an output of the digital signal processing logic and configured to generate first one or more DPD digital output streams based at least in part on:

the plurality of digital output streams, and a multi-antenna DPD kernel that is based at least in part on a DPD kernel set and processes each respective output digital stream of the plurality of digital output streams as at least one of:

a forward digital stream, or a reverse digital stream;

transmitting the first one or more DPD digital output streams based at least in part on using the first sub-array of antenna elements; and operating in a second mode that is associated with multi-band DPD processing, the multi-band DPD processing comprising at least:

generating, using a wideband signal, a first plurality of samples that are a first sub-band of the wideband signal, the first plurality of samples being sampled over a time duration;

generating, using the wideband signal, a second plurality of samples that are a second sub-band of the wideband signal, the second plurality of samples being sampled over the time duration; and generating a DPD-processed wideband signal based at least in part on using at least:

a second instance of the DPD circuit that processes the first plurality of samples and the second plurality of samples to generate a plurality of DPD digital output samples, the second DPD circuit configured with a multi-band DPD kernel; and combining logic that generates the DPD-processed wideband signal based at least in part on combining the plurality of DPD digital output samples.

* * * * *